Sept. 8, 1942.　　　J. W. BRYCE ET AL　　　2,295,448
DIVIDING MACHINE
Original Filed June 10, 1938　　22 Sheets—Sheet 1

Sept. 8, 1942.  J. W. BRYCE ET AL  2,295,448
DIVIDING MACHINE
Original Filed June 10, 1938  22 Sheets-Sheet 2
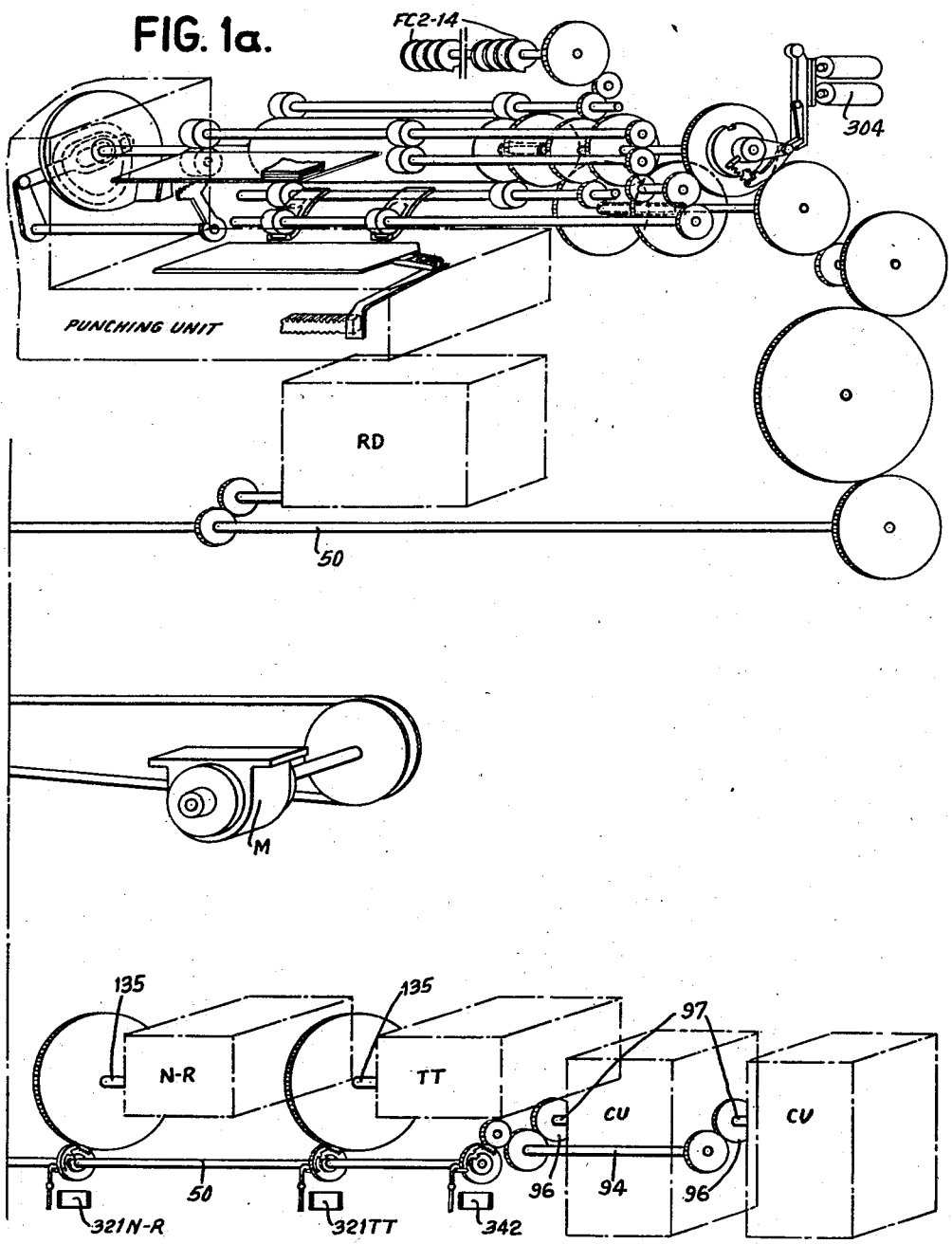

Sept. 8, 1942. J. W. BRYCE ET AL 2,295,448
DIVIDING MACHINE
Original Filed June 10, 1938   22 Sheets-Sheet 3

Sept. 8, 1942.  J. W. BRYCE ET AL  2,295,448
DIVIDING MACHINE
Original Filed June 10, 1938   22 Sheets—Sheet 4

Inventors
James W. Bryce and
Arthur H. Dickinson
By Cooper, Kerr & Dunham
Attorneys Sept. 8, 1942.　　J. W. BRYCE ET AL　　2,295,448
DIVIDING MACHINE
Original Filed June 10, 1938　22 Sheets-Sheet 5

Inventors
James W. Bryce and
Arthur H. Dickinson
By Cooper, Kerr & Dunham
Attorneys Sept. 8, 1942.  J. W. BRYCE ET AL  2,295,448
DIVIDING MACHINE
Original Filed June 10, 1938  22 Sheets-Sheet 6

Inventors
James W. Bryce and
Arthur H. Dickinson
By
Cooper, Kerr & Dunham
Attorneys Sept. 8, 1942.  J. W. BRYCE ET AL  2,295,448
DIVIDING MACHINE
Original Filed June 10, 1938  22 Sheets-Sheet 7

Inventors
James W. Bryce and
Arthur H. Dickinson
By
Cooper, Kerr & Dunham
Attorneys

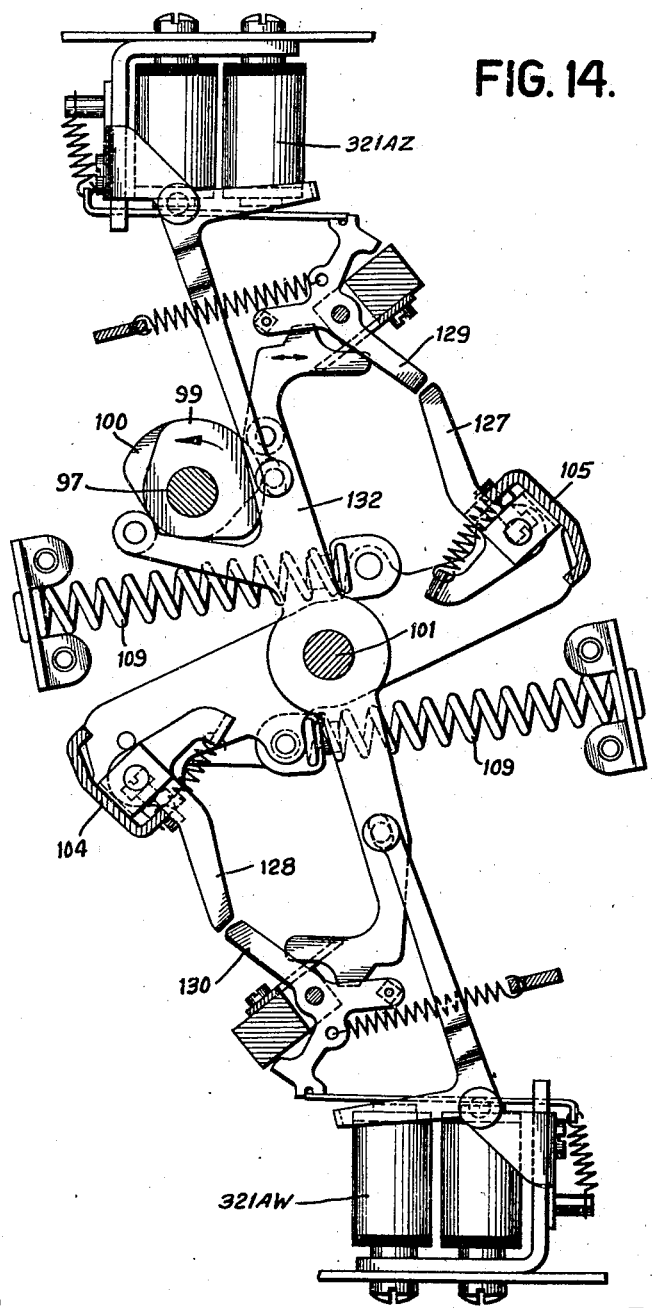

Sept. 8, 1942.  J. W. BRYCE ET AL  2,295,448
DIVIDING MACHINE
Original Filed June 10, 1938  22 Sheets-Sheet 10

Inventors
James W. Bryce and
Arthur H. Dickinson
By Cooper, Kerr & Dunham
Attorneys

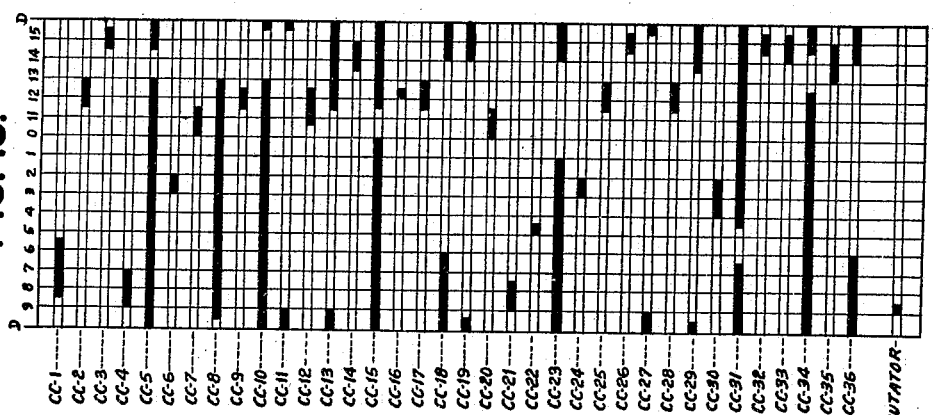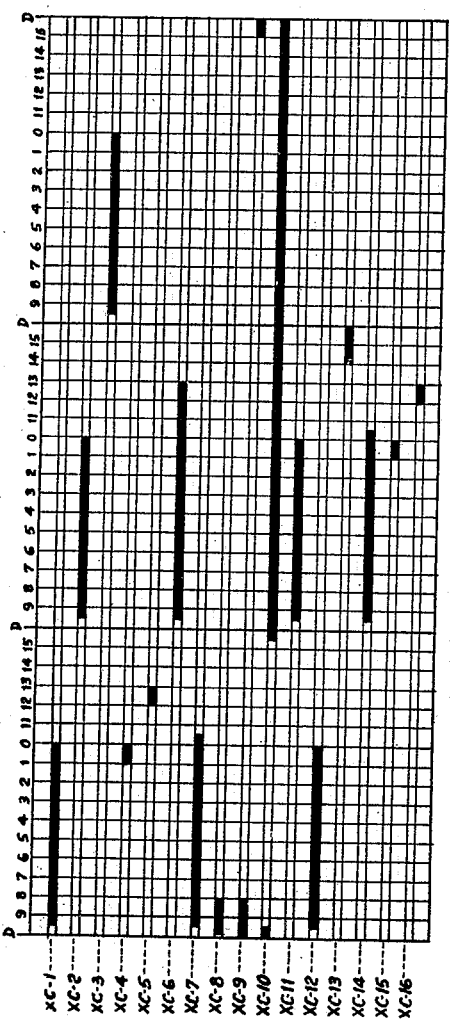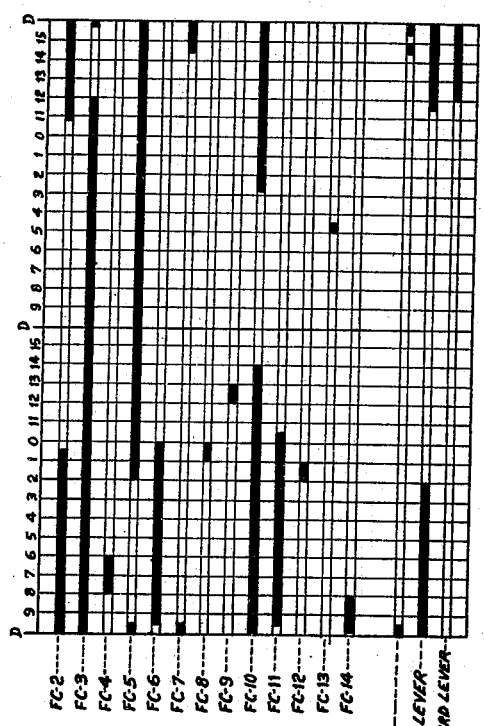

Sept. 8, 1942.  J. W. BRYCE ET AL  2,295,448
DIVIDING MACHINE
Original Filed June 10, 1938  22 Sheets-Sheet 12

Inventors
James W. Bryce and
Arthur H. Dickinson
By Cooper, Kerr & Dunham
Attorneys Sept. 8, 1942. J. W. BRYCE ET AL 2,295,448
DIVIDING MACHINE
Original Filed June 10, 1938 22 Sheets-Sheet 13

Sept. 8, 1942.　　　　J. W. BRYCE ET AL　　　　2,295,448
DIVIDING MACHINE
Original Filed June 10, 1938　　22 Sheets-Sheet 14

Inventors
James W. Bryce and
Arthur H. Dickinson
By Cooper, Kerr & Dunham
Attorneys Sept. 8, 1942.   J. W. BRYCE ET AL   2,295,448
DIVIDING MACHINE
Original Filed June 10, 1938   22 Sheets-Sheet 15

Inventors
James W. Bryce and
Arthur H. Dickinson
By Cooper, Kerr & Dunham
Attorneys

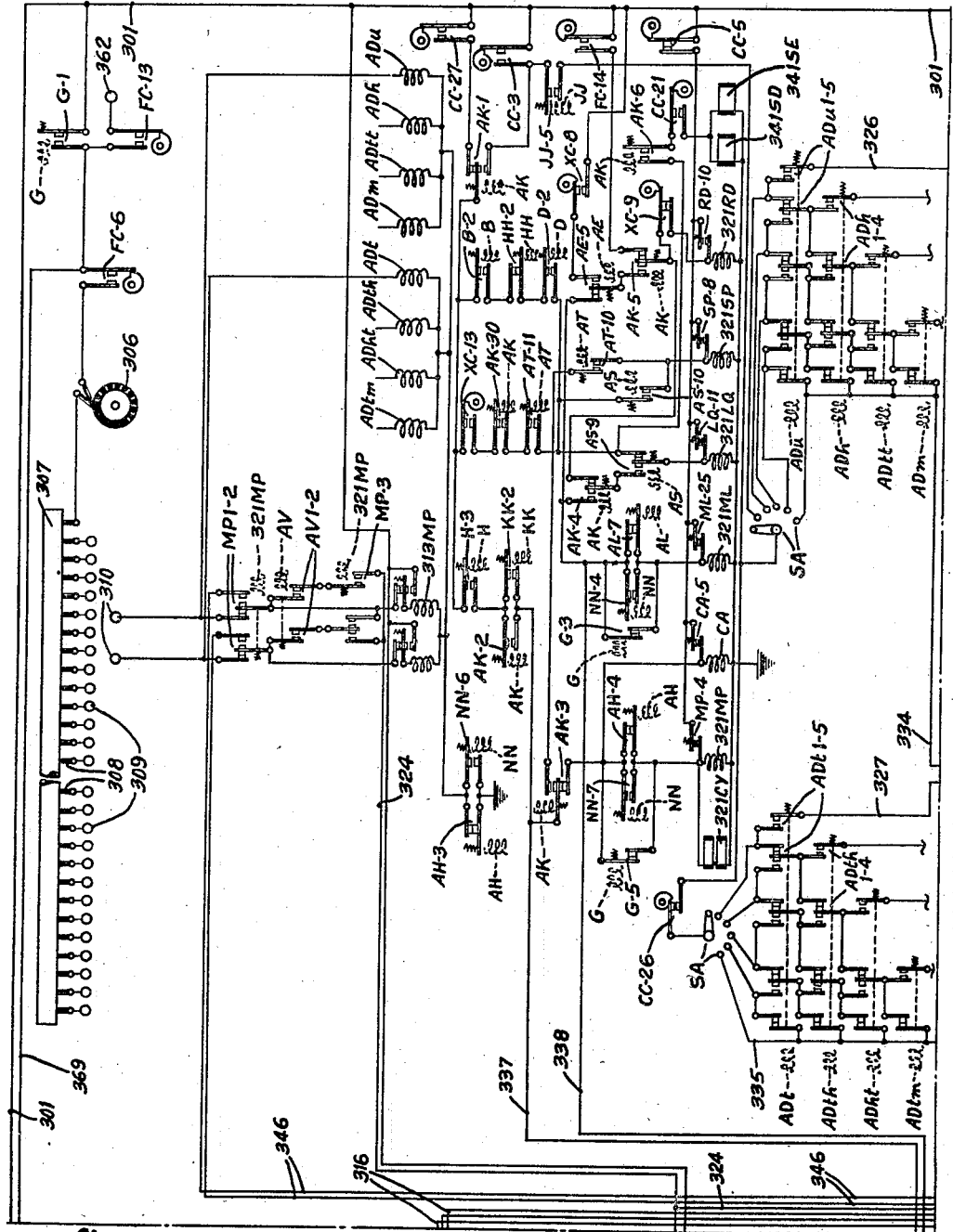

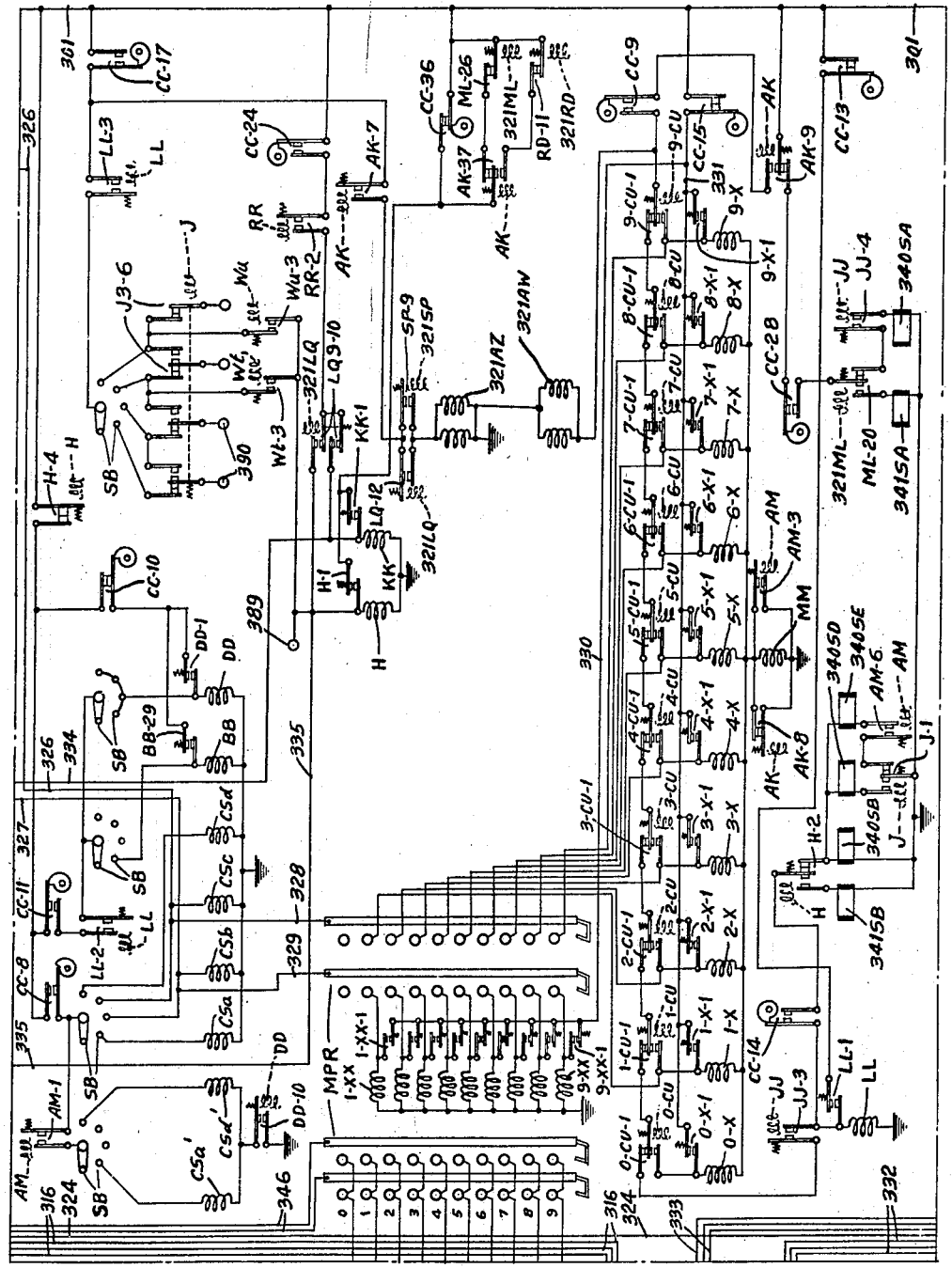

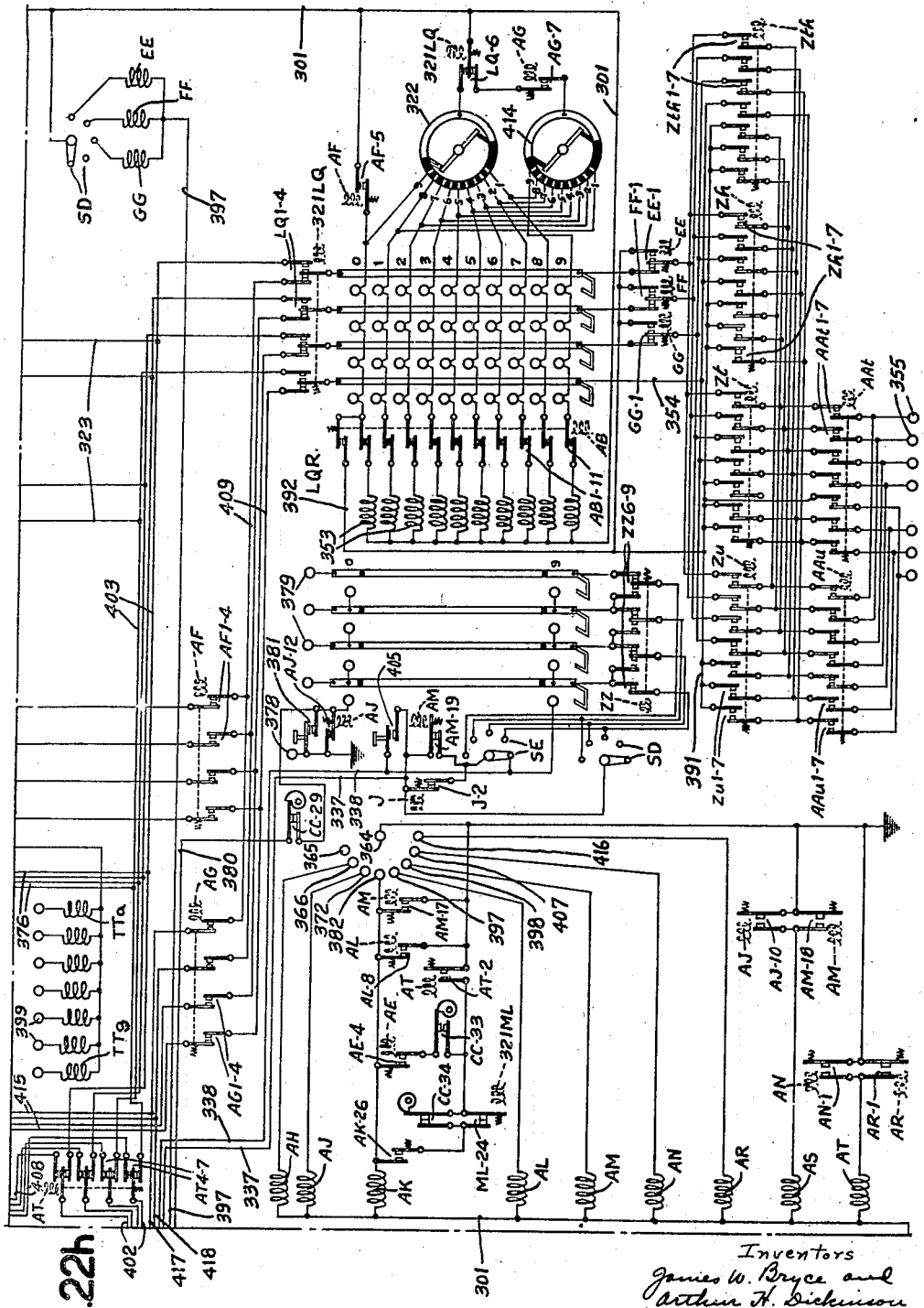

Sept. 8, 1942.         J. W. BRYCE ET AL         2,295,448
                      DIVIDING MACHINE
            Original Filed June 10, 1938    22 Sheets—Sheet 21

FIG. 27.

CHECKING DIVIDING

| CARD FEED STARTING UP | CARD FEED | | | | | | CARD FEED |
|---|---|---|---|---|---|---|---|
| | READ DR INTO MLI-2, 3-6,5,7,9 | READ ML-2 INTO 3-6, 4-8,5,9 | READ ML-2 INTO 4-8,5, ML-6 INTO 7, 9 | COMPARE COMPLEMEN-TARILY | MLR TO RD (ADD) (SETUP TO LQ) (SUBTRACT) | COMPARE COMPLEMEN-TARILY | MLR TO RD (ADD) SETUP TO LQ (SUBTRACT) | RESET MLS RESET RD |
| PRESENSE DR, DD + Q FIELDS | READ DD INTO SP | PRESENSE DR, DD + Q FIELDS + NEXT CARD | RESET SP | | | IF CHECKING RUNS WHERE 9 IS APPLIED ADD 9'S + 5 TO LQ | TEST FOR 9'S IN LQ | RESET LQ COMMENCE SKIPPING |
| | READ Q INTO LQ | SPR TO RD TRANSFER (SUBTRACT) | FEED CARD TO SKIPPING POSITION | | | | | THESE CYCLES TAKE PLACE AUTOMATICALLY IF ALL 9'S APPEAR OTHERWISE MACHINE STOPS UNTIL RESET OCCUR |

FIG. 26.

DIVIDING

| CARD FEED STARTING UP | CARD FEED | | | | | | |
|---|---|---|---|---|---|---|---|
| | READ DR INTO ML1-2, 3-6,5,7,9 | READ ML-2 INTO 3-6, 4-8,5,9 | READ ML-2 INTO 4-8,5 ML-6 INTO 7, 9 | COMPARE | MLR TO RD (SUBTRACT) | COMPARE | MLR TO RD (SUBTRACT) | RESET MLS RESET RD |
| PRESENSE DR + DD FIELDS | READ DD INTO RD | PRESENSE DR + DD FIELDS OF FOLLOWING CARD | RESET LQ | | SET-UP TO LQ | ENTER % PICKUP | SET-UP TO LQ | COMMENCE PUNCHING |

Inventors
James W. Bryce and
Arthur H. Dickinson
By Cooper, Kerr + Dunham
Attorneys Sept. 8, 1942.  J. W. BRYCE ET AL  2,295,448
DIVIDING MACHINE
Original Filed June 10, 1938  22 Sheets-Sheet 22

Patented Sept. 8, 1942

2,295,448

UNITED STATES PATENT OFFICE 2,295,448

DIVIDING MACHINE

James W. Bryce, Glen Ridge, N. J., and Arthur H. Dickinson, Scarsdale, N. Y., assignors to International Business Machines Corporation, New York, N. Y., a corporation of New York Original application June 10, 1938, Serial No. 213,044. Divided and this application July 13, 1939, Serial No. 284,168

19 Claims. (Cl. 235—61.7)

This invention relates to a record controlled accounting machine which is capable of effecting division. Before setting forth the objects of the invention, certain nomenclature will be explained.

"Regular dividing" operations refer to computations wherein the divisor and dividend are derived from each card, the dividend divided by the divisor and the quotient result recorded on each detail card.

"Rate card dividing" operations embrace those operations wherein the divisor amount is derived from each rate or master card and the dividend amount is derived from each interspersed detail card. The quotients are computed and recorded by punching on each detail card.

"Checking dividing" operations refer to types of computations wherein previously computed cards are placed in the machine, the divisor, dividend and quotient derived therefrom, and the dividing operation checked card by card by a re-computation which is effected in a different manner, with the final checking of the re-computed quotient against the quotient derived from the card.

The present invention has for its general object the provision of a construction of machine which will have extremely high speed of operation for division and wherein the construction is such that the minimum number of working parts and units are required for attaining high speed.

A further object of the present invention resides in the provision of a construction wherein diversity of functions, results and calculations may be secured with the utilization of common operating parts.

A further object of the present invention resides in the provision of a construction which includes simple means for setting up the machine and for controlling the parts and units for performing a wide variety of kinds or types of computations.

A further object of the present invention resides in the provision of a record controlled calculating machine adapted to perform division by a calculating mechanism which utilizes a set of all of the digital multiples of the divisor term for effecting division.

A further object of the present invention resides in the provision of a record controlled calculating machine adapted to perform rate dividing operations.

A further object of the present invention resides in the provision of a calculating machine with means manually settable by the operator and with simple controls such as a single plug connection, to enable the machine to perform at the will of the operator any selected one of the following operations: Regular, rate or checking dividing operations.

A further object of the present invention resides in the provision of a dividing machine of the type which effects division by comparing the different digital multiples of the divisor, which are available upon storage means therefor, successively with successive comparison portions of the dividend in a dividend receiving device, wherein a plurality of comparing units are provided which retain a setup of all the different multiples during comparing and deducting operations.

A further object of the present invention resides in the provision of improved place limiting mechanism and simplified controls therefor.

A further object of the present invention resides in the provision of a place limiting mechanism which controls the machine operation automatically in accordance with the size of the divisor amount, the size of such amount being automatically detected.

Subordinate to the last mentioned object, the present invention also has for its object the provision of a combined automatic and manually set place limiting mechanism wherein the automatic place limiting mechanism supersedes and takes control from the manually set mechanism in the event that the latter is adjusted for computations which exceed the columnar capacity of the machine or in the event that the latter is not set.

In the drawings:

Figures 1 and 1a, taken together with Fig. 1a to the right of Fig. 1, show the somewhat diagrammatic view of the various units of the machine and the drive therefor;

Fig. 11 is a somewhat diagrammatic view showing the card handling and sensing section of the machine. The card handling section is shown diagrammatically in Fig. 1a;

Fig. 14 is another detail sectional view of certain parts of the comparing unit, the section being taken substantially on line 14—14 of Fig. 12, looking in the direction of the arrows;

Fig. 19 is a cam timing diagram showing the timing of the various CC cams;

Fig. 20 is a cam timing diagram of the FC cams; and

Fig. 21 is a cam timing diagram of the XC cams;

Figs. 22a, 22b, 22c, 22d, 22e, 22f, 22g and 22h, taken together, show the complete circuit diagram of the machine. In arranging these figures, Figs. 22a to 22d are arranged vertically in the order named with Fig. 22a at the top. Figs. 22e to 22h are also arranged vertically in the order named with Fig. 22e at the top and such figures are placed to the right of Figs. 22a to 22d respectively.

Figure 23:
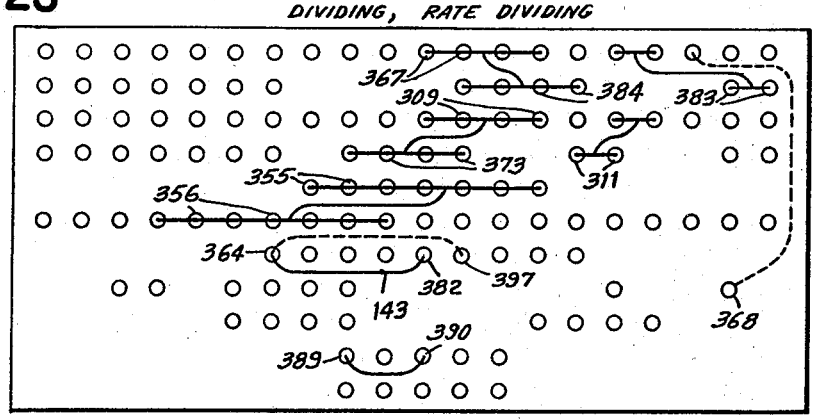
Figure 24:
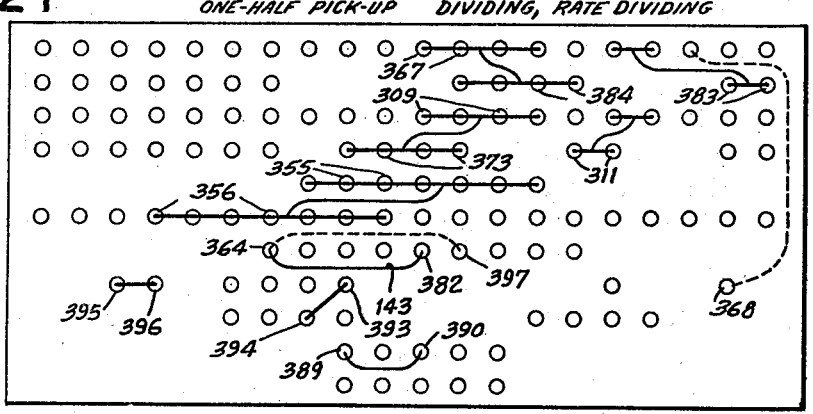
Figure 25:
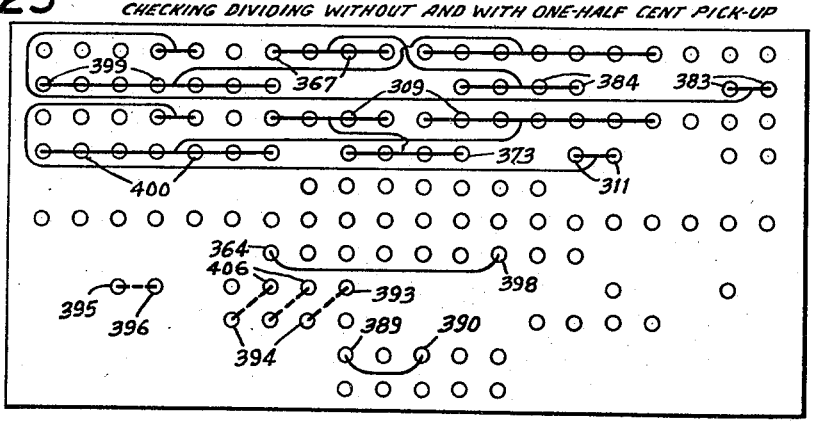
Figure 28:
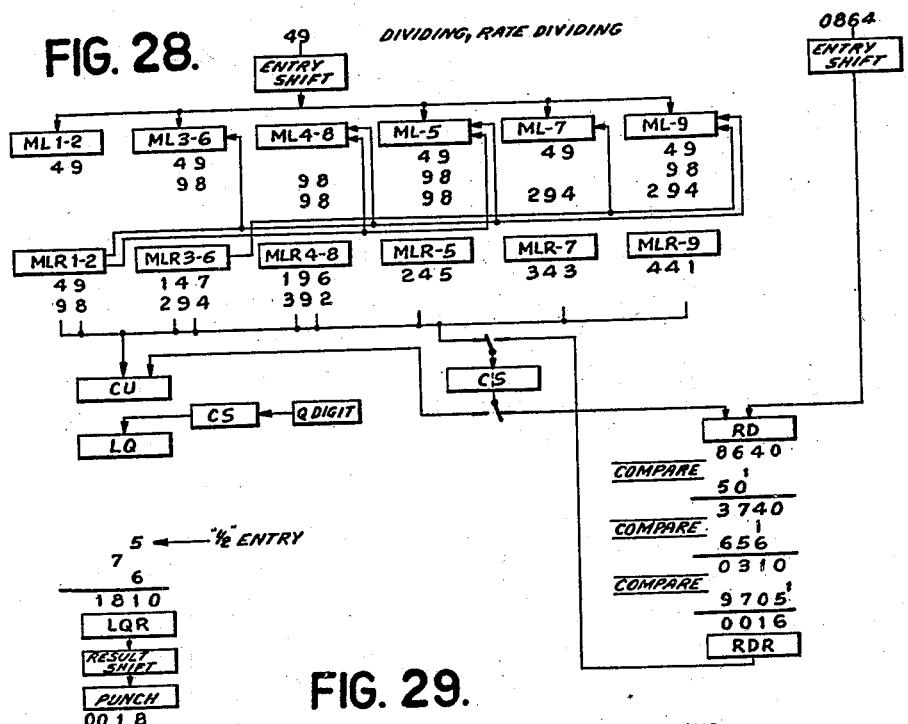
Figure 29:
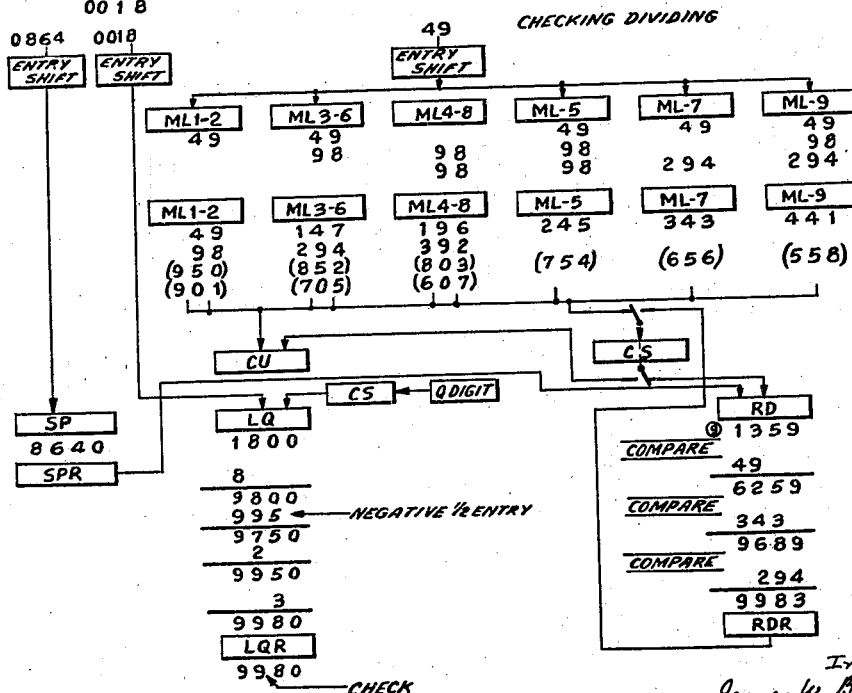

Figs. 23 to 25 inclusive, show the plugging on the insertible plugboard for different calculations which the machine is adapted to perform. Accompanying each figure is a suitable descriptive legend designating the computation for which the plugboard is plugged;

Figs. 26 and 27 are sequence of operation diagrams for different typical calculations which the machine is adapted to perform. These diagrams show the successive cycles of operation for these different computations. The respective diagrams also bear suitable designating legends indicating the type of computation to which the diagram relates;

Figs. 28 and 29 show flow diagrams of typical computations as performed by the machine. These show illustrative problems and the manner of effecting entry into the various receiving devices and how the machine performs different typical computations. Each diagram is accompanied by a designating legend giving the particular calculation which is illustrated in the diagram.

Machine drive

Figure 1:
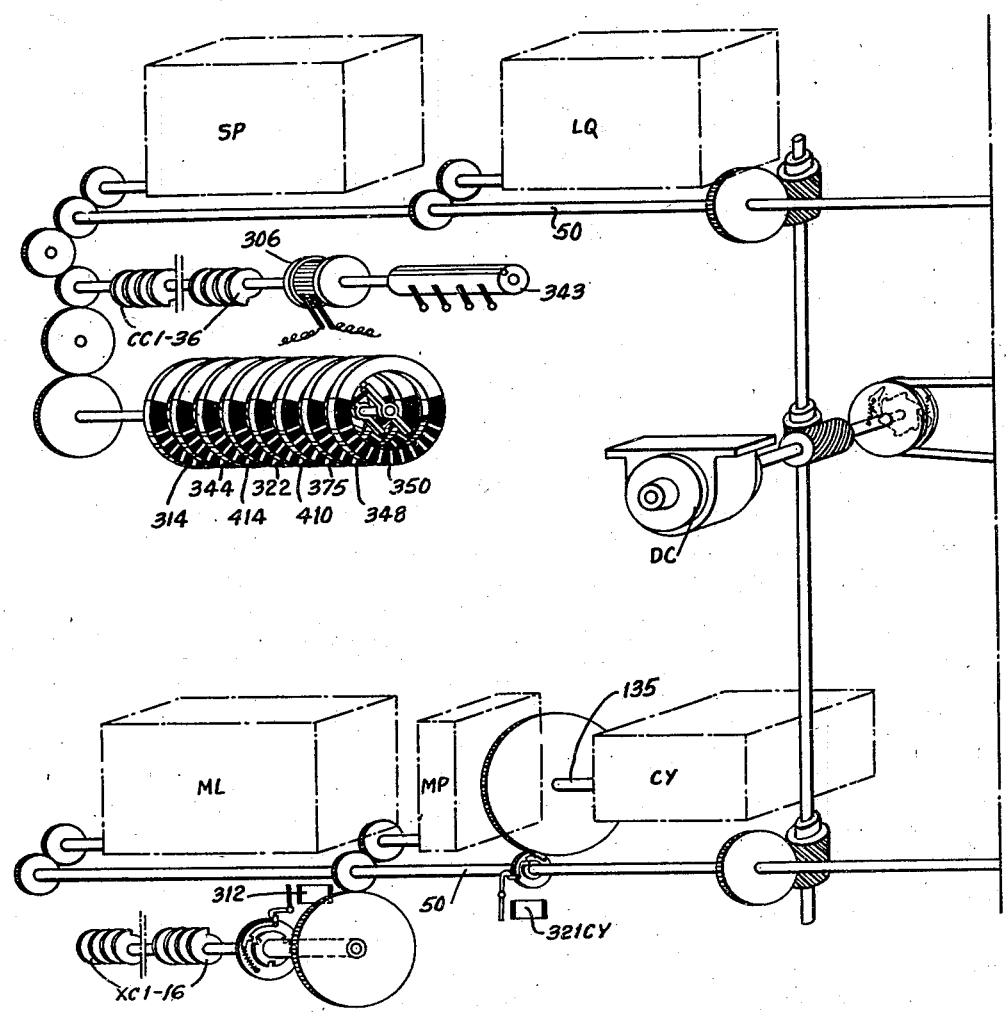
Figure 2:
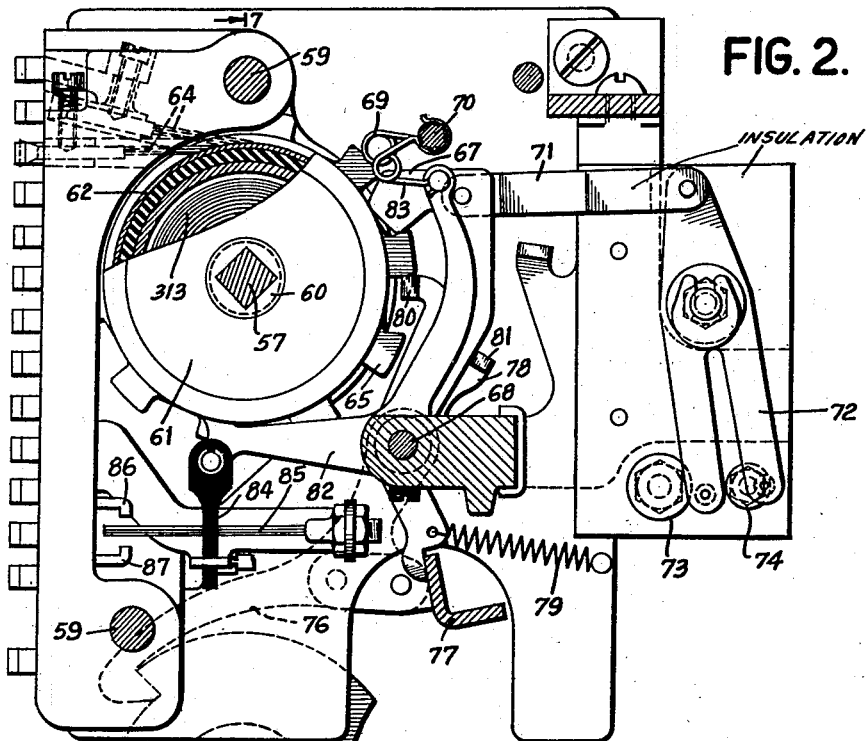
Fig. 2 is a detail sectional view of the accumulator taken along the dividing line between two adjacent denominational orders of such accumulator or entry receiving devices.

Referring first to Figs. 1 and 1a, in general the machine comprises five accumulating units which are respectively designated SP, LQ, RD, ML and MP. It may be explained that the unit ML contains accumulators and readouts from which all of the nine digital multiples of the divisor can be derived when the machine is used for division. The accumulating units LQ and RD, respectively, receive the quotient amount and the dividend amount. The SP unit is utilized on checking computations. The various accumulating units are driven by the gearing delineated from the driving motor M. The machine is also provided with a direct current generator DC. The card handling and feeding section of the machine is of customary form like that shown in Daly Patent No. 2,045,437 and is driven in the usual manner. The FC cam contacts are also driven in the customary manner in synchronism with the drive of the card handling section of the machine. The units designated N—R and TT are electromechanical relay setup units of the general construction shown in Figs. 16 and 17. Each of these units is adapted for reset from the constantly running drive shaft by the customary one revolution clutch arrangement. The reset magnets for the units are respectively designated 321N—R and 321TT. The comparing units are shown diagrammatically at CU—CU. These comparing units are of the form shown in Figs. 12 to 15 inclusive and such units are adapted to be driven from the drive shaft by the use of the well known one revolution clutch, the clutch magnet being designated 342.

Also driven from the main drive shaft are the usual CC cams, designated CC1—36, and an impulse distributor 306, a constantly running commutator 343 and in addition there are also provided eight impulse emitters which are designated 314, 344, 414, 322, 410, 375, 348 and 350.

Referring now to the XC1—16 cam contacts, such cam contacts are driven from the drive shaft through a one revolution clutch which is controlled by magnet 312. The driven side of the one revolution clutch receives its drive from the main drive shaft through the gearing shown, which drives one of the XC1—16 cams one revolution for each three revolutions of the main drive shaft.

For clarity and subsequent description, the upper and lower drive shafts will be given a like reference numeral 50.

Accumulators and entry receiving devices

As stated, the SP, LQ, RD, ML and MP units are accumulators of electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in Lake and Pfaff application Serial No. 182,402, filed December 30, 1937. This accumulator will now be briefly described.

In lieu of driving the accumulator by the customary jaw clutch, the present accumulator which is shown in Figs. 2 to 10 inclusive, is of the form in which a magnetic clutch is used for driving the accumulator element. Suitable circuit making and breaking devices are provided to enable the differential clutch action to take place at a differential time of the cycle depending upon the time of sensing. These devices cause the magnetic clutch to remain in action until a definite point in the cycle whereby definite amounts of rotation of the accumulating wheel are obtained in accordance with the initiating differential impulse.

Figure 10:
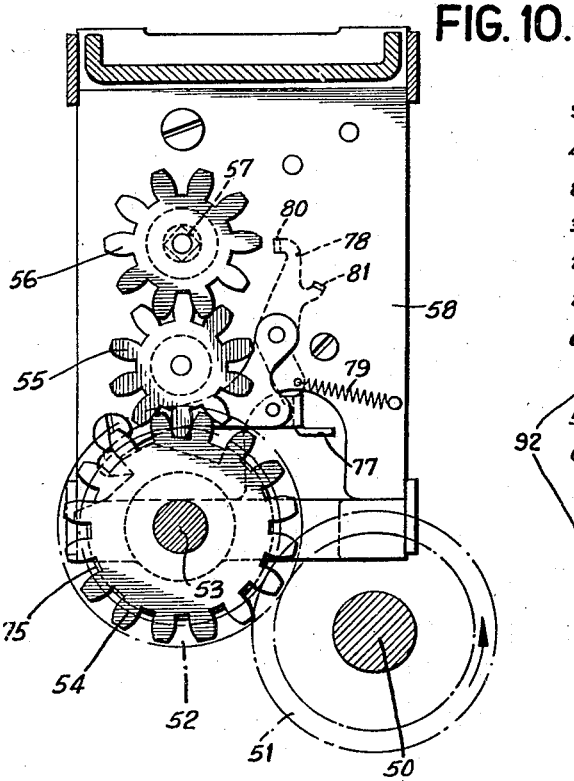
Fig. 10 is an outside view of the accumulator, viz. the view taken from the right of Fig. 8 and looking to the left and which view shows the gear drive for the accumulator unit.
Figure 9:
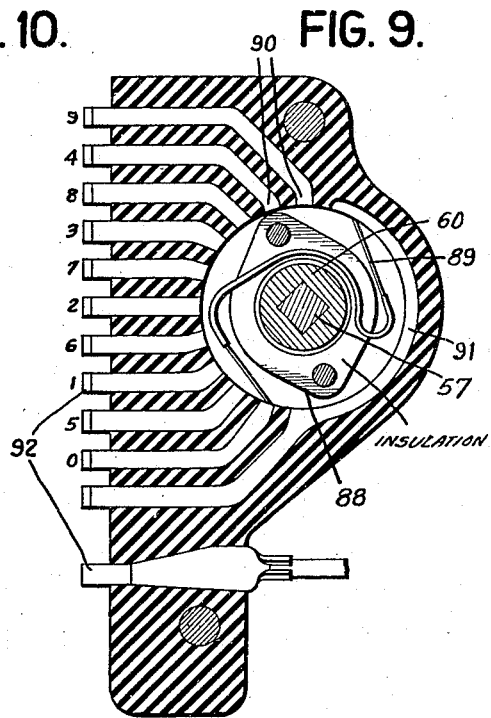
Fig. 9 is a detail view of the readout commutators and wiring to the plug prongs, the section is taken substantially on line 9—9 of Fig. 8.

Referring to Fig. 10, 50 is the drive shaft which is in constant rotation. This drive shaft through suitable gears such as 51 and 52 drives an accumulator drive shaft 53. Shaft 53 carries a gear 54 which through an idler 55 drives a gear 56 carried by a square shaft 57 which is thus also in constant rotation. The shaft 57 is suitably supported in bearings carried in the side plates 58 of the accumulating unit. Between the side plates are suitable spacing cross bars 59 (see Figs. 2 and 7), holding the plates in spaced relationship and aiding in the support of the accumulator mechanism. The accumulator units may be made in any desired number of orders. On the square driving shaft is a fitted bushing 60 (see Figs. 7 and 9). Around this bushing 60 there is rigidly secured a magnet yoke 61.

Figure 7:
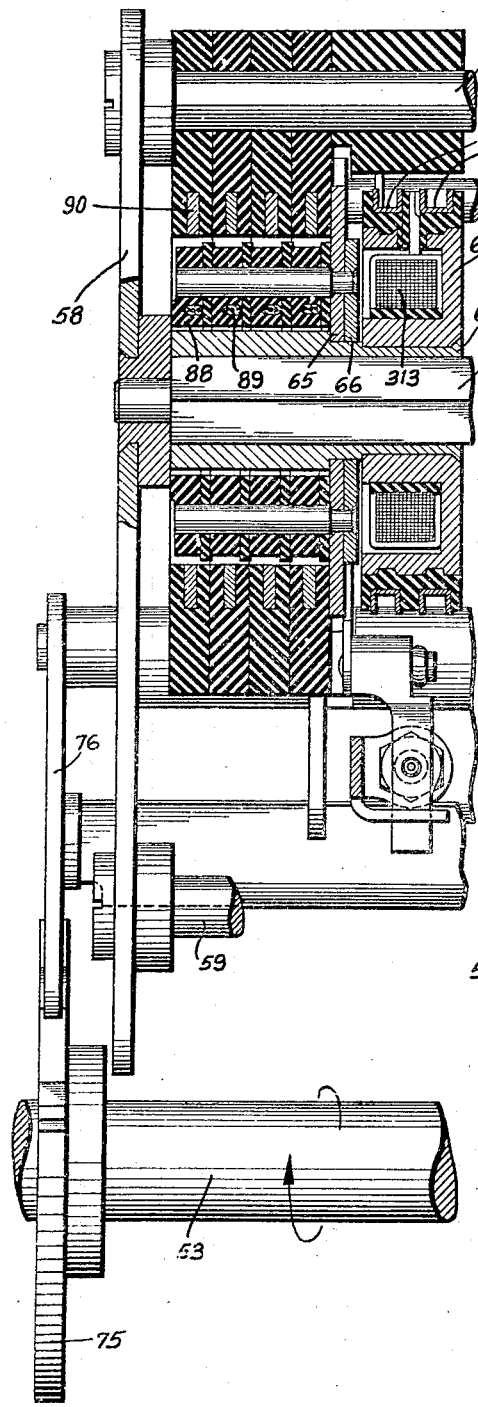
Fig. 7 is another fragmentary sectional view of the accumulator unit of Fig. 2, the view being taken substantially along line 7—7 of Fig. 2 looking in the direction of the arrows. This view in particular shows the readout structure in cross-section.
Figure 8:
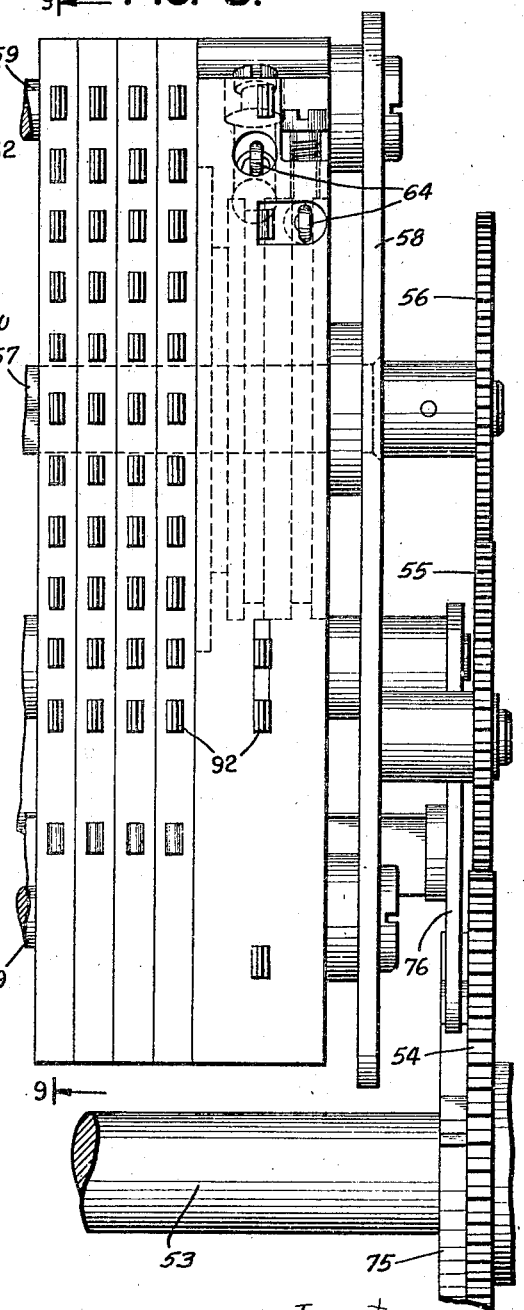
Fig. 8 is an elevational outside rear view of the accumulator unit of Fig. 2, the view being taken from the left of Fig. 2, looking to the right.

Carried about the periphery of yoke 61 and insulated therefrom and from each other there are a pair of channel shaped collector rings 62 to each of which is connected one end of a magnet winding 63 secured and positioned within the yoke. Trailing against each ring 62 there is a brush 64 which is carried in a suitable brush holder. The yoke with its winding rings constitute the driving element of the accumulator clutch whose driven elements include the toothed wheel 65 and tens carry cam 66. The wheel and cam are riveted together as indicated in Fig. 7 and the rivet fastenings also afford driving means for the readout brush holders. Such parts are mounted for free rotation on the bushing 60. As shown there is a slight air gap between the end of the yoke 61 and the carry cam 66. Wheel 65 is provided with ten teeth (see Figs. 3 and 4), between two of which when the wheel is at rest there extends the nose of a lever 67. Such lever is freely pivoted on a rod 68. Such lever is held in the position shown in Figs. 2 and 4 by a looped wire spring 69 connected at one end to a rod 70 and its other end to a pin in the nose of lever 67. The spring 69 and the lever 67 form a toggle with the pin urging the nose in contact with the wheel 65. When the clutch magnet winding is energized, the wheel 65 and the cam member 66 are magnetically clutched to the yoke 61 and commences to rotate therewith.

Figure 3:
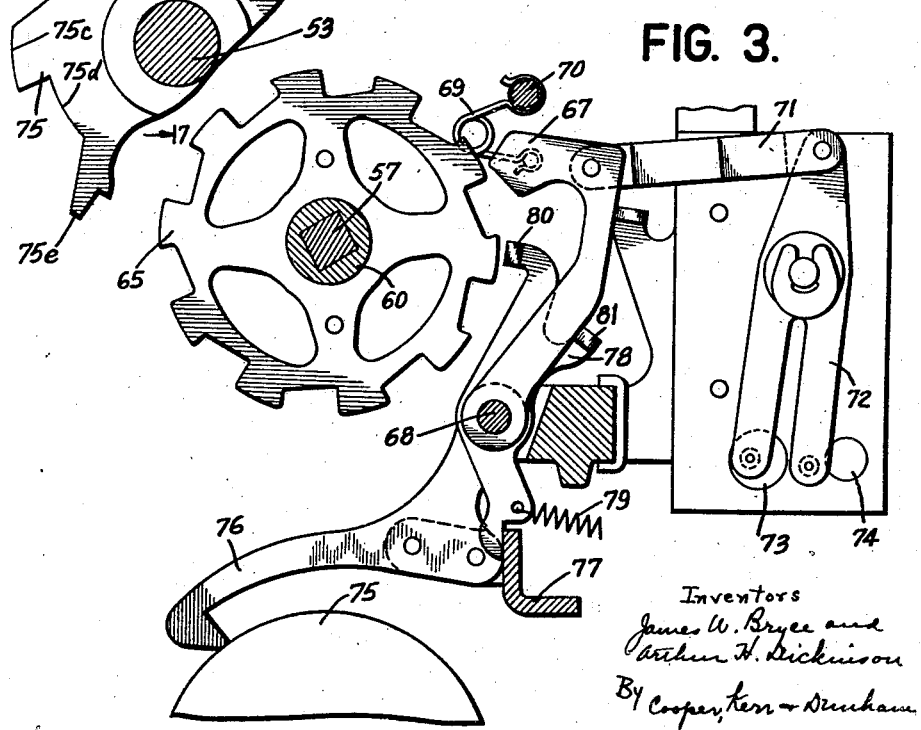
Fig. 3 shows certain parts of Fig. 2 in a different position.

Energization of the clutch magnet is afforded by the usual differentially timed impulse which may be received from the sensing section of the machine or from other controls affording an initiating timed impulse. As the wheel 65 commences to turn the edge of one of its teeth bears against the upper inclined edge of the nose on lever 67 and cams the lever clockwise as viewed in Fig. 2 about its pivot 68 carrying the lower end of the spring 69 to the right of a line between centers 68 and 70. This position of the parts is shown in Fig. 3. The parts will remain in such position until wheel 65 is again disengaged from the driver. Lever 67 when rocked by a tooth shifts an insulated link 71 shifting a contact member 72 to the position shown in Fig. 3. When in this position a circuit is completed through the forked member and a contact spot 73. This establishes a folding circuit to maintain the clutch magnet energized.

It may be mentioned that before shifting, an arm of member 72 was establishing contact with a contact point 74. The arrangement is such that a make before break action occurs as the lever shifted. It will be understood that the clutch magnet is energized at a differential time and that the amount that the wheel 65 is rotated is dependent upon the differential time of receiving an impulse. De-clutching action at a fixed time in the cycle is brought about as follows: On shaft 53 there is a cam 75 with which a follower 76 cooperates. The follower is integral with a bail 77 which extends across a plurality of units of different denominational orders. For each order there is a lever 78 pivoted on rod 68 and having a lower tail portion bearing against the bail 77 (see Figs. 2, 3 and 4). Each lever is provided with a spring 79 which urges the follower 76 against its cam 75. Each lever 78 has lateral extensions 80 and 81, the former lying in the plane of the wheel 65 and the latter extending behind lever 67.

Figure 4:
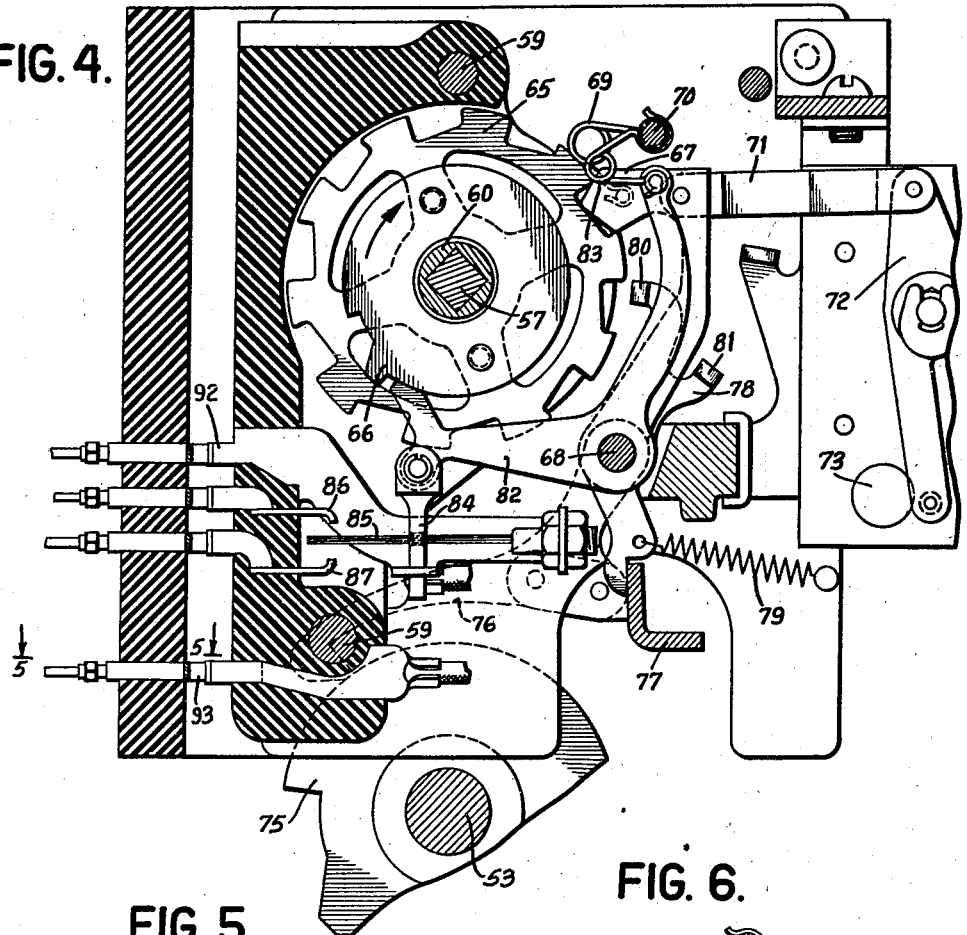
Fig. 4 is another sectional view of one of the accumulator units, the view being generally similar to Fig. 2, but taken on a somewhat different vertical plane.
Figure 5:
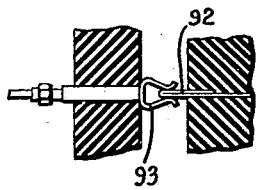
Fig. 5 is a detail view taken substantially along line 5—5 of Fig. 4.
Figure 6:
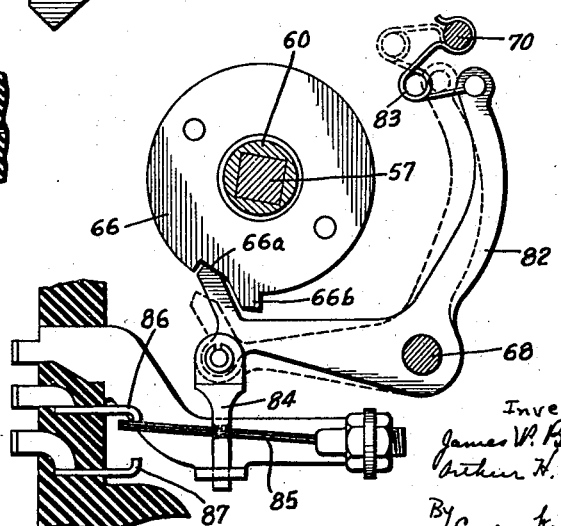
Fig. 6 is a detail view of the tens transfer or carry cam and related parts.

The operation is such that during the entering period of the cycle the follower 76 rides on the intermediate concentric portion of cam 75 holding bail 77 and through it the lever 78 in the position shown in Figs. 3 and 4. At the zero index point in the cycle the follower 76 drops off the cam and the bail 77 allows the lever 78 to rock rapidly in a counterclockwise direction bringing projection 80 into the space between two of the teeth of the wheel 65. At the same time projection 81 engages the lever 67 swinging it back from the position of Fig. 3 to that of Fig. 2 thus causing the holding circuit of the clutch magnet to be broken. It may be mentioned that the clutch magnet circuit is established by the member 73 and is broken when 72 moves off this contact.

When the clutch magnet circuit is interrupted projection 80 will engage the leading edge of a tooth on the wheel 65 and positively interrupt further rotation of the now released accumulating wheel. At the same time the trailing edge of the engaged tooth is overlapped by the nose of the lever 67 to prevent retrograde movement of the parts. Continued rotation of the cam 75 will, through portion 75c thereof, again release wheel 65 for a possible tens carry operation and portion 75d will again interrupt the wheel after a single step of movement. Finally the highest portion 75e of cam 75 will cause lever 76 to rock an additional amount in a clockwise direction to restore the tens carry lever 82, if the same had previously been rocked counterclockwise by the carry devices now to be described.

Carry mechanism

Carry cam 66 (Fig. 6) is provided with a notch 66a and a rise 66b. The carry lever 82 pivoted at 68 has its nose held against the carry cam by means of a looped spring 83, which urges the carry lever 82 clockwise. The lever 82 carries an insulating depending member 84 through which the brush 85 extends to make contact with either of contacts 86 or 87. Normally the parts occupy the relation of Fig. 4 with the brush lying intermediate the contacts. When the wheel 65 has been advanced to a "9" position, cam 66 is in the position shown in Fig. 6, wherein the nose of the lever 82 is in the notch 66a, thereby affording contact between brush 85 and contact 86. When the wheel 65 passes through "0" rise 66b on cam 66 will rock the lever 82 to its dotted line position in which position spring 83 will now hold it since the point connection between the spring 83 and the lever 82 is now to the left of the line between centers 70 and 68. As a result the brush 85 is shifted to engage contact 87 and will remain in such position until after the carry portion of the cycle when the high portion 75e of cam 75 will cause lever 76 to rock lever 82 back to the position of Fig. 4.

Readout structure

Attached to each accumulator wheel is the readout mechanism. It will be understood that any desired number of brush sections can be provided driven by a single accumulating wheel 65 (see Fig. 7). According to the present invention in some instances four brush structures are driven by a single accumulator wheel and in other instances two brush structures are driven by a single wheel. Fig. 7 shows the four brush structure arrangement. Such structure comprises a holder 88 of insulating material having a wire brush 89 fitted within a groove in the holder. The groove it will be understood conforms with the general shape of the center part of the brush. In the plane of each brush 88 there are commutator segments 90 and a common arcuate segment 91. Each brush 89 serves to make electrical connection between the related common segment 91 and each of the segments 90 according to the position of the brush upon advance of the accumulating wheel 65. Since the wheel 65 has ten teeth, it moves a tenth of a revolution for each unit entered. Segments 90 are spaced one-twentieth of 360 degrees apart so that the brush 89 stops at the segments in the order in which they are numbered in Fig. 9. In the position shown zero segment 90 is connected with the common segment 91.

The segments 90 and 91 as well as the circuit to the carry brush 85 terminate in beveled contacts 92 (see also Fig. 5) so that ready connection can be made to the unit by means of the bifurcated blades 93.

Comparing units

The comparing units of the present machine are of the form more fully described in the copending United States application of Ralph E. Page, Serial No. 117,493, filed December 24, 1936. As shown in Fig. 1a, two comparing units are illustrated, each designated CU. These comparing units receive their drive through the one revolution clutch 342 from the drive shaft 50. Upon energization of the clutch magnet 342 the shafting and gearing generally designated 94 is caused to rotate through one complete revolution. It may be explained that for dividing calculations the comparing unit drive is maintained in constant motion. Such comparing unit is wholly disconnected upon multiplying calculations.

Figure 13:
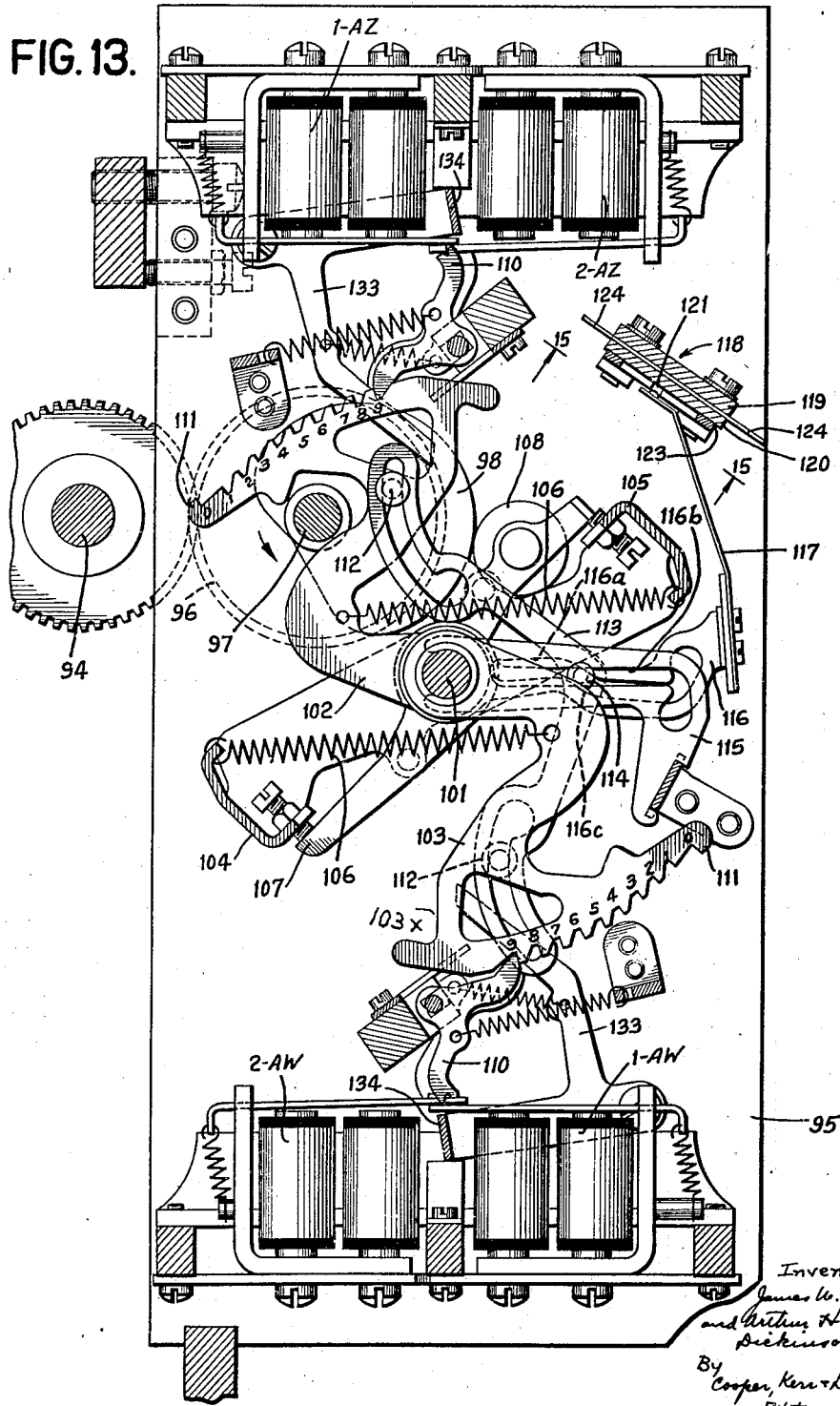
Fig. 13 is a detail sectional view of the parts for one order of a comparing unit, the section being taken along line 13—13 of Fig. 12.

Comparing units will now be more specifically described. Each comparing unit comprises supporting side plates 95 which are secured together by suitable cross members which also afford support for various parts such as magnets, bails and springs. Each comparing unit is provided with a drive gear 96 (see Figs. 12 and 1a). Such gear 96 is fast to the comparing unit drive shaft 97 (see also Figs. 12, 13 and 14). Each shaft 97 has secured to it a pair of bail operating cams 98 and a pair of restoring cams 99 and 100. Suitably secured in the side plates is a cross-shaft 101 on which are pivotally mounted in interspersed relation two series of sectors, one of which is designated 102 and the other of which is designated 103 in Fig. 13. It will be understood that there is a pair of such sectors 102 and 103 for each denominational order in which comparison is to be effected. The sectors are adapted for pivotal rocking movement on the supporting shaft 101 and timed rocking movement is imparted to the sectors by bails 104 and 105 which bails are each connected to their respective sectors by springs 106. The bail 104 projects through the planes of the sectors 132 and is connected to the sectors by means of the springs 106 which tend to hold the surfaces 103x of the sectors in abutting engagement with the bail 105. Similar abutting engagement is provided for between sectors 102 and bail 105. In Fig. 13 the sectors are shown arrested and the bails have moved away from the sectors. Initially and during the bail and sector movement until the sectors are arrested by the stop pawls the sectors abut and maintain contact with the bails. This mechanism is more fully described in British Patent No. 523,652.

Rocking movement is imparted to the bails by bail actuating levers 107 (one of which only is shown in Fig. 13). Each of such levers carries a cam follower roller 108 which cooperates with a cam 98. The cam follower rollers 108 are maintained in cooperation with cams 98 by means of springs 109 which are attached to the bail arms and to a fixed support as shown in Fig. 14. Differential movement of the sectors is determined by magnetically tripped stop pawls 110 (see Fig. 13). Such stop pawls are normally latched by their related magnet armatures out of the path of the ratchet teeth on the sectors. The comparing magnets are generally designated AW and AZ. It will be understood that the AZ magnets control the related upper sets of sectors 102 and the lower comparing magnets AW control the movement of the lower sectors 103. For compactness of construction the magnets are disposed in a somewhat staggered relation, which will be apparent by inspection of Fig. 12. In Fig. 13, the two lower comparing magnets 2—AW and 1—AW are adapted to control two adjacent sectors one of which is behind the other.

Upon energization of a comparing magnet such as 1—AW at a differential time its armature will release the stop pawl 110 which will swing under the influence of its spring to engage the sector ratchet and differentially stop it in a position corresponding to the differential time at which an impulse is received to energize the comparing magnet. In Fig. 13, the sector 103 is shown as stopped at the "9" index point position and likewise the sector 102 is also shown stopped at the "9" index point position. In the event that there is no energization of a comparing magnet the stop pawl 110 will stop its related sector at the "0" index point position due to the high shoulder 111 beyond the zero position.

Each sector 102 and 103 carries a pin 112 and each of these pins extends through slots in a differentially floating link 113. Each differential link has a pin 114 carried thereby and extending therethrough. Each such pin 114 is slidably guided for in and out movement with respect to the shaft 101 by means of a slotted member 115. Also cooperating with each pin 114 is a member 116. Member 116 has a cam slot portion 116a comprising a straight portion, another straight portion 116b and a connecting sloping portion 116c. The relation of parts is such that if sector 103 has the same setting as sector 102, for example at the "9" index point position as shown in Fig. 13, the pin 114 will remain at the center in the sloping cam portion 116c. Under this condition there will be no movement of the arm 116. On the other hand when pin 114 is caused to move to the right as is the case when sector 102 moves to a greater extent than sector 103, then member 116 will be rocked upwardly or counterclockwise about 101 as a pivot. This counterclockwise movement of 116 occurs when the amount set in sector 102 is less than the amount set in sector 103. On the other hand when the amount set in sector 102 is greater than the amount set in sector 103, the pin 114 will move to the left or into the 116a cam slot portion of 116. This will cause clockwise swinging of 116 about 101 as a center.

By the above mechanism for any order of the comparing unit it is possible to compare two numbers in a given order and to get three selective settings of 116. One setting is made when the numbers are equal in which case there is no movement imparted to 116, and it remains in the center position. The other conditions are an upward or downward displacement of 116.

Figure 15:
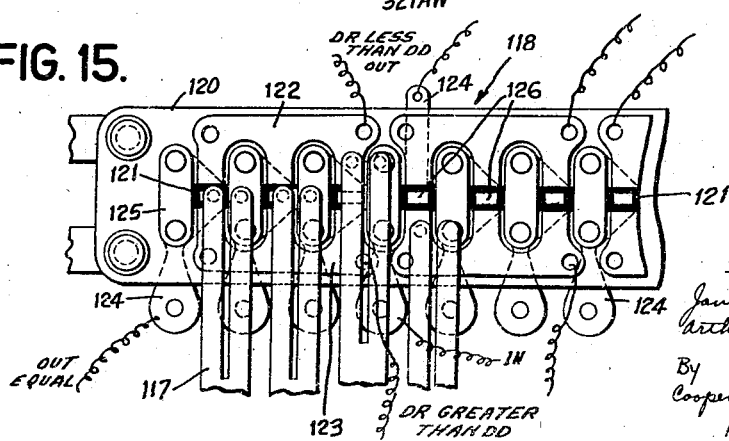
Fig. 15 is a fragmentary detail view of the comparing commutator and brush devices of the comparing unit, the view being taken substantially on line 15—15 of Fig. 13, looking in the direction of the arrows.

It will be understood that in order to provide for comparison of multi-denominational numbers that there are a pair of sectors 102 and 103 for each order and further that there is a member 116 for each order. Each member 116 has secured to it a brush contact bifurcated wiping member 117 (see Fig. 15). In Fig. 15 there are shown four wiping members 117. The two of the extreme left are in non-shifted or middle position. The second from the right is in upper position indicating that its sector 103 has moved to a less extent than its related sector 102 and the extreme right hand wiping member is in down position, indicating the reverse sector condition.

Suitably mounted upon the side plates in cooperation with the brush members 117 is a comparing commutator generally designated 118. This comparing commutator comprises a base plate 119 and a face strip 120 of insulating material supported by other strips of insulating material 121. Suitable fastening rivets secure the parts together and secured to the face of 120 are common contact strips 122 and 123. Located between the strips 119 and 120 are a series of terminal plates 124 having portions which extend beyond the edges of the commutator for circuit connections. Parts of terminal plates 124, to a certain extent, resemble triangles with their points extending to the right, note the dotted line extension in Fig. 15. Carried on the face of the strip 120 are a number of contact plates 125, each of which is connected to a related terminal plate 124. The contact strips 122 and 123 are serrated and arranged so that the serrations pass each other and extend into the spaces between the contact plates 125. The ends of the serrations of 122 and 123 and between 125 are blocks of insulating material 121 having contact rivets 126 which connect with the respective terminal blocks 124.

It may be explained that the comparing commutator is sectionalized for making comparison of five orders with five orders. With the setting shown for the five brushes to the extreme left in Fig. 15, the circuit will come in at the wire marked "in" to block 124. It will extend through 125, through the brush 117, thence to plate 122 and out on the circuit labeled "DR less than DD". However, assume that the right hand brush is in the middle position. In this event, the circuit would extend from the "in" wire to contact block 125, through brush 117, through the segment 126 of the next order to the left, thence through contact block 125, through the brush 117 of this order, again through 126 and 125 pertaining to the next orders, through the brushes 117 of these orders, through the block 126 and 125 and out on the "Out equal" wire. On the other hand assume the right hand 117 brush of the five order unit is in down position. The circuit comes in on the "in" wire, through the contact block 125, through the brush 117, and is then completed through the lower serrated member 123 to an out line labeled "DR greater than DD."

With reference to the comparing commutator, it may be explained that the first brush from the right in any group which has moved off from the central or equal position effects the control. For example, assume that the third brush 117 from the left in Fig. 15 is in middle position and the second brush from the left is in upper position, then in that event the circuit would be completed from the "in" line, through the terminal block 124, through block 125, through the brush 117 in say the tens order, through spot 126, through block 125, through brush 117 to contact plate 122 and out. In short, it may be stated that it is the highest order shifted brush which is controlling for purposes of comparison.

In the use of the comparing units it is desirable to set up one side of the comparing unit once and then hold the setting and it is also desirable that the other side of the comparing unit be set up, then restored and set up again for a following comparing cycle. In order to provide for this operation certain bail movement controlling mechanisms are provided, which will now be described.

Referring to Fig. 14, it will be noted that the bail 105 is provided with a spring pawl 127 and that bail 104 is provided with a spring pawl 128. Arranged to cooperate with 127 and 128 are pawls 129 and 130 which pawls may be considered as normally having the latched position as shown. Upon clockwise swinging of bails 104 and 105 the pawls 127 and 128 first yield and ride upon the face of pawls 129 and 130. When the end of the bail movement is reached, the pawls 127 and 128 snap into the position shown, thereafter both bails 104 and 105 will be latched against return movement. If it is desired therefore to retain the setting of an upper sector 102 (Fig. 13) magnet 321AZ (Fig. 14) is left de-energized. So long as this magnet is left de-energized, the previous setting of sector 102 or a plurality of such sectors will be retained.

Referring now to the lower sector 103, it is desired that this sector be reset on each comparing cycle. Accordingly, magnet 321AW (Fig. 14) is energized. Upon the attraction of its armature, pawl 130 will swing under the influence of its spring in an anti-clockwise direction out of intercepting relation with pawl 128. Accordingly, ball 104 can have an anti-clockwise restoring movement to restore the sector or sectors 103 cooperating therewith.

Arms 132 (Fig. 14) are oscillated by cams 99 and 100 once each machine cycle and such arms are provided for the purpose of knocking off the armatures of magnets 321AZ and 321AW whenever any armature has been tripped and such frame is also adapted to restore the pawls 130 and 129 to their latched position. When the bails 104 and 105 are swung counterclockwise to restore the sectors, the pawls 110 (Fig. 13) ride up on the smooth high parts of the sectors beyond the nine ratchet tooth position and thus displace the pawls out of the line of the ratchet teeth. At about this time the leading edge of a bail such as 104 engages a pivoted armature restoring member 133 and rocks it clockwise to displace the bail 134 and therefore knock off the armatures and re-latch the stop pawls 110.

Electromechanical relay unit

Referring to Figs. 1 and 1a there are three electromechanical relay units which are generally designated CY, N—R and TT. These units are identical in construction, except for the number of contacts and only one of them will be described. Each unit has a drive shaft 135, the drive shaft is adapted to make one-quarter of a revolution for each revolution of the main drive shaft 50 when the related one revolution clutch (for example) that controlled by magnet 321CY, (Fig. 1) is operated.

Figure 17:
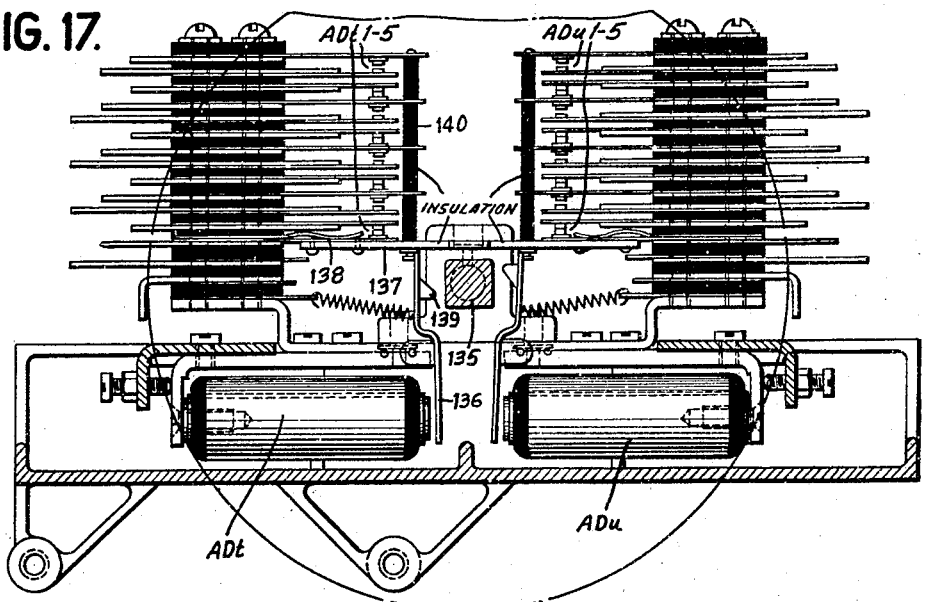
Fig. 17 is a detail sectional view of such unit, the section being taken substantially on line 17—17 of Fig. 16.
Figure 16:
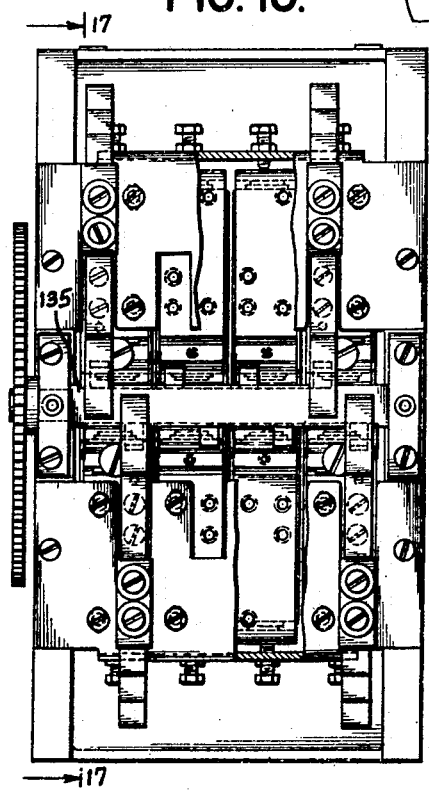
Fig. 16 is a top plan view of an electromechanical multi-contact relay unit which is used in the machine for cycle control and pre-sensing control purposes.

Referring now to Figs. 16 and 17 the shaft 135 is suitably journalled as shown and intermediate the journals the shaft is provided with a square cross-section as clearly shown in Fig. 17. In general the contact operation of this unit is as follows: Each relay unit comprises the required contacts which may include normally closed contacts, transfer or shift contacts and normally open contacts. Each set of contacts has a tripping magnet associated therewith. Such tripping magnets are ADt and ADu. Upon energization of either of these magnets their contacts will be tripped so that they shift to reverse position from that shown. Such contacts thereafter remain in such shifted position until the shaft 135 makes one-quarter of a revolution, whereupon the contacts are mechanically restored to their initial position. Such contacts are then latched in such position. The rotation of the shaft 135 also mechanically knocks off the armatures and also mechanically restores the contacts to their initial position.

The details of these electromechanical relay units form the subject matter of a copending application of James M. Cunningham, Serial No. 135,503, filed April 7, 1937.

Referring to Fig. 17, ADt is one of the tripping magnets. Cooperating therewith is a spring retracted armature 136 which has its upper portion in contact with a latch piece riveted to an insulating strip 137 to which the lowermost contact blades are riveted. Suitable springs such as 138 bias the lowermost contacts and the strip 137 downwardly. The insulating strip 137 extends along and overlies the square shaft 135. It will be self-evident that upon energization of a magnet ADt related contacts will shift to reverse position and remain in such position. Thereafter, upon one-quarter of a revolution of shaft 135 one square corner of the shaft will first abut the insulating strip 135 and lift it to upper position restoring the contacts and slightly later another corner of the square shaft intercepts a camming element 139 integral with the armature 136 and positively shifts the armature from the magnet into latching position.

The construction is substantially duplicated for the right hand section of the unit. It will be understood that the upper contacts of a set are shifted by insulating members 140.

Insertible plugboards

Figure 18:
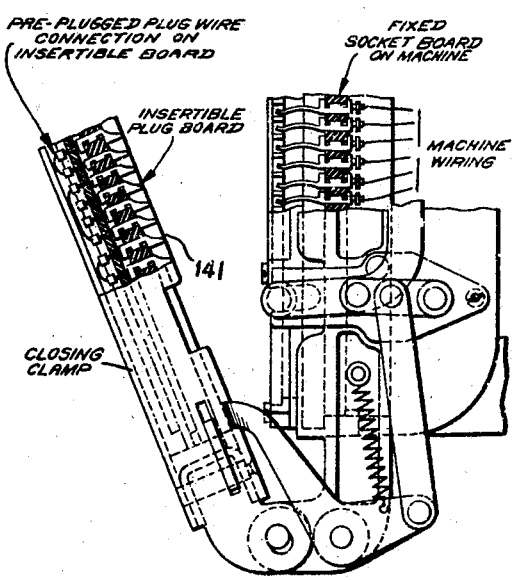
Fig. 18 is a detail view of one of the automatic plugboard units used in the machine, this view showing the plugboard unit in open position.

In order to quickly shift the machine controls from one status in which it is capable of effecting one type of computation to another status for effecting another type of computation use is made of insertible plugboard elements. This insertible plugboard construction is of a type known in the art and the insertible plug unit is generally indicated at 141 in Fig. 18. Devices of this type are generally known as "automatic plugboards" and a suitable form of such board is shown and fully described in the copending application of C. D. Lake, Serial No. 10,299, filed March 9, 1935. Such automatic plugboard arrangement comprises a series of relative fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be pre-plugged with a desired set of connections.

Referring to Fig. 23 on regular dividing, the dotted line connections are omitted and on rate dividing all of the dotted line connections and all of the solid line connections are utilized with the exception of solid line connection 143 which is removed. The same changes as are made for Fig. 23 are made for dividing and rate dividing in Fig. 24.

Referring to Fig. 25, the supplemental dotted line connections are used with checking dividing with the one-half pick-up and they are omitted when this feature is not used.

It may be explained that the plug socket reference numerals as used on the circuit diagram will have similar reference numerals to those used on the diagrammatic plugboard views on Figs. 23 to 25 inclusive.

Cam timing diagrams

The cam timing diagrams, Figs. 19 to 21 inclusive, are self-explanatory. It should be noted that the CC cam contacts make one revolution per machine cycle. The FC cam contacts of Fig. 20 on the other hand make one revolution per card feed cycle, which comprises two machine cycles. The XC contacts of Fig. 21 make one revolution for three machine cycles.

Before describing the details of the circuit diagram and the operation of the machine in detail the general operation for division will be briefly explained.

Dividing

When the machine is to be used for dividing, the amount of the dividend and divisor are read from the record. The divisor amount is entered into five accumulative type receiving devices. The amount of the dividend is entered into its receiving device. Following this entry cycle wherein amounts are derived from the record, there is a building up of multiples of the divisor. Before explaining the manner in which these multiples are built up, it may be stated that certain of the entry receiving devices which receive the divisor amounts are provided with so-called "doubling readouts." These doubling readouts are fully described in British Patent No. 456,367. In the machine cycle following the entry cycle twice the amount of the divisor is read out from the readout associated with the ML1—2 accumulator and such doubled divisor amount is entered into ML3—6, ML4—8, ML5 and ML9. On the following machine cycle twice the divisor amount is again read out from the doubling readout of ML1—2 and entered into ML4—8 and ML5. Concurrently and during this same cycle, six times the divisor amount is read out from the doubling readout associated with ML3—6 and such divisor multiple is entered into ML7 and ML9. This completes the building up operation for all digital multiples of the divisor.

It may be mentioned, however, that upon entry of the divisor amount from the record into the receiving accumulators the divisor entry is shifted by a column shift mechanism so that the highest significant digit always appears in the extreme left hand order of the receiving accumulator ML1—2. The dividend amount is also derived from the record and such dividend amount is entered into the RD accumulator. The dividend entry is also made in a manner such that the highest significant digit is entered into the highest order of the accumulator or clear to the left. The purpose of making the divisor and dividend entries in shifted relation is to save operating cycles during the dividing calculations. Control of entry shift for both the divisor and dividend entries is made by pre-sensing each record to ascertain the location of the highest order significant digits of both these amounts. Having ascertained the orders in which such digits of the divisor and dividend occur a selective control is set up and upon entry there is a shift to the left to an extent determined by the control which is set up.

When the machine is effecting division, certain comparing units are utilized. These comparing units are generally of a type described in the co-pending application of R. E. Page, Serial No. 117,493, filed December 24, 1936. Two of such comparing units having a potential comparing capacity of thirty-two columns are utilized in dividing calculations.

When dividing is to be effected a comparison portion of the dividend, i. e. a determined number of orders thereof to the extreme left, is derived from RDR and such dividend comparison portion is set up in each section of the comparing units. Concurrently and in the same machine cycle with such set up, there is also set up in each of said sections a multiple of the divisor. Different multiples of the divisor are set up on different comparing unit sections. Having set up the comparison portion of the dividend and the different digital multiples of the divisor in this manner, the comparing units proceed and affect a comparison. This comparison is effected in the same cycle in which entries of amounts were made into the comparing unit sections, comparing being instantaneously effected after entry. This comparing operation of the comparing unit sections determines which divisor multiple is greatest in magnitude that is equal to or just less than the comparison portion of the dividend. Having made such determination, a selective control is set up based on the comparison, that is to say, if the 4 divisor multiple is determined to be the greatest going multiple there is a selective control related to 4 set up.

Following the comparing operation the complement of the highest going divisor multiple is read out from its related readout and this complementary amount is entered into the RD accumulator bringing about a deduction of the divisor multiple from the comparison portion of the dividend in such accumulator. Along with this deducting operation the related quotient digit is entered into the quotient receiving accumulator LQ. The same operations are then repeated for a new comparison portion of the dividend. Before comparison is effected, of course, the dividend receiving side or sections of the comparing unit sections are restored to zero in order that a new comparison portion of the dividend may be introduced therein.

The foregoing continues with proper columnar shift after each operation until the dividing computation is completed.

It may be mentioned that the machine is provided with certain place limiting devices and controls to terminate operations when either a certain desired quotient columnar position is reached or to terminate operations when the capacity of the machine is reached.

When dividing operations are completed the machine is ready to record the quotient back on the record. However, in such recording, which is under the control of LQ, there is a relative shift back of the quotient entry on the record. This so termed "shift back" is made under control of devices which are set up according to the original shift of the divisor and dividend upon their entry. The shift back for recording is according to a definite law which will be subsequently explained in detail.

*Rate dividing*

On rate dividing computations, the divisor amount appears on the rate or master cards which are provided with a special perforation. On passage of this master card through the machine the divisor multiples are built up on the various ML devices and the settings are retained until a new master card passes through the machine, whereupon there is a break down and a new multiple of the divisor is set up. The dividend amount is derived from each detail card, dividing operations occur for each detail card and the amount of the quotient is placed on each detail card. Computing and recording operations are eliminated for master cards except that the divisor multiples are built up from readings derived from such card.

On rate dividing there is a pre-sensing of the divisor field to ascertain the position of the highest significant digit containing column of the divisor. A control is set up in accordance with such pre-sensing which is retained for all succeeding detail cards of the group following the master card.

It may be also explained that all cards including the master cards and detail cards are pre-sensed in both the divisor and dividend fields, but the control from the master card is only set up from the divisor field, the pre-sensing of the dividend field of this card being ineffective. On following detail cards while there is again pre-sensing of both the divisor and dividend fields the set-up control is from the dividend field and the divisor field pre-sensing control is ineffective. Shift back on final recording is under the control devices set up from the divisor field of the master card and from the dividend fields of following detail cards.

Checking dividing

On this type of operation the different digital multiples of the divisor are built up on the various ML devices in the customary way. The dividend amount is read from the card and entered into SP in a shifted to the left relation. The previously recorded quotient is also read from the card and entered into LQ in a shifted to the left relation. Following these entries and during one of the building up cycles the complement of the dividend is read out of SP and entered into RD. Dividing operations then ensue. However, in such dividing operations in place of comparing true amounts, i. e. a true comparison portion of the dividend against the true divisor multiples, the comparison is effected between the complement of the comparison portion of the dividend against the complement of each divisor multiple. This brings about a different numerical comparison because entirely different digits are used. Having effected comparison in this complementary manner the comparing unit controls which are selected as a result of the comparison are such that they select the highest multiple whose complement is equal to or just greater than the comparison portion of the complement of the dividend. Thereafter the true amount of the multiple is entered into the RD accumulator and concurrently with this operation the complement of the quotient digit related with the selected multiple is entered into LQ. Successive complementary comparing and entry operations ensue until a number of complementary quotient digits equal in number to the number of digits in the previously computed quotient are obtained and entered. If the computations are correct the accumulator elements of LQ will stand at 9 which signifies a check condition. This condition will cause a reset of certain accumulators and an initiation of a new checking operation pertaining to a following card. If a non-check condition is detected, further machine operations terminate until there is a manual operation to restart it and remove the incorrect card.

Half-entry feature on division

The machine includes rounding off mechanism to permit the recording of amounts to the nearest one-half. When such mechanism is used, if the machine is set say for a 3 place quotient, the use of the one-half control will cause the machine to compute to one further place in which place a 5 is added, but on final recording there is a discarding of such last place. When the one-half entry has been used on original runs for dividing and when checking is effected of such former runs which involve a one-half entry, the one-half entry is compensated for on the check run by a complementary one-half entry. That is to say, in lieu of adding 5 there is a subtraction of 5, subtraction being effected by complementary addition.

Regular dividing

The operation of the machine will first be explained with reference to regular dividing.

Before describing this operation it may be stated that the circuit diagram of the instant application has been shown with a limited columnar capacity. For simplicity of illustration, the capacity as shown by the circuit diagram is for a mechanism of four columns in the dividend field and two columns in the divisor field. It will be appreciated that in actual practice the machine would have a greater columnar capacity. Greater columnar capacity involves merely a parallel duplication of circuits and relay contacts, etc.

Figure 22A:
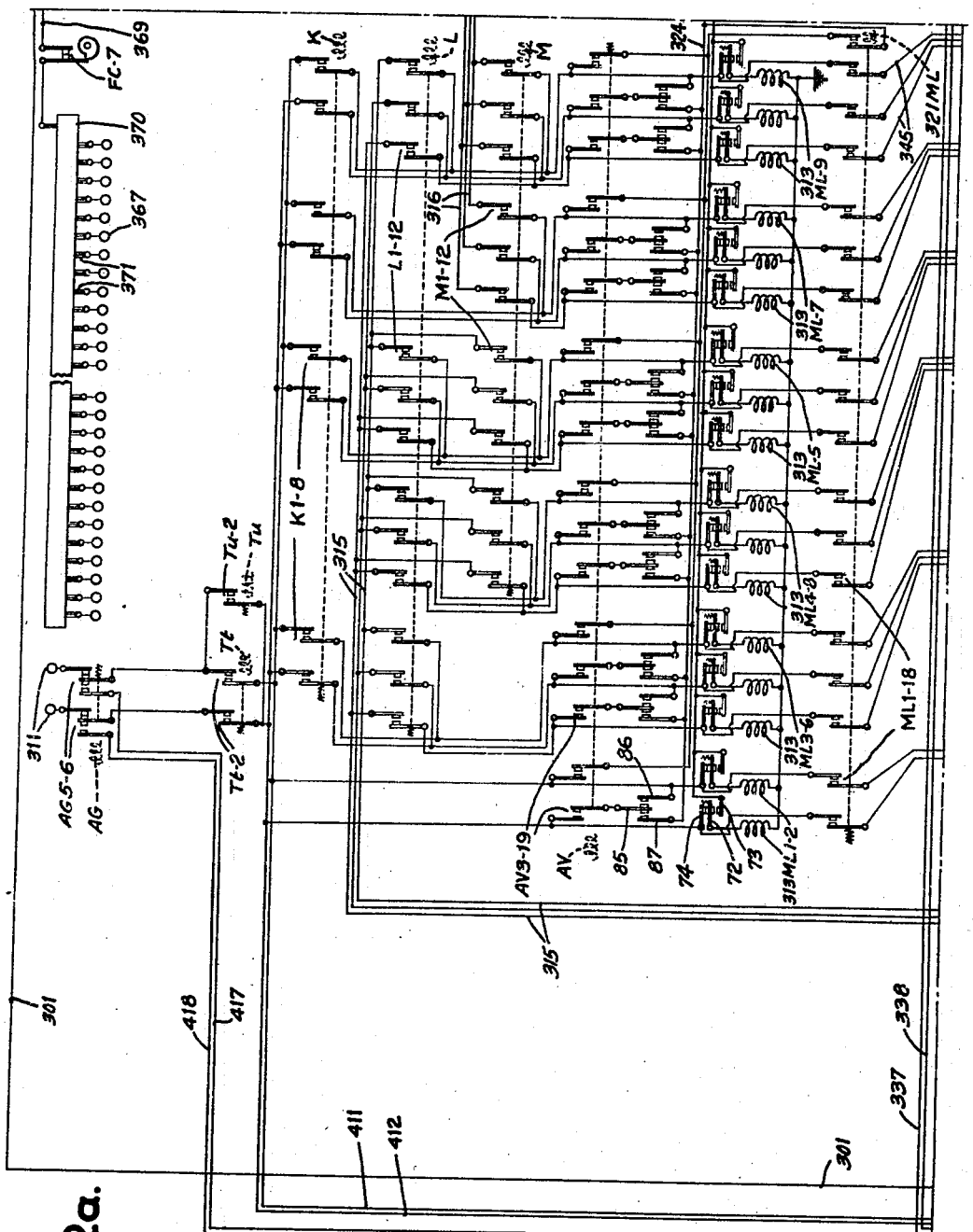
Figure 22B:
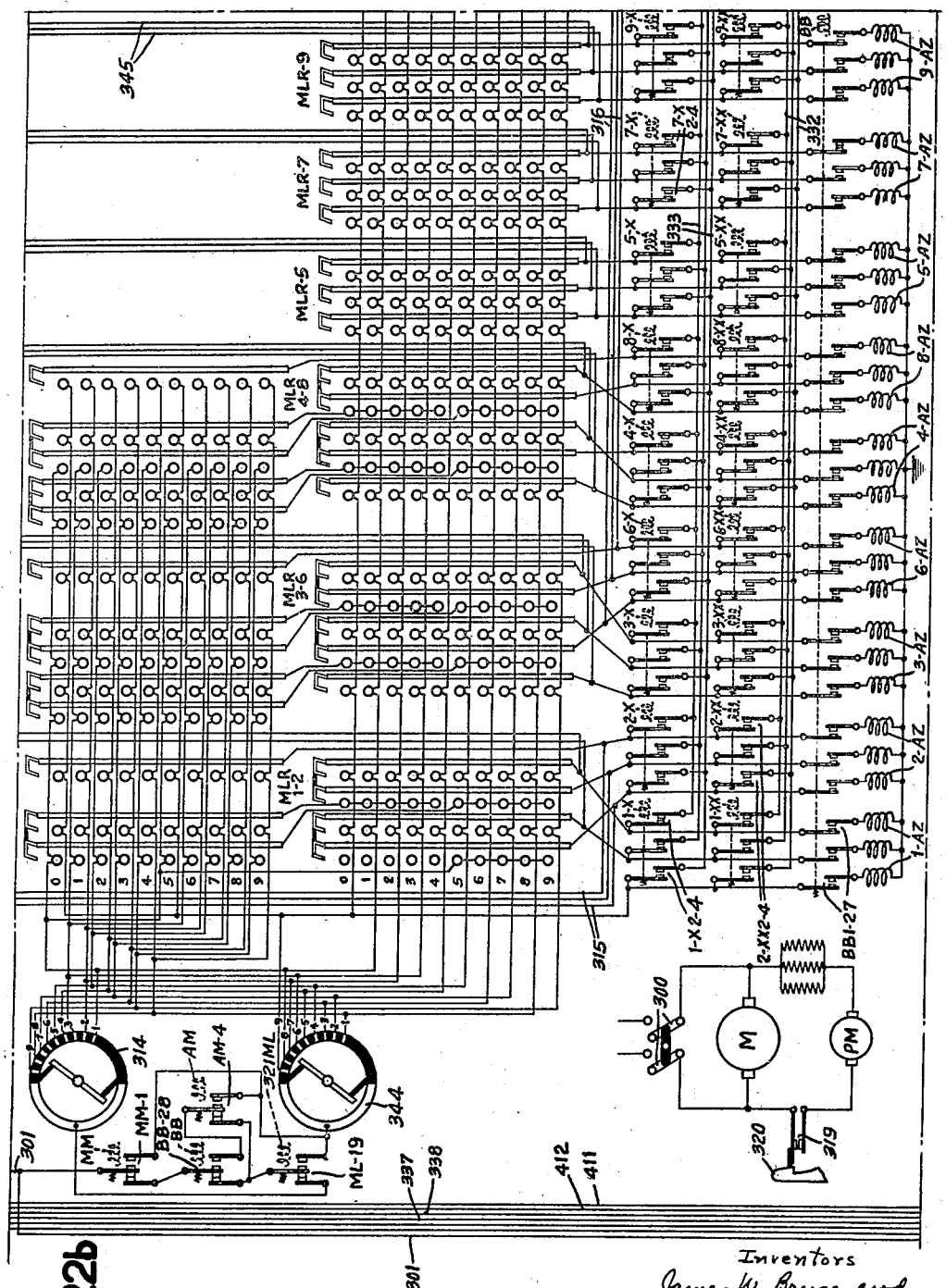

It will be assumed that a set of record cards are in place in the supply magazine of the machine. The operator then closes switch 300, supplying current to driving motor M (Fig. 22b). With the main driving motor M in operation the DC generator marked "DC" (Fig. 22d) is set in operation supplying current to ground and to DC line 301. The operator now depresses start key 302 (Fig. 22d) and a circuit is completed from ground through to the FC3 contacts through relay contacts F1, through the start key contacts back through relay coil E to line 301. Relay coil E upon being energized is maintained energized by a stick circuit through relay contacts E1 and cam contacts FC2. The energization of relay coil E closes relay contacts E2 and a circuit is completed from ground through relay contacts AJ12 (Fig. 22h) through cam contacts CC29, via wire 380 through the punch controlled contacts P1 (Fig. 22d) and the E2 contacts now closed, through the JJ2 contacts, through the stop key contacts 303 now closed, through the card feed clutch magnet 304, back through the D1 contacts in the position shown to line 301. A card is now fed by the card feeding and handling section of the machine and is advanced towards the reading brushes in the usual way. In starting up the machine on a run of cards, the start key must be maintained depressed for two card feed cycles or it may be depressed and released and redepressed.

During initial card feed cycle certain idle operations occur which may be alluded to. Punching does not take place because there is no quotient to record and the card has not reached the punch. Late in the second machine cycle of the card feed cycle the card lever contacts 305 close, bringing about an energization of relay coil G. Energization of relay coil G brings about a closure of relay contacts G1 (Fig. 22e) which affords current supply to the FC6 contacts. These contacts upon closure permit current to be supplied to the impulse distributor 306 from which current impulses flow to the card transfer and contact roll 307. The usual regular reading brushes 308 are provided which are connected to plug sockets generally designated 309.

With the present machine, as explained before, special plugboard slides are provided for each computation. The plugboard slide for a regular dividing operation is provided with the plug connections as shown in Fig. 23, in which corresponding reference numerals appear to those on the circuit diagram. This plugboard slide will be pre-wired as shown in Fig. 23 and inserted in the slide holder prior to starting up the machine for a regular dividing operation. A plug connection made between sockets 364 and 382 maintains relay coil AK (Fig. 22h) energized throughout dividing computations.

Pre-sensing and entry shift controls

Referring to Fig. 1a, the set-up relay units N—R and TT are provided, which in general construction, are similar to the CY unit previously described and shown in Fig. 17. In the N—R and TT units the tripping magnets are designated N and R with suitable suffixes indicating columnar order and in the TT unit the magnets are designated TT with suitable order suffixes. It will be understood that these magnets, N, R and TT are generally similar to the AD magnets of Fig. 17. Only the N—R unit, however, is used in regular and rate dividing computations.

The insertible plugboard affords plug connections between sockets 383 (Fig. 22g) and sockets 367 (Fig. 22a) for the divisor field and other plug connections are provided between 384 and 367 for the dividend field.

Figure 11:
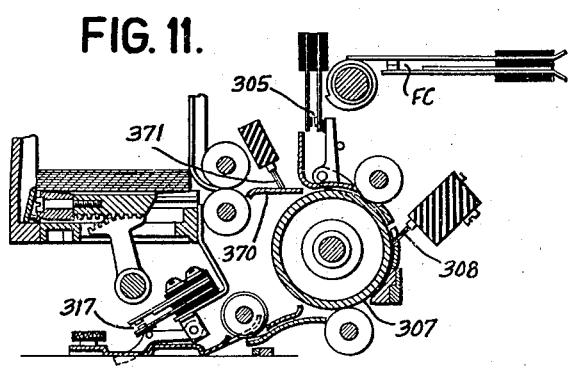
Figure 12:
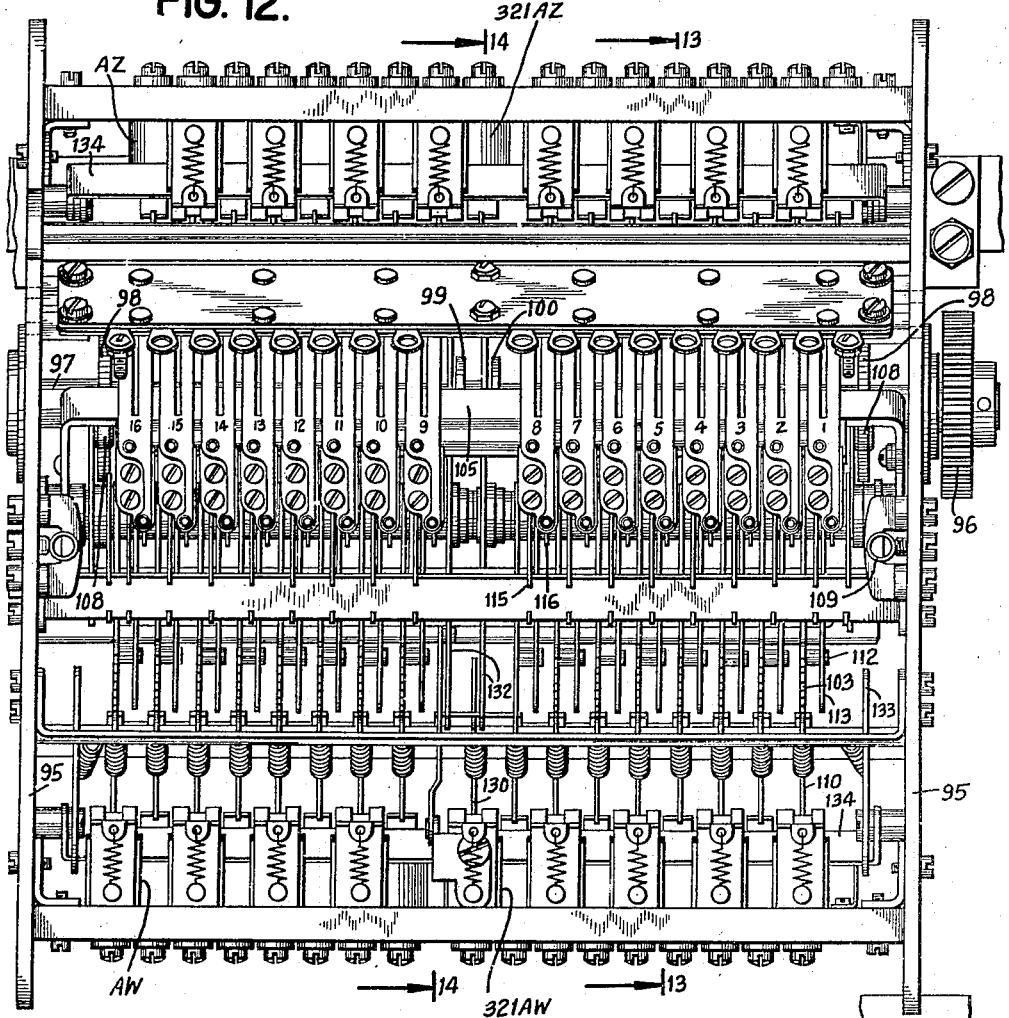
Fig. 12 is a rear elevational view of one of the so-called comparing units of the machine.

During the card feed cycle when the first card is brought to a position about to be traversed by brushes 308 (Fig. 11) this first card will have traversed the advance pre-sensing brushes 371. The card will finally come to rest with such advance brushes on the "11" index point, but en-route to this point the brushes will have traversed the zero index point position of the card. During such transit the advance brushes pre-sense the presence of zeros to the left of the highest order significant digit of the amount in dividend and divisor fields.

It will be assumed that the machine is performing the division calculation of Fig. 28. With this particular calculation there is a zero to the left of the highest order significant digit, i. e. 8, in the dividend field. Accordingly, on transit of the card past the advance brushes a circuit is established traced as follows: Line 301 (Fig. 22e), through the G1 contacts now closed, via line 369, through cam contacts FC7 (Fig. 22a) which are closed at the time the zero index point of the card passes the pre-sensing brushes, thence to common conductor 370, through one of the brushes 371, through plug connection between socket 367 and the left hand socket 384 (Fig. 22g) through the non-shifted AN11 contacts, to and through the Nth magnet and back to ground. It will be understood that if there was a zero or zeros before the highest order significant digit in the divisor field one or more of the R magnets would be energized. With the Nth magnet energized, the contacts controlled thereby in the relay unit are tripped to reverse position from that shown on the diagram.

Upon re-depression or maintained depression of the start key and with relay coil G energized in the manner previously explained, relay contacts G4 (Fig. 22d) will become closed and a circuit will be established not only to the card feed clutch magnet 304 in the manner previously traced, but a branch circuit will be established through the AT1 contacts now in the position shown, through the now closed G4 contacts through the now closed AL2 contacts to a supplemental clutch magnet 312. This supplemental clutch magnet releases for rotation the group of XC cams which, upon release, function for three machine cycles.

Figure 22C:
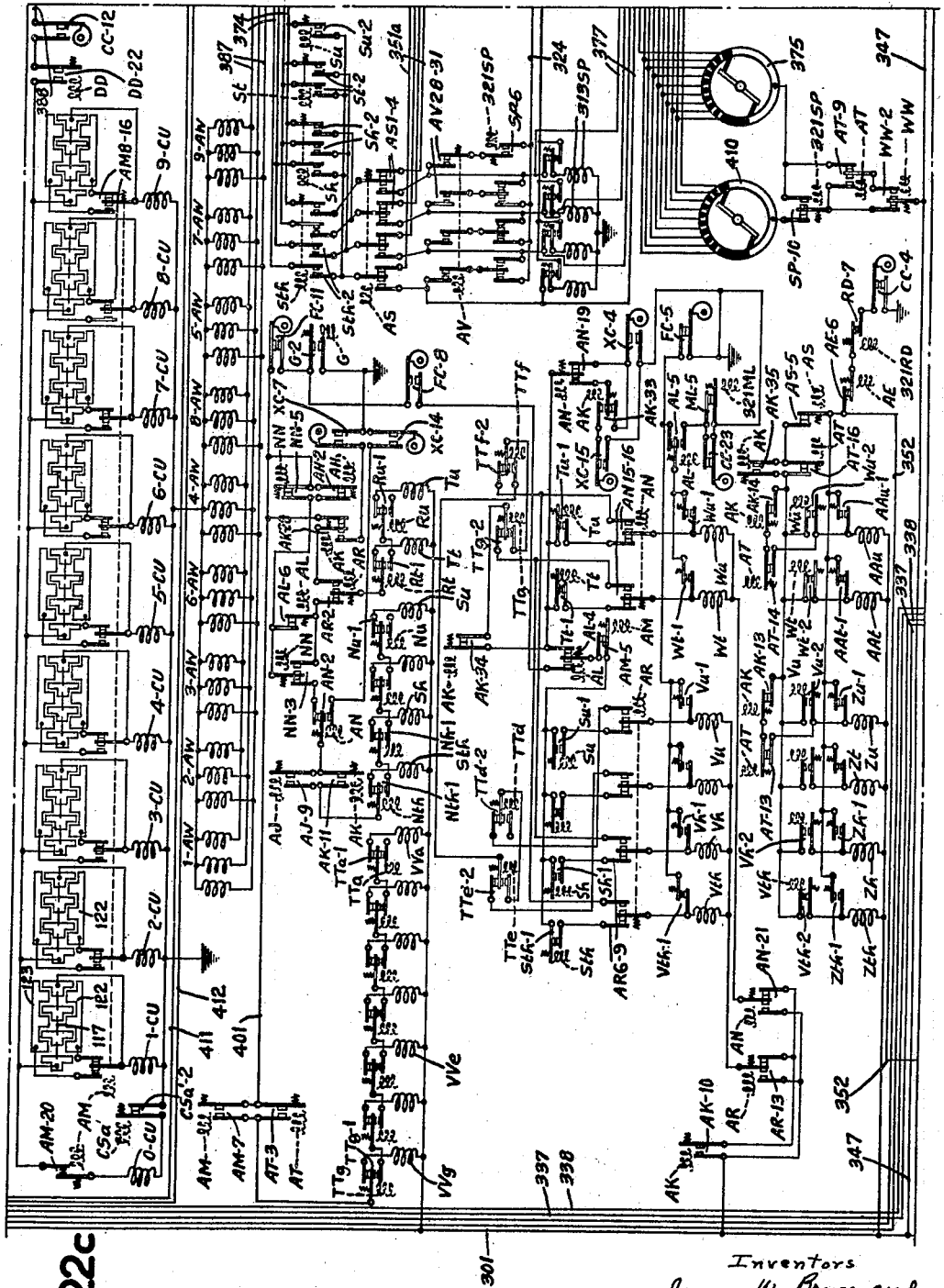
Figure 22D:
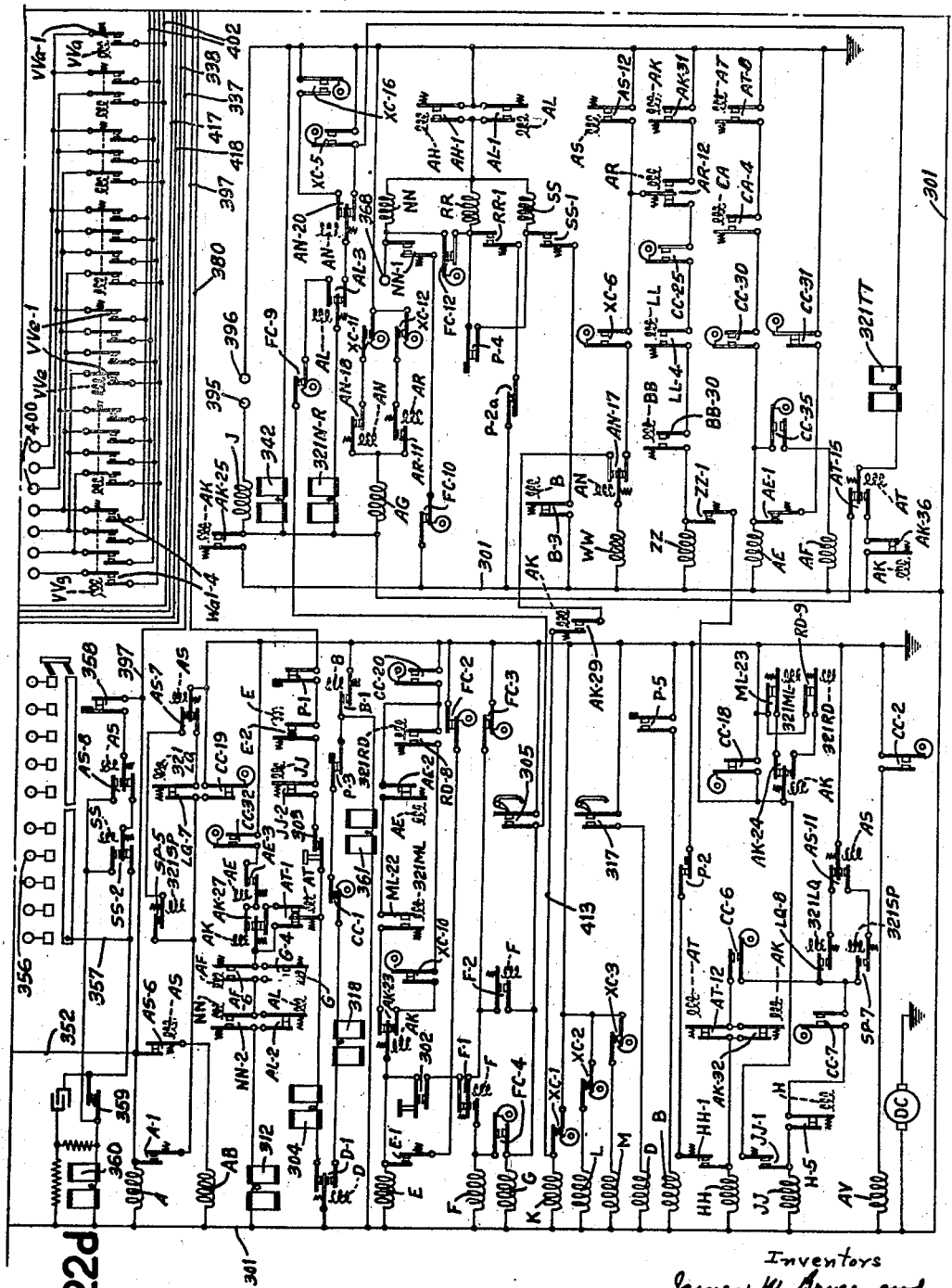

During this second card feed cycle, relay coil G causes closure of contacts G2 (Fig. 22c). Current flows from ground through the now closed G2 contacts, through cam contacts FC11, through either contacts NN5 or contacts AH2 in closed position, through relay contacts AL6 in the position shown, through AR2 contacts in the position shown, through the Rt1 contacts now in the position shown, through the relay coil Tt and back to line 301. The energization of coil Tt causes closure of the group of contacts Tt2 (Fig. 22a). These contacts remain closed during the entry portion of this feed cycle. Also during the entry portion of this cycle cam contacts XC1 close to energize relay coil K (Fig. 22d). With relay coil K energized, the K1—8 contacts (Fig. 22a) become closed.

With relay coil Tt energized, the Tt2 contacts (Fig. 22a) close and permit entry of the divisor amount into the ML devices. This divisor amount is entered through the 211ML plug sockets (Fig. 22a), through the AG5—6 contacts, through the Tt2 contacts now in closed position, down through the now closed K1—8 contacts.

It may be mentioned that with the problem under consideration (Fig. 28) there is no shift of the divisor on entry. Assume, for example, that in place of 49 as the divisor that the divisor was 09. In this event magnet Rt (Fig. 22g) would be energized. With Rt energized contacts Rt1 (Fig. 22c) will be tripped to reverse position from that shown. Accordingly, in place of energizing relay coil Tt relay coil Tu would be energized. Such relay energization would be during the card analyzing cycle. Now referring to Fig. 22a with relay coil Tu energized the Tu2 contacts would be closed and if the entry circuit from these contacts be traced it will be noted that the 9 amount, in place of being routed to the units order 313ML1—2 accumulator magnet, would be routed to the tens order of such accumulator. The 9 likewise would also be routed to the tens order of the other multiple receiving accumulators which receive the amount direct from the card upon the entry cycle.

The amount of the divisor is entered into the following multiple receiving devices ML1—2, ML3—6, ML5, ML7 and ML9. On the circuit diagram the prefix reference numeral 313 refers to the accumulator magnets of these multiple receiving devices. These receiving devices are in the form of electrically controlled accumulators with electrical readouts. The ML1—2, ML3—6, ML4—6 receiving devices are provided with doubling readouts in addition to the usual straight readouts. The other multiple receiving devices are provided with straight readouts only. On the entry portion of the feed cycle, the amount of the divisor is entered into five of the multiple receiving devices concurrently.

*Building up of multiples*

On the machine cycle following the entry cycle, there occurs the first step in the building up of further multiples. As stated, the ML1—2 device is provided with a doubling readout. This is designated MLR1—2 on Fig. 22b. In this machine cycle cam contacts XC2 (Fig. 22d) close, energizing relay coil L. With relay coil L energized, relay contacts L1—12 (Fig. 22a) close and current supply is afforded for the adding emitter 314 as follows: From line 301 (Fig. 22b), through contacts MM1, BB28 and ML19 in the position shown, thence to emitter 314. From emitter 314 the impulses flow over to the transverse buses of the doubling section of MLR1—2, down through the piloting section of this readout and out via a group of lines generally designated 315. From these lines the impulses flow down through the L1—12 contacts (Fig. 22a) which are now closed and ultimately reach the ML3—6, ML4—8, ML5 and ML9 accumulators or multiple receiving devices. This operation will have completed the building up of the 3 multiple in ML3—6.

On the following machine cycle, the cam contacts XC3 (Fig. 22d) close, energizing relay coil M and causing closure of contacts M1—2 (Fig. 22a). With the emitter 314 in operation the times 2 multiple of the divisor is read out from MLR1—2 and flows via lines 315 and through the M1—6 contacts to the ML4—8 and the ML5 accumulators. This will have completed the setting of the 4 and 5 multiples on these receiving devices. During the same cycle in which these entries are being made, the 6 multiple of the divisor is read out from the doubling readout section of MLR3—6 and such 6 multiple flows via lines 316 (Figs. 22b, 22f, 22c and 22a), through the M7—12 contacts and finally reaches the ML7 and ML9 receiving devices. This operation will have completed the setting up of the 9 multiple on ML9 and the setting up of the 7 multiple on ML7. The multiple building up operations are now complete.

During the second card feed cycle, the record card from which the factors were read is advanced to the punch tray in the usual manner. Upon reaching this tray, the contacts 317 close (Fig. 22d) to energize relay coil D. The energization of relay coil D shifts relay contacts D1 to a reverse position from that shown cutting off current supply from the card feed clutch magnet 304 and providing current supply for the punch rack trip magnet 318 upon closure of cam contacts CC1 with contacts P3 and relay contacts B1 closed. The relay contacts B1 become closed upon energization of relay coil B upon closure of the customary last column punch contacts P5. With punch rack trip magnet 318 energized, contacts 319 become closed and remain latched closed in the customary manner by latch 320 (Fig. 22b). Current supply is then provided for the punch driving motor PM and endwise card feed occurs in the usual way to feed the card to the first product punching position.

Considering now the entry shift of the dividend amount it has been previously explained that relay coil Nth (Fig. 22g) was energized in the pre-sensing cycle. Such relay when energized trips the Nth1 contacts (Fig. 22c) to a reverse position from that shown. On the cycle when the card is analyzed and the dividend entry is made a circuit is established from ground through the now closed G2 contacts, through FC11, through either of the contacts NN5 or AH2, through the non-shifted NN3 contacts and the AN2 contacts, through the now closed AK11 contacts, to and through the tripped Nth1 contacts, through the non-tripped Nh1 contacts to the SH relay magnet and back to line 301. Energization of Sh (Fig. 22c) will close the Sh2 contacts and will establish a shifted entry relation for the dividend entry between lines 374 and lines 351a, which lines 351a (see Fig. 22g) ultimately connect to the 351 lines which lead to the 313RD accumulator magnets. By reason of the column shift contacts Sh2 (Fig. 22c) the dividend amount of 864 will be entered as far to the left as possible in the RD accumulator.

Summarizing, the foregoing includes a column shift arrangement between the lines coming from the reading brushes through the plugboard and the lines which lead to the RD accumulator. Selective column shift will be effected according to the number of zeros preceding the highest order significant digit. For example, if in place of one zero there were two zeros preceding the highest order significant digit of the dividend there would be a further column shift, this being effected by closure of the St2 group of contacts.

At this point it may be explained that it is necessary to retain a set up which corresponds to the entry column shift control for controlling final recording operations after the division calculation is complete. Such set up is retained on selected V and W relay coils (Fig. 22c). Relay coil Sh was energized and with such coil energized there will be an energization of Vh which relay is retained energized for controlling shift back upon recording. Likewise relay coil Tt was energized so there is a corresponding energization of Wt which relay is retained energized for controlling recording.

Referring to Fig. 22c before contacts FC11 open a circuit is established from ground through the XC4 contacts, the AN19, AL4, AM5 contacts in the position shown, through the now closed Sh1 contacts, through the AR7 contacts in non-shifted position, through the Vh relay coil, through the AR13 contacts in the position shown, through the now closed AK10 contacts and back to line 301. This will energize relay coil Vh and such coil, upon being energized, closes its stick contacts Vh1, the return circuit being completed to ground through cam contacts FC5 now closed. A branch circuit also extends through the now closed Tt1 contacts, through the non-shifted AN15 contacts to and through the Wt relay coil and back to line through the non-shifted AN21 contacts and the now closed AK10 contacts to line 301. Relay coil Wt once energized is maintained energized through the stick contacts Wt1 and the return circuit extends through the non-shifted AL5 contacts and FC5 cam contacts to ground.

It should be mentioned that during the second half of a card feed cycle there is a reset of the N—R set-up unit. Late in the first half of the card feed cycle cam contacts XC5 close (Fig. 22d) and a circuit is completed from ground through relay contacts AN20 and AL3, now in position shown, through the reset clutch magnets 321N—R through the now closed AK25 contacts to line 301. Energization of 321N—R releases the one revolution clutch (see Fig. 1a) so that any previously tripped N1 and R1 contacts may be latched up in order that they may again be tripped near the end of the card feed cycle when pre-sensing of a following record card is effected.

*Reset*

With relay coils B and D energized in the manner previously explained relay contacts B2 and D2 (Fig. 22e) become closed. Upon closure of cam contacts CC3, current will flow from the 301 line through these contacts, through the relay contacts AK1 now in reverse position, down through the now closed B2 contacts, the HH2 contacts now closed, the D2 contacts now closed and down through the AS9 contacts now in the position shown, to and through the 321LQ reset relay coil to ground. Reset will then be effected of the LQ accumulator.

The present machine employs electric reset and provision is accordingly made to maintain the 321LQ relay coil energized during the reset cycle. This is provided for by stick contacts LQ11, such contacts being in a stick circuit including cam contacts CC5. Upon energization of the LQ relay, contacts LQ6, LQ1—4 (Fig. 22h) and LQ5 (Fig. 22g) shift to reverse position from that shown. With LQ6 (Fig. 22h) in reverse position current supply is afforded to an emitter 322 which is wired in a nines complementary manner to one of the LQR readouts. Complemental impulses representative of the nines complement of the amount standing in LQ flow through the now shifted LQ1—4 contacts, through the set of lines generally designated 323 to the 313LQ accumulator magnets and back to ground (see also Fig. 22g). By thus introducing the nines complement of the amount standing in LQ the accumulator elements are restored to a 9 position. To bring the accumulator to zero from the all 9 position to zero, an elusive 1 is entered in the units order at the carry time in the cycle. This entry is provided through the contacts LQ5 which are closed in the manner previously explained. This impulse is supplied in the following manner: From line 301, through cam contacts CC16, via line 324, through the LQ5 contacts, through the normal carry relay contacts AV27 controlled by relay coil AV (Fig. 22d) down to the units order of the 313LQ magnets. The units order is thus advanced one step and the electric transfer devices of the accumulator cause advance of all the other higher orders one step.

It may be explained that as long as the machine is operating, cam contacts CC2 close once each machine cycle at the carry time in the operation of the accumulators. Such closure of cam contacts CC2 energizes relay coil AV. The energization of coil AV closes contacts AV1—2 (Fig. 22e), AV3—19 (Fig. 22a), AV20—23 and AV24—27 (Fig. 22g) and AV28—31 (Fig. 22c), which are respectively associated with the MP, ML, RD, LQ and SP accumulators. Since coil AV becomes energized once each machine cycle the aforementioned relay contacts thus close at the carry time. The closure of these contacts permits the electric carry devices to be effective for performing carry operations whenever they are required in their related accumulators.

During LQ reset, provision is made to prevent repetition of such reset. This repeat reset preventing means is provided for as follows: During LQ reset, the LQ8 contacts are closed (Fig. 22d). Accordingly, when cam contacts CC6 close, a circuit is provided from ground through the AS11 contacts, in the position shown, through the LQ8 contacts, through CC6, either through relay contacts AK32, or through the AT12 contacts to relay coil HH. Relay coil HH becoming energized, establishes its stick circuit through contacts HH1 and the punch controlled contacts P2 now closed. On Fig. 22e, the relay contacts HH2 open and thus interrupt the reset initiating circuit to 321LQ.

Computing operations of the machine are initiated by LQ reset. From the LQ8 contacts (Fig. 22d) a circuit extends to contacts CC7 and upon closure of these cam contacts relay JJ is energized, relay contacts H5 being now closed. JJ once energized is maintained energized by a stick circuit extending through contacts JJ1 through the now shifted AK24 contacts, through the reset contacts 321RD and back to ground. Coil JJ is the computing initiating control. Also upon LQ reset the LQ12 contacts (Fig. 22f) are closed. Accordingly, inasmuch as the machine is set for dividing and contacts AK7 are closed, current will be supplied through cam contacts CC17, through AK17, through LQ12 to the divisor reset coils 321AZ in the comparing units (see Fig. 14). This will release all of the divisor side sectors and allow them to be restored so as to be in position to receive a setting of the divisor multiples thereon.

The machine is now ready to compare the comparison portion of the dividend with all of the divisor multiples. In general this is effected by reading out a comparison portion of the dividend from the RDR device, setting such portion of the dividend up on one side of all sections of the comparing units and at the same time reading out from the multiple readouts the various divisor multiples, each of which multiples becomes set up on one section on the other side of the comparing units. This operation will now be traced on the circuit diagram.

On dividing calculations the comparing units CU are placed in operation. This is effected by maintaining energized the clutch magnet 342 (Figs. 1a and 22d). The circuit for energizing clutch magnet 342 is completed from line 301 through the closed AK25 contacts, through 342 and to ground. The maintained energization of 342 releases a one revolution clutch to place the drive shafts 94 and 97 of the Cu units (Fig. 1a) in timed operation with shaft 50.

A comparing cycle, is initiated by the energization of relay coil LL (Fig. 22f) which becomes energized in the following manner. As previously explained, the computing initiating relay JJ was energized upon LQ reset. Energization of such relay closes contacts JJ3 (Fig. 22f). A circuit is completed from line 301 (Fig. 22f) through the now shifted AK9 contacts, through the CC9 contacts and through all of the 9Cu1, 8Cu1, etc., transfer contacts now in the position shown and finally through the OCu1 contacts, through the JJ3 contacts now closed, through the LL relay coil and back to ground. LL once energized is provided with a stick circuit extending back to line 301 through stick contacts LL1 and cam contacts CC13. After the foregoing stick circuit is established cam contacts CC14 close and establish a circuit through the non-shifted H2 contacts to energize magnet 340SB of the SB stepping switch. With magnet 340SB energized the switch arms SB of this relay (Fig. 22f, top) are stepped to the first contact position.

Shortly after the switch arms of the stepping relay have advanced to this position, a circuit is completed from line 301, through the H4 contacts now closed, through cam contacts CC8, through the switch arm of the stepping relay, through the CSa column shift relay coil and back to ground. Another circuit is established through the CC11 contacts, through the LL2 contacts now closed, through the stepping relay switch arm, through the BB relay coil and back to ground. A branch circuit is also established to energize relay coil DD. With coils BB and DD energized, they are maintained energized by their respective stick contacts BB29 and DD1, the stick circuit extending back to line through cam contacts CC10.

It may be explained that column shift relay CSa and relay coil DD cooperate to control the readout of the dividend comparison portion from RDR and contacts BB are utilized to control the readout of the various divisor multiples from the MLR readout devices.

The manner in which a comparison portion of the dividend is set up on the comparing units will now be described. It will be understood that the comparison portion of the dividend includes a selected number of columns. The number of columns selected is determined by the CSa relay. Referring to Fig. 22c a circuit is completed from line 301, via wire 347 (see also Fig. 22g) to and through the now shifted DD9 contacts, to an add emitter 348. With such emitter in circuit, impulses are emitted through RDR, through the non-shifted RD1—4 contacts, via a set of lines 385, through the now shifted DD5—8 contacts, through the now closed CSa1—2 contacts, via lines 386, through the shifted DD2—4 contacts, via lines 387 (see also Fig. 22c) and to the dividend side comparing magnets generally designated 1AW, 2AW, etc.

It will be understood that the comparison portion of the dividend is set up in multiple in the comparing units, that is to say, there are nine identical set-ups, of the comparison portion of the dividend in order that there can be comparing between each set-up and nine different divisor multiples. In the typical problem under consideration, the comparison portion of the dividend which was so set up is the amount of 86 (see Fig. 28). The set-up of the multiples of the divisor on the other side of the comparing unit sections will now be described.

It has been previously explained how relay coil BB (Fig. 22f) becomes energized. With such relay coil energized all of the contacts BB1—27 (Fig. 22b) become closed. In addition the BB28 contacts shift to a reverse position. Add emitter 314 will be placed in circuit in the following manner: From line 301 to the non-shifted MM1 contacts, through the shifted BB28 contacts, through the non-shifted AM4 and ML19 contacts to the add emitter 314. Such add emitter will emit impulses to and through all of the MLR readout devices and the multiple amounts available on such readouts will be individually transmitted through the now closed BB1—27 contacts, to the various divisor multiple comparing magnets 1AZ, 2AZ, 3AZ, etc. It will be understood that the divisor multiple side of the comparing units will receive settings of the different divisor multiples. The comparing units operate in the manner previously explained to make suitable settings of the brushes upon the comparing commutators.

Having entered both the dividend comparison portion in a multiple manner into the comparing units and having entered the various multiples of the divisor in the other side of such comparing units the brush devices of the comparing units receive their settings, in the manner previously explained, to indicate a greater than, an equal to or a less than condition. As shown in Fig. 22c, the comparing unit commutators are in sections, one section being provided for each multiple.

Referring to Fig. 22c top, it will be noted that the comparing unit commutators are shown as sectionalized one for each multiple. For each section there is an associated relay coil such as 9CU for a 9 multiple, an 8CU for an 8 multiple and so on. The brush action of the comparing devices is adapted to prevent energization of all magnets relating to multiples which are higher than the comparison portion of the dividend and to permit energization of magnets related to multiples equal to or less than the comparison portion of the dividend.

With the problem of Fig. 28, the only magnet which will be energized is relay magnet 1CU. The circuit energizing this magnet is from line 301 (Fig. 22g), via wire 388 (see also Fig. 22c), through cam contacts CC12, relay contacts DD22 now closed, through the commutator associated with 1CU, through contacts AM8 in non-shifted position, through 1CU and back to ground. At this point it may be explained that if the 4 multiple was the selected multiple, the 4CU coil, the 3CU coil, the 2CU coil and the 1CU coil would be energized and all higher number magnets above 4CU would not be energized.

It may be explained that on a comparing cycle which takes a single machine cycle the set-up of the comparison portion of the dividend and of all the divisor multiples is made during the first portion of the comparing cycle. Immediately after the set-up is made and in the same machine cycle testing is effected. All testing is done concurrently for all multiples.

Referring now to Fig. 22f the energization of relay coil 1CU will have shifted relay contacts 1CU1 to reverse position from that shown and upon closure of CC9, current flows through contacts 1CU1, to and through the 1X multiple selecting relay and through the MM relay to ground. The multiple selecting relay 1X is maintained energized through stick contacts 1X1, the stick circuit extending back to line through CC15. It may be mentioned that this 1X relay coil is energized in one cycle just after the commutator test is made and that such relay is maintained energized through a portion of the next cycle to select the 1 multiple which is to be read out from the MLR1 device and which multiple is to be subtracted from the dividend comparison portion. The 1X multiple selecting relay also selects a related quotient digit for entry into the quotient receiving device LQ. Relay coil MM is maintained energized as long as the 1X coil is maintained energized, being in circuit therewith.

Previously when subtractive entries were made for resetting purposes the elusive 1 which was introduced into the accumulator to bring the all 9 setting of the accumulator wheels to a zero setting was introduced after the complementary entry. In subtracting the divisor multiple, however, the elusive 1 entry is made during a comparing cycle. In this connection it is to be noted that such elusive 1 is only introduced into the RD accumulator in the event that a multiple is to be subtractively introduced into such accumulator in the following cycle. If no such multiple is to be introduced the entry of such elusive 1 in the comparing cycle is suppressed.

At the carry time in the comparing cycle, the carry impulse flows from line 324 (Fig. 22g) through the now closed MM2 contacts, through the AK—21 contacts now in shifted position, through the CSa3 contacts now in shifted position, to and through the 313RD accumulator magnet in the hundreds order. It may be explained that the order in which such entry is made is selected under control of coil CSa, in this instance by the CSa3 contacts. Such carry impulse for subsequent steps of the computation will be introduced into other orders.

It has been explained that if there was no going multiple for any given comparison portion of the dividend that no elusive 1 entry would be made. Such entry is suppressed because of the fact, that in the event that no going multiple is found on test none of the X magnets will be energized because none of the 0CU, 1CU to 9CU relays will be energized. With no X coil energized there will be no energization of coil MM and accordingly with MM de-energized the MM2 contacts will remain open and no elusive 1 entry can be effected. On a comparing cycle with a relay coil such as 1CU energized, the energizing circuit to coil LL (Fig. 22f) will be interrupted, since a shift of contacts 1CU1 cut off the circuit.

Unless LL is energized it is impossible to energize the stepping switch magnet SB. All of the SB switch arms remain on their first contact position and inasmuch as contacts LL2 are open, even though cam contacts CC11 close, there will be no energization of either BB or DD. However, relay coil CSa will be energized again under th control of CC8 on the next machine cycle following the above described comparing cycle. Accordingly, the CSa1—2 contacts (Fig. 22g) will be again closed on the following machine cycle after the comparing cycle. In such cycle, the relay MM is maintained energized as explained before. Accordingly, relay contacts MM1 (Fig. 22b) will shift to reverse position from that shown and a circuit will be established from line through the MM1 contacts in shifted position to the subtract emitter 344.

Such emitter will emit nines complemental impulses through the MLR1 readout only. Impulses flow out of this readout, through the IX2—4 contacts which are maintained closed by the energization of IX during this cycle. Nines complementary impulses representative of the nines complemental of 49, i. e. 50, flow over the lines 333 (Figs. 22b, 22f and 22g), through the contacts DD2—4, in the position shown, over the line 386, through the now closed CSa1—2 contacts, through the non-shifted DD5—8 contacts and into the proper columnar orders of the RD accumulator energizing the proper of the 313RD magnets. This operation will deduct the amount of 49 from the amount of 86, the comparison portion of the dividend in this accumulator (see Fig. 28). It will be recalled that the elusive 1 entry into this accumulator has been previously made and that the regular transfer mechanism of the accumulator will provide for transfer to higher orders when required.

*Entry of quotient digit*

With the multiple selecting relay coil IX energized a supplemental contact IX5 (Fig. 22g) will be closed. The DD9, the AM2 and the RD6 contacts are now in the position shown and accordingly add emitter 348 is in circuit. A "1" impulse is emitted through the I bus of RDR, through the now closed IX5 contact, through the AK22 and CSa4 contacts now closed, through ZZ2 contact in the position shown, to the left hand accumulator magnet of LQ. This will enter the quotient digit of 1 in such accumulator.

On the quotient entering and subtracting cycle, inasmuch as the DD relay coil was not energized, contacts DD22 (Fig. 22c) are in open position. Accordingly, even if CC12 contacts close there will be no energization of any of the CU relays. Accordingly with none of such coils energized the 0CU1, the 1CU1, etc., contacts of Fig. 22f remain in the position shown and upon closure of CC9 current supply is afforded through the JJ3 contacts to energize relay coil LL. Relay coil LL when energized will close its stick contacts as before described and there will be another energization of stepping relay coil 340SB under the control of contacts CC14. Accordingly, switch arms of SB will step to the second contact position. After comparison is made with one dividend comparison portion at the time the multiple selecting relays are energized under control of contacts CC9 a supplemental circuit is established through coils 321AW to ground. These coils are the reset coils of the comparing unit pertaining to the comparison portion of the dividend (see Fig. 14). With such coils energized the dividend comparison side of the comparing units becomes restored so that a new dividend comparison portion can be introduced therein. It will be understood that the divisor multiple side of the comparing unit retains the divisior multiples during all deducting and quotient entering operations.

Referring to Fig. 28, the RD accumulator now has standing in it the remainder amount of 3740. There is now to be another comparison operation and with such comparison operation there is a different comparison portion of the dividend which is selected for comparison. In Fig. 28 it will be noted that the first comparison which has been previously described pertains to the two extreme left-hand orders of the dividend and the second comparison pertains to the next three orders. There must, accordingly, be a column shift to take a different comparison portion of the dividend from the RD receiving device.

It has been previously explained how the SB stepping switch was brought to the second contact position. It was also explained that the relay coil LL was energized. With relay coil LL energized relay contacts LL2 (Fig. 22f) are closed and accordingly upon closure of cam contacts CC11 a circuit is completed through a switch arm of the stepping switch to energize relay coil DD. It will be noted that there is no energization of relay coil BB because the second contact of the stepping switch and those thereafter are not wired in circuit to relay coil BB. Accordingly, at this time there is no energization of relay coil BB. With relay coil DD energized, it is maintained energized in the customary manner and following its energization cam contacts CC8 close and a circuit is established to energize column shift coil CSb. It will be noted that relay coil CSa is not now energized since the switch arm of the stepping switch is in the second contact position and out of circuit with CSa. With the coil CSb and relay coil DD energized, their associated contacts shift to a reverse position from that shown in the circuit diagram.

Figure 22G:
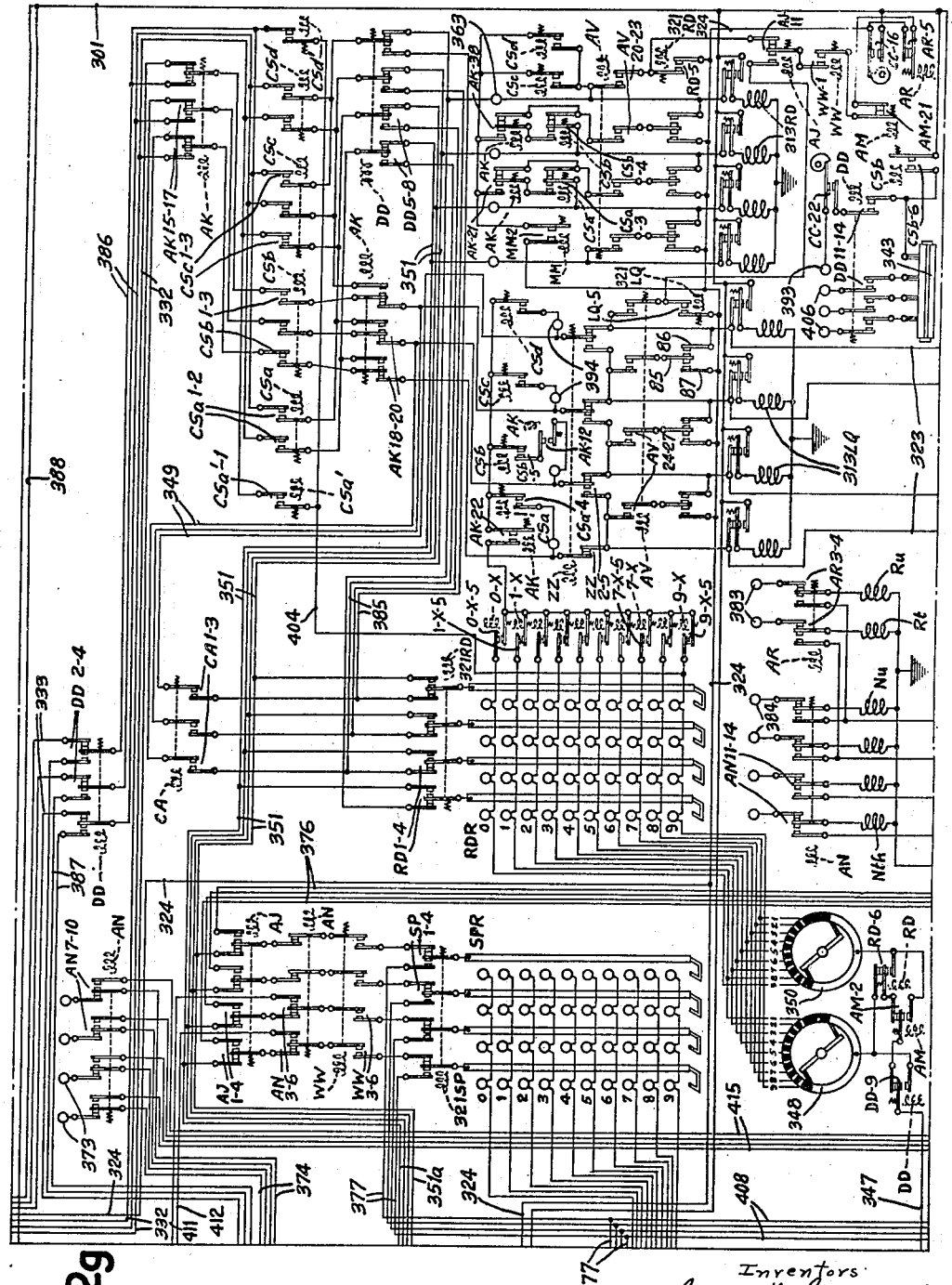

Referring to Fig. 22g with coil CSb energized, contacts CSb1—3 close and there is a new readout relation established with RDR. The readout relation is now such that the three left hand columns of RDR are selected for readout and for controlling the entry into the dividend side of the comparing units. The entry circuit will now be traced. From line 347 (Figs. 22c and 22g), through the DD9 contacts now shifted, to the add emitter 348, from the add emitter impulses are emitted through the three left hand columns of RDR, through the contacts RD1—3 in the position shown, to lines 351, thence through the DD5—7 and AK18—20 contacts now shifted, through the closed CSb1—3 contacts, through the shifted AK15—17 contacts, lines 386, thence through the now shifted DD2—4 contacts, to lines 387, thence to Fig. 22c and to the various 1AW, 2AW, etc. comparing unit magnets. This operation will have set up the new comparison portion of the dividend, viz. 374 in the various comparing units.

It will be recalled that the divisor multiples still remain set up in the divisor side of the comparison units. There is then a further comparison effected and the comparison commutators and circuits of the comparing unit bring about an energization of all of the CU coils from 1CU up to and including 7CU but leaves coils 8CU and 9CU de-energized. With the 7CU comparison relay coil energized, the related relay coil 7X (Fig. 22f) becomes energized under the control of CC9, over the circuit previously described, but which in this instance, is completed through the now shifted 7CU—1 contacts to the multiple selecting relay 7X. When relay coil 7X is energized relay coil MM likewise becomes energized in the manner previously explained. Both 7X and MM are held energized through the 7X—1 stick contacts.

In the comparing cycle and at the carry time in such cycle, provision is made for introducing an elusive 1 into the RD accumulator in the third order from the left. Such elusive 1 entry is made generally in the manner previously explained except that at this time the CSb4 (Fig. 22g) contacts are in shifted position due to the energization of CSb. With relay coil MM energized, the MM2 contacts are closed and a circuit is completed from line 324 at the carry time, through MM2, through the now shifted AK38 contacts, through the new shifted CSb4 contacts, down to and through the tens order 313RD accumulator magnet. This will enter the elusive 1 in such order. On the following cycle the 7 divisor multiple is entered subtractively into the RD accumulator and the 7 quotient digit is entered into the proper columnar order of LQ.

Referring to Fig. 22b energization of the 7X multiple selecting relay coil, brought about as previously explained, will close the 7X2—4 contacts. The energization of relay coil MM will shift MM1 contacts to reverse position and place the nines complementary emitter 344 in circuit with line 301. Nines complementary impulses flow from the 344 emitter, through the MLR7 readout, out through the 7X2—4 contacts to the lines 333 (see also Figs. 22f and 22g), through the non-shifted DD2—4 contacts (DD having now become de-energized), through the shifted AK15—17 contacts, through the shifted CSb1—3 contacts, CSb having been re-energized in such cycle since the stepping relay SB remains on the two contact position, through the AK18—20 contacts now shifted, through the DD5—7 contacts in the position shown, to lines 351, to the three left hand accumulator magnets of the RD accumulator. This will enter the nines complement of the 7 multiple of the divisor into such accumulator. Concurrently with the foregoing deducting operation the 7 quotient digit is entered into RD. The energization of relay coil 7X will have closed contacts 7X5 (Fig. 22g). Add emitter 348 will now be in a circuit which extends through the DD9, AM2, and the RD6 contacts in the position shown. A current impulse will be emitted from the 7 spot of the add emitter 348 to and through the RDR readout and through the closed 7X5 contacts, through the AK22, the CSb5, and the AK12 contacts now closed, down to the hundreds order of accumulator magnet of the LQ accumulator. This will enter the 7 quotient digit in such order of this accumulator.

Referring to Fig. 28, it will be noted that in the typical computation there illustrated, there was a half entry of 5 in the third from the left quotient place. It will be assumed that the calculation being effected does not involve such half entry. The computation then is completed and termination of the computation is to be controlled by the place limiting device which is provided for this purpose.

*Place limiting device*

Referring to Fig. 22f, the insertible plugboard will have provided a plug connection from socket 389 to the second socket 390 from the left. The second socket from the left is plugged up because the computation is to be carried to two quotient places. If the computation was to be carried to further quotient places the third or fourth socket 390 from the left would be plugged up. During the multiple deducting cycle just described, relay coil DD will be de-energized and accordingly the DD22 contacts (Fig. 22c) remain in open position. There will accordingly be no energization of any of the CU relay coils. With none of such relay coils energized, the 0CU1 to 9CU1 contacts (Fig. 22f) will remain in the position shown so that upon closure of cam contacts CC9, relay coil LL will become energized. With such relay coil LL energized, the relay contacts LL3 will be closed and upon closure of CC17, the circuit will be completed through LL3, through the switch arm of the stepping switch now still in the second contact position, through the J4 contacts in the position shown, through the plug connection from socket 390 to socket 389 to energize relay coil H. H being energized, closes its stick contacts H1 and the stick circuit is completed back to line through the AK37 contacts now in shifted position and through the RD11 contacts which are in the position shown, to line 301.

The energization of relay coil H will have shifted relay contacts H2 to a reverse position from that shown at a time prior to the closure of cam contacts CC14. Accordingly, with such CC14 contacts closed, a circuit is completed through the stick contacts of LL1 of LL, through the CC14 contacts, to the release magnet 341SB of the stepping switch. With this operation, due to the shift of contacts H2, the stepping switch magnet 340SB will be out of circuit. Energization of the 341SB release magnet will release the stepping switch and allow it to return to normal home position, i. e. the position shown in the circuit diagram. It may be mentioned that no circuits are inadvertently established by the switch arms on SB on restoration because on restoration the H4 relay contacts are in open position. The foregoing restoration of the stepping switch and opening of contacts H4 terminates further energization of the CS magnets, the BB or the DD magnets.

The machine has now reached the stage in its operation in which it is ready to record the quotient upon the record. The various ML multiple receiving accumulators can now be reset and the DD device can also be reset. Before recording is effected there must be a change in the readout relation between LQR and the punch, according to the entry shift which was previously made upon entry of the divisor and dividend amounts. Reset of the ML devices is brought about in the following manner. Energization of relay coil H (Fig. 22f) in the manner previously explained will have caused closure of relay contacts H3 (Fig. 22e). Upon closure of CC3, a circuit is established from line 301, through the AK1 contacts now in shifted position, through contacts H3 and AK2 now closed, to line 337.

Line 337 ultimately extends to Fig. 22h and the circuit from such line is completed through the now closed J2 contacts, through the switch arm of the stepping switch SE now in the position shown, back to line 338 which ultimately extends to Fig. 22c. From line 338, the circuit is completed through the now closed AL7 contacts, to and through the 321ML reset relay coil to ground. A branch circuit is also completed from line 338 to the AE5 contacts now in the position shown, through the AK5 contacts now shifted, through the XC9 cam contacts, to and through the 321RD reset relay coil and back to ground. Energization of 321ML and the 321RD reset coils will bring about electric reset of the corresponding accumulators. The detailed reset circuits will not be traced as these have been previously traced. The energization of the 321RD relay also serves to deenergize the computing initiating relay coil JJ as follows: Opening of contacts RD9 (Fig. 22d) breaks the stick circuit for coil JJ, which stick circuit extends to the now shifted AK24 contacts. Actual de-energization of coil JJ is timed by the CC18 cam contacts following the opening of RD9.

On dividing operations, due to a shift in the entry of the divisor and dividend there must be a selected energization of the Z and AA coils. With the computation under consideration the coils which will be energized on dividing are AA$t$ and Z$h$. The selected energization of the Z and AA coils is brought about under control of the pre-sensing control, which pre-sensing control it will be recalled, has effected certain selected energization of W and V relay coils, viz. the W$t$ and V$h$ relay coils in the example under consideration.

The energization of 321RD (Fig. 22e) brought about as previously explained, will have caused closure of contacts RD7 (Fig. 22c). Upon closure of cam contacts CC4, the circuit is established through the now closed RD7 contacts, through the AE6 contacts, through the AS5 contacts, through either of the AT16 or AK35 contacts, through the W$t$2 contacts to energize relay coil AA$t$. There is also an energizing circuit for relay coil Z$h$ through the V$h$2 contacts. It will be recalled that relay coils V$h$ and W$t$ will have been energized under the pre-sensing control previously described to bring about closure of V$h$2 and W$t$2. A branch circuit is also completed through RD7, AE6, to line 352, which circuit extends to Fig. 22d and brings about energization of relay coils A and AB.

All of the relay coils A, AB, AA$t$, Z$h$ will be maintained energized through the A1 stick contacts, the circuit extending back to line through the LQ7 contacts, the AS7 contacts in the position shown, to ground.

Referring to Fig. 22h, it will be noted that there is a column shifting arrangement intermediate plug sockets 355, which are sockets which are connected to the punch readout strip sockets 356 (Fig. 22d) and LQR (Fig. 22h). Such column shifting arrangement is provided by the multi-contacts controlled by the various Z relays and the AA relays. The AA relays are selectively energized according to the entry shift of the divisor upon entry and the Z relay coils are selectively energized according to the entry shift of the dividend upon entry. With relay coils AA$t$ and Z$h$ energized, there will be a closure of the related contacts AA$t$1—7 and Z$h$1—7 and the closure of these contacts in combination will establish a readout relation between LQR and the sockets 335 so that there will be a punching not in the extreme left hand field of the record card, but in a field shifted two columns to the right from the extreme left hand field.

It will be assumed that all of the seven sockets labeled 355 (Fig. 22h bottom) are connected to sockets 356 (Fig. 22d). If the circuits from the two left hand sockets of the 355 group and the extreme right hand 355 sockets are traced it will be found that their circuit extends back to a line 391, which line connects to a line 392 and that this circuit is completed back to line 301, through the now closed AB1 and AB2 contacts to and through the zero interposer magnet 353. This will provide for punching zeros on the record card in columns of the quotient field not controlled by LQR.

Now referring to the third socket from the left of the 355 group, it will be noted that this circuit is completed through the AA$t$2 contacts, through the Z$h$4 contacts, to a line which extends up to the thousands order of LQR. Inasmuch as the brush in this order is standing upon 1, the one punch selecting interposer magnet 353 will be energized during the punching operation. If the line from the fourth socket from the left of the 355 sockets be traced, it will be noted that this circuit is completed through the AA$t$4 contacts, through the Z$h$5 contacts, through the non-shifted GG1 contacts to the hundreds order of LQR. In this order, the brush is standing on the 7 spot so that the line will be completed through AB9 contact to and through the seven interposer magnet 353.

Referring now to the two sockets 355, which are in the second and third columns from the right of the group, it will be noted that circuits are completed through AA$t$5—6 and Z$h$6—7 through the non-shifted FF1 and EE1 contacts to the tens and units orders of LQR. The brushes in these orders stand at zero, therefore there will be a circuit completed from both orders back to the zero interposer punch selecting magnet 353.

The law of operation which the present machine has for controlling shift back upon recording may be expressed by the following formula: The number of columns in which the quotient amount is shifted back to the right upon final recording is determined by the following:

$$S_{DD} + (S_{DR} - S'_{DR})$$

where $S_{DD}$ = the number of positions, the dividend (DD) is shifted to the left upon entry. This amount of shift may also be taken to be the maximum number of dividend places available in RD less the actual number of dividend places in the dividend amount and where $S_{DR}$ equals the maximum number of available divisor places in the divisor entry receiving divisor minus one and where $S'_{DR}$ equals the number of columns, the divisor is shifted to the left upon entry. This number of columns may also be taken to be the number of columns the actual divisor is less than the maximum number of available places in the ML entry receiving devices.

Substituting the above values in the formula, we have $1+1-0=2$, which : the number of places that the quotient is shifted back to the right upon final recording under the pre-sensing control.

The foregoing description has explained the circuits for selectively reading out amounts to the punch on final recording. Punching occurs successively column by column in the usual way, but it may be mentioned that the return circuit from any plug socket 356 is via the punch readout brush to the common strip of the readout, thence via wire 357 (Fig. 22d), through the SS2 contacts, the AS9 contacts, the usual escapement contacts 358 of the punch, through the stick contacts A1 and thence back to ground. The energization of any interposer magnets 353 (Fig. 22h) closes the interposer controlled punch magnet contacts 359 (Fig. 22g) and energizes the punch magnet 360 in the usual manner. Punching then proceeds in the usual way column by column and eventually the card reaches the beyond last column position and closes P5 energizing coil B. Energization of B closes contacts B1 and energizes the eject magnet 361 of the punch. Card eject then occurs and contacts P3 and P4 become closed to condition control circuits for a succeeding computation.

It may be explained that with the present embodiment punching operations occur during a cycle in which not only the reset of the ML and the RD devices is effected, but also during a cycle in which card feed of a succeeding card is effected. In this way operating time is saved since recording operations are overlapped with resetting and card feeding operations. Heretofore in dividing machines such an overlap has not been attained. Such overlap is afforded with the instant arrangement because of the fact that the quotient is contained in the LQ accumulator which receives no entry from the card on a card handling operation. Furthermore, such LQ accumulator can be subsequently reset after controlling quotient punching.

Card feed of a new card is brought about in the cycle which immediately follows the ML and RD reset cycle and such card feeding operation is initiated during the ML and RD reset cycle in the following manner. Upon energization of 321RD (Fig. 22e) contacts RD8 (Fig. 22d) close and upon closure of cam contacts CC20 a circuit is completed through RD8, XC10, AK23 in shifted position, to and through relay coil E. Coil E is maintained energized by a stick circuit previously described through E1 and FC2. Energization of relay coil E closes relay contacts E2 to condition the circuit for subsequent energization of card feed clutch magnet 304 and the XC clutch magnet 312. Energization of these two magnets occurs upon closure of cam contacts CC29 (Fig. 22h) which complete a circuit in the manner previously explained.

Inasmuch as a new computation is to follow, provision is made to de-energize the previously energized shift control relays V and W (Fig. 22c). Such de-energization is effected in the beginning of the card feed cycle upon opening of cam contacts FC5 which interrupts the stick circuits to any of the V or W relay coils which have been previously energized. This operation will place these relays in condition to be set up again under the pre-sensing control of the next card. Computations proceed card by card until all computations on all cards are complete. Following the computation of the last card while there is an energization of the card feed clutch magnet 304 (Fig. 22d) there will be no energization of the XC clutch magnet 312 in view of the fact that the relay contacts G4 are now open, these being open because coil G is now de-energized, card lever contacts 305 having opened on such last card condition. This prevents unwanted XC cam contact operations.

Rounding off device

In calculating machines, particularly multiplying machines rounding off devices have been utilized to carry a particular calculation to the nearest unit in a particular order. This has been accomplished by entering an amount, say 5, in one order to the right of the order which is to be rounded off and which order is the last order to be recorded by punching. In the present machine rounding off mechanism is also employed but supplemental controls have to be provided in connection with such rounding off for the following reason. Let it be assumed that a computation is to be carried to two quotient places only and that the place limiting devices of the machine are set for such two place quotient. However, if the rounding off feature is employed, the 5 increment must be introduced in an order to the right of the last desired quotient place and if such 5 is introduced into such order then the machine must carry the computation further and terminate the computation not in the last desired quotient place, but in a place or order beyond such last desired place. The place limiting control therefore has to be modified to allow the machine to carry the computation one step or order further than is desired for the last quotient place itself. This change of control brings about and makes necessary a further control. In view of the fact that the machine has computed beyond, say, two orders of quotient digits and in view of the fact that it is only desired to record two orders of quotient digits, provision must be made for preventing recording beyond the last significant quotient place and for entering a zero in such order in which recording of remainder digits is not desired.

The foregoing can best be understood by reference to Fig. 28. In Fig. 28, considering the rounding off or one-half entry, the calculation is there shown as being limited to two places of the quotient. The augmented entry of 5 is placed in an order of LQ just to the right of the order which receives the 7 quotient digit entry. The computation is then carried on beyond this order and a 6 quotient digit entry is made in the next column to the right. The 6 added to the 5 gives a result of 11 giving a carryover of one into the next higher order and producing a final quotient amount of 18. There is, however, a remainder standing in LQ of 10. It is not desired to record the 1, because as regards a quotient result, such 1 is meaningless. Therefore in recording, provision is made for suppressing the recording of the 1 standing in LQR and for recording in lieu thereof a zero derived from another source.

In connection with the rounding off feature, it should be further noted that rounding off is of no consequence or utility unless the quotient result is computed to at least two places. Accordingly, if dividing calculations are made to less than two orders, provision is made for wholly suppressing the rounding off operation, including the entry of a 5 in a selected order.

With dividing calculations, the rounded off order of the quotient may assume a variable column relation on the final record. This will directly depend on the relative magnitude of the entered divisor and dividend and such rounding off column may vary from card to card due to the variable change of the reading out relation in recording the quotient. In short, in dividing, rounding off may occur in a variable final column of the result. In dividing, rounding off is effected in a selected fixed column of the LQ accumulator, but between the LQ accumulator and the punch there is a column shift mechanism so that the ultimate effect on final recording is to vary the column in which rounding off is effected.

To prepare the machine for rounding off operations, the insertible plugboard utilized for such operations will have established a plug connection between socket 393 (Fig. 22g) and one of the group of the 394 sockets. The particular one of the 394 sockets which is plugged for the computation on Fig. 29 is the second socket from the right. Another plug connection will be established between sockets 395 and 396 (Fig. 22d). This latter plug connection will bring about a maintained energization of relay coil J inasmuch as contacts AK25 are closed throughout all dividing operations.

Referring now to Fig. 22f, with relay coil J energized, relay contacts J3—6 will be in reverse position from that shown and accordingly, with a plug connection between socket 389 and the second 390 socket from the left, signifying a two place quotient computation, the machine will not terminate its computing operations with the arm of the stepping switch SB establishing contact with the second contact spot, but in contradistinction the machine will continue computation until the switch arm establishes contact with the third contact spot. The foregoing control will carry the computations performed by the machine on division to one further cycle beyond that required for the second quotient place.

Referring now to Fig. 22f, energization of relay coil J will shift the J1 contacts to reverse position from that shown. Such contact shift will place the 340SD stepping switch coil in parallel with the 340SB stepping switch coil so that upon each energization of 340SB there will be an energization of 340SD.

As shown in Fig. 28, the 5 entry is made in the second comparing cycle, viz. the cycle in which the amount of 374 is the dividend comparison portion. Such 5 entry is always made during such comparison cycle. The 5 entry into the selected column of the LQ accumulator is brought about in the following manner. During the cycle mentioned relay coil CSb becomes energized, closing contacts CSb6 (Fig. 22g). Likewise during the portion of the cycle in which the dividend is being compared, relay coil DD is energized causing closure of contacts DD14. Cam contacts CC22 are timed to close at the "5" index point in the cycle. Accordingly, a current impulse will flow at such time from line 301, through CSb6, through DD14, through CC22, via plug connection from socket 393, to the selected socket 394 and thence down to the related columnar order of LQ, in this instance, the third accumulator magnet from the extreme left. This will enter 5 in such accumulator during the above mentioned comparison cycle.

According to the rounding off operation as shown in Fig. 28 relay coil H will become energized not in the second quotient entry cycle, but in the following or third quotient entry cycle. This will be effected by the control which is afforded by relay coil J, J3—6 contacts and the SB stepping relay. By the time the H relay coil has become energized, the quotient digit of 6 (see Fig. 28) will have been entered in the order of LQ which receives the 5 entry. The usual carry will take place and the setting in the hundreds order of LQ will be augmented from 7 to 8.

It has been explained heretofore that the stepping relay magnet 340SD will be energized concurrently with the energization of stepping magnet 340SB. Inasmuch as the SB switch steps to the third contact position, the SD switch (Fig. 22h) will likewise step to the third contact position and place relay coil FF in circuit with line 301. It has been previously explained that under control of contacts RD1 (Fig. 22c) relay coils AAt and Zh (Fig. 22c) and relay coils A and AB (Fig. 22d) were energized to control punching. At the time such relay coils become energized, a circuit is also completed through relay coil FF (Fig. 22h), via wire 397 (Fig. 22d) to the right side of coil A. Such coil is maintained energized throughout punching operations by the stick circuit extending through contacts A1 as previously explained. With relay coil FF energized (Fig. 22h), the contacts FF1 will shift to reverse position and with such contacts shifted, the circuit from the common readout segment in the tens order of LQR will be cut off and such circuit will be completed over to line 392, which it will be recalled, is a circuit to the zero 353 interposer punch selector magnet. Thus in lieu of punching a 1, the amount standing in the tens order of the LQ accumulator, there will be a zero punched on the record card in the related order.

Provision is made to delay release of the SD stepping relay switch arms until after punching is completed in this type of operation. Referring to Fig. 22e, the manner of energization of 321LQ has been previously explained. When such coil becomes energized, a circuit is completed from the AS9 contacts in the position shown, over through the AK6 contacts now closed, through cam contacts CC21, to energize the 341SD release magnet. While there is also an energization of 341SE at this time, this is without effect because the SE relay is now in home position. Energization of 341SD, however, will release the arms of this stepping switch (Fig. 22h) and allow them to return to home position as shown.

*Automatic place limiting controls*

It will be appreciated that the number of quotient places which the machine is adapted to compute depends upon several factors, viz. the number of available places or orders in the dividend receiving device and the number of orders in the divisor. For example, with a dividend receiving device of four orders as here shown with a one place divisor, the machine can compute to four places and no more. On the other hand, if the divisor is a two place divisor, the computing capacity will be limited to three orders. It will also be appreciated that the place limiting plugging previously described can be set say to compute to four orders of quotient places, but the computing capacity of the machine might be reached before such four orders are computed. Such capacity would be reached if a two place divisor was encountered. To take care of such conditions an automatic place limiting mechanism is provided. This automatic place limiting mechanism terminates computing operations in any event when the computing capacity of the machine is reached irrespective of whether this capacity is reached before the pre-set or pre-plugged place limiting order is reached. The automatic place limiting mechanism will also be effective to limit the number of orders computed, even if there be no pre-plugged place limiting.

As previously explained, when rounding off is employed, the computing capacity is automatically increased to an additional quotient place. However, if that quotient place cannot be computed without exceeding the computing capacity of the machine the automatic place limiting mechanism will be in control and will prevent computing when the computing capacity is reached, irrespective of the rounding off mechanism calling for a further order of quotient order computing.

In the previous explanation of dividing computations, it was explained how the W relay coils (Fig. 22c) were selectively energized depending upon the size of the divisor amount. In the particular computation explained, Wt was energized. Such relay coil remains energized during all dividing calculations. With such coil maintained energized, relay contacts Wt3 (Fig. 22f) become closed and with such contacts closed, it will be appreciated that an energizing circuit is established to relay coil H when the third step of movement of the SB has taken place. Coil H will thus be energized to terminate computing, even though there be no connection whatsoever from the 389 socket to one of the 390 sockets or even if there be a connection from the 389 socket to the extreme right-hand 390 socket. Such connection from 389 to the extreme right-hand socket 390 would tend to call for a four place computation, but the Wt3 contacts would terminate such series of computations after three quotient places had been calculated, which is the limit obtainable with a two place divisor amount in this machine. If the divisor amount were one place, relay coil Wu would be energized and would be maintained energized throughout dividing calculations. Such energized relay would close contacts Wu3 and dividing calculations would then be invariably terminated when the stepping switch arm of SB reached its last contact position.

It will be furthermore appreciated that the foregoing controls afforded by contacts Wt3 or Wu3, will be effective irrespective of the shift of the J3—6 contacts, which contacts assume a shifted position on rounding off operations. Accordingly, the automatic place limiting controls have a predominating control even when augmented calculating is being effected under rounding off control.

Rate dividing

In rate dividing operations the divisor amount is derived from a leading rate or master card which card contains a special perforation in one of the extra index point positions of the card. The dividend amount is on each of the following group of interspersed detail cards. On such rate dividing operations the machine builds up the multiples once for each group of detail cards and retains the build-up until a new master card appears in a run. Upon such master card being reached, the previous build-up is broken down and a new build-up made. Furthermore on rate dividing operations, the pre-sensing control is somewhat modified. Both the divisor field and the dividend field are pre-sensed for every card. However, when the master card is pre-sensed, provision is made to disregard the pre-sensing control derived from the dividend field, but to only take into account the pre-sensing control taken from the divisor field. Thereafter, upon pre-sensing the detail cards of a run, provision is made to disregard any pre-sensing control derived from the divisor field, but to retain the pre-sensing control which was derived from the dividend field. The control setups which are obtained from pre-sensing the divisor field from the master or rate cards are also changed so that the divisor pre-sensing control is retained for all of the following detail cards of the group. This divisor pre-sensing control is thereupon correlated with the dividend pre-sensing control which is individually derived from each detail card. When rate computations pertaining to one group have been completed and the new rate or master card is encountered the previously mentioned controls are broken down and new controls set up.

Special controls are also provided effective on rate dividing whereby idle dividing and recording operations pertaining to master cards are eliminated.

On rate dividing, the insertible plugboard (Fig. 23) will have established a plug connection between socket 364 (Fig. 22h) and socket 397. This connection will maintain relay coil AL energized through all rate dividing operations. With relay coil AL energized, relay contacts AL8 will close and maintain the dividing relay coil AK energized also throughout all rate dividing operations. With both of the coils AL and AK energized, their associated contacts will shift to reverse position from that shown. The regular entry circuits for rate card dividing are the same as for regular dividing. The pre-sensing circuit plug connections for the divisor and dividend fields are also the same. There is, however, a supplemental plug connection provided by the insertible plugboard to enable receipt of a reading from the extra index point position. This plug connection is made between the particular socket 367 in the column in which the extra index perforation occurs to socket 368 (Fig. 22d). With cards in the supply hopper the machine is started in the same way as in regular dividing operations.

As the master card traverses the pre-sensing brushes the pre-sensing relays of the N and R groups will be selectively energized as in regular dividing. It will be understood that selected ones of the R magnets will be energized according to the location of zeros in the divisor field of the card and that selected ones of the N magnets will be energized according to the location of zeros in the dividend field of the card. If the leading master card contains no perforations in the dividend field none of the N magnets will become energized.

Upon rate dividing a circuit is completed from the extra index point position through the plug connection from the socket 367 to socket 368. Relay coil NN will become energized since the AL4 contacts are now closed.

It will be appreciated that as a detail card traverses the pre-sensing brushes the pre-sensing relays of the N and R groups will also be selectively energized. As will be explained later the energization of selected ones of the R relays is ineffective as long as the machine handles detail cards. The energization of selected ones of the N magnets is, however, effective to control shift to the left of the dividend entry from each detail card.

As previously explained for dividing, relay coils R, according to their energization, control the selective energization of relay coil T; likewise relay coils N control the selective energization of the S coils. There are further controls based upon the energization or non-energization of relay coil NN which determine whether an amount derived from the dividend field of the card is to be entered in its receiving accumulator or not. On rate card operations the S relay controls should be rendered ineffective when a master card is being read by the regular reading brushes. Upon analyzing a rate card relay coil NN will be maintained energized during the reading cycle. With such relay coil energized, relay contacts NN3 (Fig. 22c) shift to reverse position. Thus the circuit will be cut off to the various S relay coils. However, with such contacts shifted even though the relay contacts AL6 are open, the regular circuit is afforded to the T relay coils so that these may become selectively energized to control the selected shift to the left of the divisor entry. In the card feed cycle the amount of the divisor will be entered into the respective ML receiving devices in the manner previously explained and in the following cycles on account of the fact that the XC cams are rotating, there will be the usual build-up of multiples of the divisor in the ML devices as previously explained.

As in regular dividing, provision must be made to store the setting of the T relay coils on selected ones of the W relay coils. Unlike regular dividing operations the divisor relay coil W setting must be retained throughout all of the computations pertaining to the following group of detail cards. In order to change the control of the W relay coils from one in which they become de-energized following a computation pertaining to one card, to a different condition in which they remain energized for a run of a group of detail cards, the stick circuit for relay coils W is modified as follows: Such stick circuit extends from contacts such as $Wu1$, etc., back to line, through relay contacts AL5. However, such contacts AL5 are now in shifted position so that the stick circuit, in place of extending back to ground through cam contacts FC5, extends back to ground through the now shifted AL5 contacts and through the ML5 contacts. Accordingly, the selectively energized relays W will not become de-energized until contacts ML5 open at the time when the multiple receiving devices are being reset. Contacts ML5 open upon the energization of 321ML.

Early in the master card reading cycle cam contacts FC12 (Fig. 22d) close, causing energization of relay coils RR and SS. The stick circuit for coil RR is through the RR1 contacts, being completed to line through the supplemental punch controlled contacts P2a. The stick circuit for relay coil SS is through the now closed eject contacts P4 and contacts RR1. The master card ultimately reaches the receiving tray of the punch closing card lever contacts 317 and energizing relay coil D. With P5 closed, relay coil B is also energized and with B and D energized contacts B2 and D2 (Fig. 22e) become closed and accordingly there is an energization of the 321LQ reset relay coil as described in regular dividing.

With the master card in the punch tray and with relay D energized, the D1 contacts (Fig 22d) shift and upon closure of CC1, with contacts B1 closed, there is an energization of the punch rack trip magnet 318 to feed the master card to the first punching position. Upon feed of such card the P5 contacts open de-energizing coil B allowing closure of contacts B3. With B3 closed the SS1 contacts are now effective to afford a stick circuit for relay coil SS. During card feed of the master card the eject contacts P4 are open. This breaks the circuit connection between coils RR and SS.

Relay coil H (Fig. 22f) will become energized before RR becomes de-energized. The circuit for energizing coil H is through the RR2 contacts, through the LQ9 contacts, coil H, to ground. With H energized, its stick circuit is completed back to line through contacts H1 and through the AK37 contacts now shifted, through RD11 to line.

It will be recalled that relay coil JJ (Fig. 22d) initiates dividing calculations. Such relay coil on regular dividing is energized upon LQ reset upon closure of contacts LQ8 and CC7. However, upon rate dividing operations with relay coil H energized, relay contacts H5 will be open at the time CC7 close and there will accordingly be no energization of coil JJ.

On regular dividing operations it was explained that for each card feed there was an energization of 321ML concurrently with an energization of 321RD. Upon rate dividing operations it is desired to reset the ML receiving devices only prior to the reading of a master card. Accordingly, the energizing circuit to 321ML is interrupted upon detail card operations. This is effected by the opening of the AL7 contacts. With cards in the machine relay coil G will be energized and contacts G3 will be open, and as long as detail cards appear in a run relay coil NN will not be energized so that contacts NN4 will be open. Accordingly, the control of energization of reset relay 321ML is brought about for a master card under control of contacts NN4 and suppressed for detail cards, inasmuch as NN4 are open and AL7 are also open. Any time a master card is encountered, even if two master cards are in direct succession, reset coil 321ML will become energized and reset of the multiple receiving devices will be effected.

On rate card operations the master card should be skipped out of the punch. During the RD reset cycle relay coil 321RD is energized. Energization of such coil will close relay contacts RD7 (Fig. 22c) and there will be the energization of relay coils A and AB in the manner previously explained. There will also be a selective energization of AAu or AAt (Fig. 22c) as previously explained. Relay coil SS (Fig. 22d) is still energized and the SS2 contacts will have shifted to cut off the circuit to the readout strip of the punch and to establish a circuit to the punch magnet 360. With the circuit thus established to the punch magnet 360, the master card will be escaped through the punch. With the SS2 contacts in shifted position all punch circuits to LQR will be cut off so that this readout will be wholly ineffective during the escape of the master card through the punch. Card feed of the detail card is brought about as in regular dividing, that is, with coil 321RD energized, contacts RD8 (Fig. 22d) close and there is a circuit ultimately established to energize relay coil E which in turn brings about an energization of the 304 card feed clutch magnet.

On rate card operations, upon feed of the detail card, provision is made to suppress the operation of the XC cam contacts. Such cam contacts have as one of their functions, the control of build-up of multiples of the divisor. Such build-up control is not desired for a detail card on rate dividing because it is effected for a master card only and the build-up is retained for detail cards. Build-up is permitted for master card operations because contacts NN2 (Fig. 22d) are closed. Such contacts are, however, open on detail card operations because relay coil NN is de-energized. Relay contacts AL2 are open throughout all rate card dividing operations so that the control of clutch magnet 312 is solely through contacts NN2.

On rate dividing operations, provision is made upon feed of a detail card to suppress energization of any of the T coils, but to permit the selective energization of the S coils. The energizing circuit for any of the T coils is through the relay contacts NN3 when these are in shifted position. Such contacts are in the position shown when a detail card is fed. Accordingly, no T coil can become energized upon such detail card feed, but with such contacts NN3 in the position shown there can be a selected energization of the required S coils. Selected ones of the S coils will be energized as explained for regular dividing and according to which of these coils and dividend entry will be permitted and shifted to the left in the dividend accumulator as in regular dividing operations.

On regular dividing operations the pickup circuit for energizing selected ones of the V and W relay coils was via the XC4 cam contacts. Such contacts it was explained, close upon the feed of a master card to energize a selected one of the W relay coils. Such contacts XC4, however, do not close on the feed of a detail card and accordingly, inasmuch as selected ones of the V relay coils must be energized for each detail card a supplemental pickup circuit must be provided for such relay coils. This supplemental circuit is provided as follows: From ground through the contacts G2 now closed, through cam contacts FC8, through contacts AL4, which are in shifted position, through the now closed contacts AM5, through one of the Su1 to Sth1 contacts to the proper V relay coil. This supplemental circuit will allow the selected energization of the requisite V coil. The stick circuit for any energized V coil extends through cam contacts FC5, back to line which circuit is different from the stick circuit for the W relay coils.

Dividing operations pertaining to each detail card occur as previously explained for regular dividing. Computations ensue for the detail cards of a group and upon a new master card being encountered in a run, relay coil NN becomes energized (Fig. 22d). With relay coil NN energized, there is initiated an ML reset as previously explained, that is, contacts NN4 (Fig. 22e) close. Upon such ML reset, the contacts ML5 (Fig. 22c) open so that upon the opening of cam contacts CC23, the stick circuit for the W relay coils is broken and any energized W relay is de-energized so that another such relay can be re-energized under the control of the succeeding master card.

Summarizing—on rate card dividing operations, the master card controls both the taking in of the divisor amount and the shift of such amount to the left. The following detail cards control the taking in of a dividend amount and the shift of the dividend entry to the left. Multiple building up operations are effected once under the control of a master card and building up operations are thereafter suppressed until a new master card comes along in a run.

On master card operations, dividing calculations are suppressed and the master card is skipped through the punch without recording. On detail card operations, on the other hand, computing is brought about for each detail card with the recording for each detail card.

As in regular dividing the shift back of the quotient amount on final recording is under the conjoint pre-sensing control afforded by the divisor and dividend amounts. As stated before, the divisor control is from the master card and the dividend control is from each detail card. Stated otherwise, the shift back control for quotient recording is a conjoint control based upon one master card taken with dividend data from each detail card of a run and this shift back control may vary from detail card to detail card, notwithstanding the divisor control is fixed for a group of detail cards.

Checking dividing

It will be recalled that in regular dividing operations the procedure was to first build up and render available for comparison all multiples of the divisor, thereafter these multiples were successfully compared with successive comparison portions of the dividend and following each comparison the selected divisor multiple was deducted from the comparison portion of the dividend. The related quotient digit was then entered and these operations repeated until the division calculation was complete.

When it is desired to check dividing, it is desirable that a different computation be carried out using different digits. In this way the accuracy of the first computation on the original run may be more accurately checked. Generally, the procedure on checking dividing is to change not only the comparison by comparing different but related digits, but to also change the former deducting operation to an adding operation to add any divisor multiples in place of subtracting them as the computation proceeds. To illustrate, assume a divisor amount of 12 and a dividend amount of 144. The quotient is obviously 12 and the going multiples of the divisor are respectively 12 and 24 for the two steps of the computation.

On checking division, the various divisor multiples will be built up on the ML devices as before. For example, there will be a build-up of 12, 24, 36, etc. The dividend amount in place of being entered directly into RD as in regular division will be entered from the record into the SP accumulator. Following the entry, a nines complement of the dividend is read out from SP and entered in RD. Then in setting up the various comparing units for comparison the nines complement of the dividend will be set up on one side of the comparing units and on the other side of the comparing units the nines complements of the different divisor multiples will be set up. To illustrate, with the dividend amount of 144, the nines complement of such amount is 855. The nines complement of the 1, 2 and 3 multiples of the divisor is 87, 75, 63, etc. The first comparison portion of the dividend to be compared is 85. This is compared with the available nines complemental multiples of the divisor and it is found by such comparison that 87 is the complement of the multiple which is just equal to or greater than the nines complemental dividend comparison portion.

When such comparison is made the machine selects the corresponding divisor multiple, viz. 12, and enters 12 into the RD accumulator, adding the amount of 12 to 85. While this amount is being added, there is also an entry of the nines complement of the related quotient digit, i. e. 8, into the LQ accumulator which accumulator previously had the quotient amount entered therein. Such entry of 8 would bring the highest order wheel of the accumulator to a 9 position. Column shift then ensues and 75 becomes the next comparison portion of the nines complement of the dividend. By comparison, it is ascertained that 75 is the nines complemental multiple which is just equal to the complemental dividend comparison portion. Following such comparing, the related direct divisor multiple, viz. 24, is entered into RD, which brings the RD accumulator to an all 9 position. Likewise, the nines complement of the 2 mulitiple is entered into LQ in proper columnar order, viz. there is an entry of 7 in the column of LQ already containing a 2 so that this wheel of the LQ accumulator also is brought to a 9 position. When the wheels of the LQ accumulator reach an all 9 condition this signifies that the computation has checked, the checking computation is complete, and a new checking operation can be effected.

Summarizing: For checking dividing the operations are to compare successive nines complements of dividend comparison portions with nines complements of the divisor multiples and then to add to the dividend accumulator the related direct multiple of the divisor. This is determined according to which complemental divisor multiple is just equal to or greater than the related complementary dividend comparison portion. There is also an entry into the LQ accumulator of a digit which is the nines complement of the quotient digit corresponding to the going divisor multiple. Stated another way, the multiple which is added following comparison is that multiple whose nines complement is the lowest, that is, just equal to or greater than the nines complement of the comparison portion of the dividend.

In regular dividing, division proceeds by a series of deducting operations towards a terminating zero point. The dividend is a positive amount and the divisor multiples are negative and are subtracted to reduce the divisor amount to a limit which is or approaches zero. On checking dividing, the dividend amount is a negative amount and the divisor multiples are positive amounts. These amounts are added successively to cause the dividend amount to become less and less negative so that a limit equal to or approaching zero is finally obtained.

It will be noted that on checking dividing nines complements are always used and there is no elusive one entry in the checking process at all. This materially simplifies the circuits and mechanisms.

Before explaining in detail the checking dividing operations, it may be mentioned that the cards are introduced into the machine on a rerun in reversed end to end relation. In checking dividing, in view of the end to end reversal of the cards, special insertible plugboards are used according to Fig. 25. The insertible plugboard provides a plug connection between socket 364 (Fig. 22h) and socket 398. This connection maintains relay coil AM permanently energized during all checking operations. Upon energization of AM, relay contacts AM17 and AM18 close to maintain relay coils AK and AS, respectively, energized throughout checking dividing operations. It will be recalled that AK was previously maintained energized during regular dividing. With these coils AM, AK and AS energized their respective contacts shift to reverse position from that shown.

As in regular dividing, plug connections are established between sockets 367 pertaining to the divisor field, to sockets 383 (Figs. 22a and 22g) and plug connections are made from 367 pertaining to the dividend field (Fig. 22a) to sockets 384 (Fig. 22g). Plug connections are also made from the sockets 367 pertaining to the quotient field to the sockets 399 (Fig. 22h). The foregoing plug connections are for pre-sensing purposes. To route and afford entries of the dividend, divisor and quotient amounts, plug connections are established from sockets 309 (Fig. 22e) pertaining to the divisor field to sockets 311 (Fig. 22a) and connections are made between sockets 309 pertaining to the dividend field to sockets 373 (Fig. 22g). For quotient entries, plug connections are established between sockets 309 (Fig. 22e) pertaining to the quotient field, to sockets 400 (Fig. 22d).

On checking dividing calculations the cards are placed in the hopper or supply magazine in reverse end to end relation to change the relation of the columns of the card with respect to the sensing brushes. The machine is started up in operation just as in regular dividing and for the first card cycle there is the pre-sensing of the divisor and dividend fields just as in regular dividing. There is also a pre-sensing of the quotient field and this pre-sensing selectively energizes selected ones of the relay coils TT$a$—$g$ (Fig. 22h). As in the customary pre-sensing control such of the TT relay coils are energized which are related to columns of the quotient field where zeros appear. When any one of the TT$a$—$g$ coils is energized its related contacts with the suffix "1" (Fig. 22c) is shifted to reverse position from that shown, and accordingly, a selected one of the VV$a$—$g$ coils will be energized. Assuming a quotient entry of 18 (see Fig. 29), the TT coils which will be energized will be TT$a$, TT$b$, TT$c$, TT$f$ and TT$g$. The energization of TT$g$ and TT$f$ will have shifted contacts TT$g$1 and TT$f$1 (Fig. 22c) and with such contacts shifted there will be an energization of relay coil VV$e$.

There will be an energization of coil VV$e$ at the time the card is analyzed by the regular reading brushes. It will be noted that the non-shift of contacts TT$e$1 cuts off the circuit to all of the VV relays to the right of coil VV$e$ (Fig. 22c). The second card feed cycle following pre-sensing on the first card is brought about as in regular dividing. On such card feed cycle the divisor amount is entered into the ML devices in shifted over relation just as in regular dividing. Following entry the multiples are built up in the various ML devices as in regular dividing. The dividend amount on the other hand, in place of being entered into RD in shifted over relation as in regular dividing, is entered into SP in shifted over relation. As in regular dividing the S$h$ relay coil (Fig. 22c) becomes energized under pre-sensing control. Such relay when energized shifts the S$h$2 group of contacts to reverse position from that shown.

The entry circuits for the dividend amount are in part the same as for regular dividings and will be traced only from sockets 373 (Fig. 22g) through the non-shifted AN7—10 contacts, via the lines 374 (Fig. 22c), through the closed S$h$2 contacts, through the now shifted AS1—4 contacts, directly to the 313SP accumulator magnets. This will enter the amount of the dividend into SP and shift it over in columnar relation therein. At the time the FC11 cam contacts close to energize relay coils S$h$ and T$t$, a branch circuit is established via line 401, through the now closed AM7 contacts, through the TT$g$1 and the TT$f$1 contacts in shifted position, through the relay coil VV$e$ and back to line. The energization of VV$e$ closes the group of contacts VV$e$1 (Fig. 22d). These VV$e$1 contacts selectively determine the shift of the quotient entry to the left upon entry into the LQ accumulator. With contacts VV$e$1 closed, the quotient entry from the quotient field of the card is made as far to the left in the LQ accumulator as possible. The entry circuit is from sockets 400 which are plugged up to the quotient reading brushes, through contacts VV$e$1 over a group of lines 402 (see also Fig. 22h), through the non-shifted AT4—7 contacts, via a group of lines 403, up over the group of lines 323 (see also Fig. 22g), to and through the 313LQ accumulator magnets. This will enter the amount of the quotient in the LQ accumulator in shifted to the left columnar relation.

In the machine cycle following the card analyzing cycle, i. e. the second half of the card feed cycle, provision is made to transfer over the nines complement of the dividend amount from the SP accumulator to the RD accumulator. This is brought about in the following manner. During this machine cycle, since relay coil AS is energized, contacts AS12 (Fig. 22d) are closed and a circuit is established at the proper time through cam contacts XC6, through the AN17 contacts in the position shown, to energize relay coil WW. With this relay coil energized, relay contacts WW3—6 (Fig. 22g) and WW2 (Fig. 22c) are shifted. With WW2 shifted, a circuit is established from line 347 to the nines complementary emitter 375. The nines complementary impulses are emitted through SPR (Fig. 22g), through the non-shifted SP1—4 contacts, through the shifted WW3—6 contacts, through the AN3—6 and AJ1—4 contacts in the position shown, to the lines 351 and thence to the 313RD accumulator magnets. This impulse emission through SPR will enter the nines complement of the dividend amount in RD. It may be mentioned that an elusive 1 entry or entries is not made into RD under this particular operation, since even though the contacts WW1 are closed, the contacts AM21 are in open position and therefore no elusive 1 entry is possible.

By the usual card controls which are effective when the card reaches the receiving tray of the punch, and as in regular dividing operations, relays B and D (Fig. 22d) ultimately become energized. As in regular dividing the card is fed to the first punching position. The machine is now ready to initiate its checking calculating operations and this is brought about by a reset of the SP accumulator. In regular dividing, it will be recalled that dividing calculations will be initiated by reset of the LQ accumulator. Initiation of SP reset is brought about as follows: Contacts B2 and D2 (Fig. 22e) are now closed and a circuit is established through relay contacts AS10 now closed, to the 321SP reset relay. The energization of relay coil AS will have shifted the AS9 contacts and thus prevent energization of 321LQ. The reset of the SP accumulator takes place with the 321SP relay coil energized in a generally similar manner to the electrical re-set previously described for the LQ accumulator. SP reset brings about energization of relay coil JJ. The circuit is established through the now shifted AS11 contacts, through the SP7 contacts, through cam contacts CC7, through the closed H5 contacts, to relay coil JJ. JJ once energized is maintained energized by the stick circuit previously traced for dividing operations. With relay coil JJ energized relay contacts JJ3 (Fig. 22f) close and a circuit is established serially through the various CU1 contacts now in the position shown to energize the relay coil LL when cam contacts CC9 close. With relay coil LL energized its stick circuit is established through LL1 and CC13. Shortly after LL becomes energized, cam contacts CC14 close and circuits are established for energizing the stepping relay magnets 340SB and 340SE. Energization of the latter magnet is afforded since contacts AM6 are closed and contacts J1 are in the position shown. The arms of the SB and SE stepping switches will thereupon advance to their first contact position. As in regular dividing there will now be an energization of coils CSa, BB and DD, but since the contacts AM1 are now closed and also relay contacts DD10 are closed, there will be a concurrent energization of CSa' with the energization of CSa.

The machine is now ready to set up the nines complement of the dividend or more exactly, the nines complement of the comparison portion of the dividend on one side of the comparing units and to set up the nines complements of the various divisor multiples on the other side of the comparing units. The setup of the nines complement of the dividend comparison portion will first be explained.

Referring to Fig. 22g, the add emitter 348 will be brought in circuit with line 347 upon shift of contacts DD9. Impulses will be emitted through RDR and will flow by the circuits previously traced to the various selected ones of the 1—9AW comparing magnets. These circuits are the same as in regular dividing, but it will be recalled that the nines complement will be read out instead of the comparison portion of the dividend as in regular dividing. With this particular operation, however, provision is made for filling out nines to the left on the comparing magnets. A special nines to the left circuit is therefore provided which is established through the now closed CSa'—1 contacts. These contacts are in a circuit 404 leading to the 9 bus of RDR and the circuit beyond the CSa'—1 contacts extends to each of the left hand comparing magnets 1—AW to 9—AW inclusive. While the nines complement of the comparison portion of the dividend is being set up on one side, the nines complement of the various multiples of the divisor are being set up on the other side.

Referring to Fig. 22b, relay contacts BB28 and AM4 are in shifted position. Accordingly, nines complementary emitter 344 is in circuit with line 301 and nines complementary impulses are emitted from this emitter through the various MLR readouts down through the now shifted BB1—27 contacts to selectively energize at differential times the various 1AZ to 9AZ comparing magnets according to the divisor complemental multiples.

In the comparing cycle and after the set-up of the comparing units is effected, the actual comparing operation takes place on the comparing commutators (Fig. 22c). It will be noted, however, that the contacts AM8—16 are now in shifted relation. With such contacts shifted, the comparison will be such that all CU relays pertaining to lower multiples (greater complements) than the comparison portion of the dividend and possibly the CU relay pertaining to an equal complementary condition, will be energized. For the problem of Fig. 29, the 1CU relay will be the only relay energized. Energization of this relay is effected upon closure of cam contacts CC12, through contacts DD22, which are closed (Fig. 22c).

Referring to the problem of Fig. 29, the dividend comparison portion complement is 913 and the only complemental multiple which is greater than this amount is 950, the complement of the one multiple of the divisor. This one multiple is accordingly the selected multiple.

Having selected the related multiple, the machine is ready to add the related direct multiple and to add the nines complement of the related quotient digit to the quotient digit already standing in the left-hand order of LQ. As in regular dividing at the end of the comparing cycle relay coils BB and DD become de-energized. In the instant machine cycle when the above entries are made, the relay coil CSa (Fig. 22f) becomes again energized. However, relay coil CSa' does not become energized, because relay contacts DD10 are open, DD having now been de-energized. With relay coil BB de-energized, relay contacts BB28 (Fig. 22b) are in the position shown and the circuit from line is to add emitter 314. The energization of 1Cu in the manner previously explained, will have shifted contacts 1CU1 (Fig. 22f) and energized the 1X multiple selecting relay. Coil 1X being energized it will be maintained energized in the manner previously explained. With 1X energized, the 1X2—4 contacts (Fig. 22b) are in shifted position and the impulses flowing from the add emitter 314 will flow through the MLR1 readout and will ultimately reach the proper columnar orders of the 313RD accumulator magnets (Fig. 22f) via the circuit paths described for subtracting the first multiple in regular dividing.

The entry circuit for effecting an entry into LQ of the nines complement of 1 or 8 will now be explained. Referring to Fig. 22g, subtract emitter 350 is in circuit and add emitter 348 is out of circuit with line 347, since contacts DD9 are in the position shown, AM2 are shifted and RD6 are in the position shown. With emitter 350 in operation an impulse representative of 8 will be emitted over the eight bus of RDR through the now closed 1X5 contacts, through the contacts AK22 now closed, through CSa4 now closed, through ZZ2 in the position shown, down to and through the highest order 313LQ accumulator magnet. This will enter 8 in such order and inasmuch as 1 already stands in such order, the accumulator wheel or element unit will be brought to a 9 position.

Further complemental comparing operations, adding of direct divisor multiples to the comparison portion of the dividend and further entries of nine complements of quotient digits take place for following comparison portions of the dividend. These need not be traced in detail as they are substantially like those explained for regular dividing except for the difference in sign of entry which has been explained for one operation.

Terminating of calculating operations on checking dividing take place under the control of the place limiting devices. There is an ultimate energization of the terminating relay H as in regular dividing, it being assumed that the place limiting devices are set for the same number of places as on the original run.

The machine is now ready to test the LQ accumulator to ascertain whether the wheels of this accumulator are in a 9 position. After such wheels are in such 9 position it signifies that the checked computation is correct and there is then initiated a reset of the ML devices and the RD and LQ accumulators. If the test detects a condition in which one or more of the wheels of LQ do not stand on 9, the foregoing resetting operations are deferred until a manual operation ensues and during which the incorrect card may be removed. Assuming that the LQ accumulator shows an all 9 condition, resetting operations are initiated under the control of this test circuit and the card in the punch is skipped through the punch without recording. The test circuit and reset initiating control circuits will now be traced.

Referring to Fig. 22e, upon closure of cam contacts CC3 a circuit is established through the shifted AK1 contacts, through AK2 contacts now closed, to line 337. Line 337 ultimately extends to Fig. 22h, through the now closed J2 contacts through the switch arm of the SE stepping switch to say the third contact position, through the non-shifted ZZ7 contacts, to the second from the left readout segment of LQR, thence via the various brushes and contact spots of the relatively higher orders of the readout which are on an all 9 position to line 338. Line 338 ultimately extends back to Fig. 22e and energizing circuits are established to energize reset relays 321ML, 321LQ and 321RD. The circuit to coil 321ML is through the AL7 contacts now closed. The circuit to 321LQ is through the contacts AK4 and AS9 which are both shifted. The circuit to 321RD extends through contacts AE5 in the position shown, through AK5 in shifted position, through XC9, to 321RD. In the event that one of the accumulator elements of the LD accumulator is off the 9 position, this circuit will not be established since it will be broken at the LQR readout. Such circuit, however, can be established to bring about reset by depression of the supplemental reset key 405 (Fig. 22h).

It may be explained that throughout the checking dividing computations stepping switch SE will advance the same number of steps as stepping switch SB. It will be understood that the stepping switch SE cuts off testing and exploration of unnecessary columns to the right in LQ. In checking dividing, RD reset through the closure of RD7 ultimately causes energization of relay coil A (Fig. 22d). However, on the energization of A there is no energization of any of the AA, Z or AB coils (Fig. 22c) since contacts AS5 and AS6 are now in open position. Since contacts AS8 are in shifted position (Fig. 22d) a circuit for advancing the card step by step through the punch is completed as in checking multiplying operations. Ultimately the closure of contacts RD8 brings about energization of relay coil E whereupon the E2 contacts close and there is an energization of the card feed clutch magnet 304 and the XC clutch magnet 321. Operations pertaining to a new card are then initiated.

*No-go condition on checking dividing*

On regular dividing operations, conditions are encountered where on a certain comparison the comparing devices ascertain that there is "no-go" condition. Such condition means that the quotient amount for such quotient place is zero. Upon checking dividing, however, if upon a comparison a "no-go" condition is established, provision must be made to enter a 9 in such non-going quotient order. This is necessary since the entries into LQ on checking are in nines complementary relation. To provide for the introduction of a 9 into LQ on a "no-go" condition, the following controls and circuits are provided. If on checking operations a "no-go" condition is determined by the comparing devices, none of the relays 1CU to 9CU (Fig. 22c) will be energized, but relay 0—CU will become energized.

With relay 0—CU energized, which is permitted inasmuch as relay contacts AM20 are closed and because relay contacts CSA'—2 are also closed, contacts 0—CU1 (Fig. 22f) shift. Accordingly, there is an energization of the OX relay with the usual stick circuit established through contacts OX1. With 0—CU1 shifted, the energizing circuit to relay coil LL is broken. Therefore, on a "no-go" comparison upon checking dividing, the machine does not immediately follow with another comparing cycle as in regular dividing. In lieu thereof, the energization of the OX relay closes relay contacts OX5 (Fig. 22g) and a circuit is established from the nine spot of emitter 350, through the now closed OX5 contacts, through AK22 now closed, through one of the closed CS contacts, down to one of the 313LQ accumulator magnets. This will provide for the entry of a "9" in the "no-go" order of LQ. On a "no-go" comparing condition of checking, since the related multiple is zero, there is no additive entry of any multiple into RD.

In regular dividing operations it is possible, according to the relation of the divisor and the dividend to have quotient amounts such as 0387 (first condition) and 3870 (second condition). The relation of quotient digits for the first condition occurs when there is a "no-go" comparison for the highest order of the quotient, i. e. a "no-go" condition on the first comparing cycle. The relation of quotient digits such as 3870 for the second condition occurs when a comparison is effected on the first comparing cycle to signify that there is a going multiple.

In recording back on the record card for both of the foregoing first and second conditions, it is possible, due to the relative size of the divisor and dividend amounts to record the quotient amount of 387 for either condition in an identical columnar relation on the record card. For example, the recording for both conditions might be 0038700.

In recording the quotient amount for the first condition mentioned above, the zero preceding the 3 will be derived from LQR. However, when recording for the second condition, this same zero in the same column will be derived not from LQR, but from the zero wiring 391, etc. (Fig. 22h) previously described.

When such a record is re-run through the machine for checking dividing, the pre-sensing control cannot ascertain whether the zero preceding the 3 comes from LQR or from the 391 zero wiring. Therefore, the 387 is entered clear from the card to the left in LQ when checking either under condition one or condition two. When entering re-computed complementary quotient into LQ a control must be provided to take into account that such shift has occurred clear to the left under condition one or condition two. When operating under condition one there will be a "no-go" condition on the first comparing cycle for the first quotient place.

While the machine controls under this "no-go" condition would tend to enter a "9" in such place, such "9" entry in such place is undesired and is accordingly suppressed. It will be recalled that if 387 is shifted clear to the left there will be no zero in LQ for the 9 to match with. Accordingly, on such first condition on checking dividing this "9" entry in the first quotient place is suppressed. However, on the second checking condition there is a going condition established on comparison for the first quotient place and therefore a complementary quotient digit is entered in such place. Furthermore, under condition one, provision is made for shifting the entries of all complementary quotient digits relatively one place to the left so they will enter in the proper orders of LQ. On condition two, on the other hand, this shift to the left of the entry of complementary quotient digits is suppressed.

On the first comparing cycle upon checking dividing, relay coil CSa' (Fig. 22f) becomes energized concurrently with the energization of relay coil BB in the manner previously described. The energization of CSa' opens contacts CSa'—2 (Fig. 22c) and accordingly relay coil 0—CU does not become energized. Furthermore on a "no-go" condition none of the relay coils 1CU to 9CU will become energized. Accordingly, all of the 0—CU1 to 9CU1 contacts (Fig. 22f) remain in the position shown and LL becomes energized. With LL and BB energized, contacts LL4 and BB30 (Fig. 22d) are in closed position and upon closure of cam contacts CC25, a circuit is established through the now closed AS12 contacts, through the non-shifted AR12 contacts, through CC25, LL4, BB30 to energize relay coil ZZ. The contacts ZZ1 close and a stick circuit for coil ZZ is maintained in the same manner as for the JJ relay. With relay coil 0—CU not energized, contacts 0X5 (Fig. 22g) will remain open and accordingly there will be a suppression of the entry of the 9 in the first quotient place. The energization of coil ZZ will shift the ZZ2—5 contacts (Fig. 22g) and the effect of the shift of these contacts is to cause shift of the entry of the complementary quotient digits which are obtained thereafter in orders of LQ which are relatively one higher. The shift of the ZZ2—5 contacts will be maintained throughout all succeeding computing operations, ZZ only becoming de-energized when relay coil JJ de-energizes after the termination of computing.

Under the first condition mentioned above, when complementary quotient entries are shifted relatively one place to the left, provision must be made for shifting the test circuits for testing for all nines in LQ relatively one place to the left. This is provided for by shift contacts ZZ6—9 (Fig. 22h) which shift the circuits between the SE stepping switch and LQR to limit the number of columns explored for all nines and to cut off exploring unwanted columns to the right.

Under the second condition, that is a going condition, one or more of the relay coils 1CU to 9CU will become energized (Fig. 22c). With one or more of such relays energized, the associated 1CU1, 2CU1, etc. (Fig. 22f) contacts shift so that the energizing circuit to coil LL will be broken. Accordingly, referring to Fig. 22d, contacts LL4 will remain open and there will accordingly be no energization of relay ZZ. With relay ZZ de-energized, there will be no shift of complementary quotient digit entries and no shift of the test circuit for testing for an all nine condition.

In dividing calculations where rounding off is employed there is an entry of a 5 in a selected order of LQ. Having provided for such 5 entry for rounding off on an original run which 5 entry it will be recalled occurs for every card, provision must be made to deduct such 5 on the checking operations. Such deduction of 5 in the proper order of LQ is obtained as follows:

Upon checking dividing the insertible plugboard will have established a plug connection between socket 393 (Fig. 22g) and the same socket 394 which was plugged up on the original dividing run. In addition plug connections are made by the insertible plugboard from sockets 406 to sockets 394 to the left of the one which is plugged up to 393.

On regular dividing it was explained how the plug connection to socket 393 through cam contacts CC22 and the relay contacts DD14 effects an entry of 5. This same 5 entry is made on checking computations in the second comparing cycle, but in addition in the same second comparing cycle there is a further entry of a set of nines to the left of the order of LQ which receives the 5. The nine entries originate at commutator 343 and flow through the DD11—13 contacts and via the plug connections previously explained, to the selected higher orders of LQ. Such entry of 995 into LQ compensates for the addition of 5 on the original run, in effect causing the deduction of 5 from the LQ accumulator.

In Fig. 26 the sequence of operations is shown when the machine is adjusted for a dividing operation. In first card feed cycle (occurs in starting up only) the dividend and divisor fields of each record are pre-sensed for the highest orders containing significant digits. During the first machine cycle of the next card feed cycle the divisor is entered into the ML devices and the dividend is entered into RD, both in shifted to the left relationship in accordance with the previous pre-sensing. In the two following cycles divisor multiple build-up is effected. In the first of these, or the second half of the card feed cycle the succeeding record is pre-sensed. Provided recording is completed on a previous record during the second of these cycles LQ reset occurs during the next machine cycle to initiate dividing operations. As has been previously explained, a significant quotient digit is obtained in two machine cycles. In the first of these comparison is effected between all nine divisor multiples and a selected comparison portion of the dividend. In the second of these a divisor multiple, selected in accordance with the comparison, is subtracted from the dividend and there is an entry of a related quotient digit in LQ. Such comparing, deducting and quotient digit entering cycles follow until computing operations are terminated by the place limiting devices. It may be mentioned that if a non-comparison condition exists this is indicative that the quotient digit is zero and the machine automatically eliminates the deducting cycle which normally follows and immediately follows with another comparing cycle. It will be observed that if the rounding off device is utilized the entry of a 5 takes place during a second comparison cycle provided such occurs. Upon termination of computing operations, there is a machine cycle in which reset of the ML and RD devices and initiation of punching occur following which card feed of the succeeding record takes place.

When the machine is adjusted for rate dividing operations the sequence of operations shown in Fig. 26 applies to detail cards except there is no divisor entry and build-up. When a master card appears in a run the operations shown in Fig. 33 are somewhat modified. The cycles in which divisor multiple build-up is effected take place for master cards only. Inasmuch as computing cycles do not take place for master cards comparing and divisor multiple deducting and quotient digit entering cycles are also eliminated. Reset of the ML devices occurs only when the machine is apprised that a new master card is about to be analyzed.

When the machine is set for checking dividing operations Fig. 27 shows the sequence of machine cycles. In addition to pre-sensing the dividend and divisor fields the previously recorded quotient field is also pre-sensed so that in the entry cycle of a card feed cycle such quotient amount may be entered clear to the left in LQ. In lieu of entering the dividend amount into RD it is entered into SP. Divisor multiple build-up cycles are effected just as in Fig. 26. In the second half of a card feed cycle, however, there is a transfer of the nines complement of the dividend amount from SP to RD. Instead of initiating checking dividing computations by a reset of LQ such computing is now initiated by a reset of the SP device. As explained in detail previously, in the computing operations the nines complements of the divisor multiples are compared with the nines complement of the dividend comparison portion. In lieu of deducting a selected divisor multiple, in checking dividing such selected divisor multiple is added to the nines complement of the dividend. Also the nines complement of the related quotient digit is entered into LQ. Complementary comparison and multiple adding and complementary quotient digit entering cycles follow until the place limiting devices terminate computing operations. In the final multiple adding cycle the LQ device is tested for an all nine condition. If such condition exists it is an indication of a check condition and machine automatically follows with a cycle in which the ML, RD, and LQ devices are reset and the checked card is skipped through the punch. Thereafter card feed of a following record takes place. If, however, an all nine status is not detected indicating a non-check condition the aforementioned reset and card feed cycles are held up until there is a manual intervention.

The present application constitutes a division of our copending application Serial No. 213,044, filed June 10, 1938, for Multiplying and dividing machines.

In the present application no detailed explanation has been given as to multiplying features of the present machine or to combined multiplying and dividing features. Reference may be made to said copending application, Serial No. 213,044 and to British Patent No. 532,109, for a full description of the complete machine and particularly for a full description of the multiplying features of the machine and the combined multiplying and dividing features.

What we claim is:

1. A card controlled calculating machine including dividing mechanism having record controlled term receiving devices for the divisor and dividend terms and also having quotient receiving devices, means to sense and distinguish master and detail cards, means controlled by the last mentioned means upon the sensing of master cards to cause the divisor term to be entered in its receiving device only from such master cards, and means controlled by the sensing and distinguishing means upon the sensing of detail cards to cause dividend terms to be entered in its receiving device only from such detail cards, and means controlled by the sensing and distinguishing means to control the dividing mechanism whereby calculations are performed with divisor terms derived from master cards and dividend terms derived from detail cards whereby rate dividing operations may be performed.

2. The invention according to claim 1 wherein means are provided controlled by the sensing and distinguishing means to also control the dividing mechanism to suppress quotient calculating operations upon the sensing of each master card.

3. A record controlled calculating machine, including means for handling cards, sensing means comprising main sensing means at a main sensing station and pre-sensing means at a pre-sensing station, dividing mechanism including record controlled amount receiving devices for the divisor and dividend and also including quotient receiving means, entry controls for the divisor and dividend receiving devices controlled by the pre-sensing means, means to variably control said entry controls upon and by the pre-sensing means detecting whether a sensed card is a master card or a detail card whereby under control of the main sensing means divisor amounts are entered into the receiving devices therefor only for master cards and dividend amounts are entered in the receiving devices therefor only for detail cards.

4. A record controlled calculating machine including dividing mechanism having record controlled term receiving devices for the divisor and dividend and having quotient receiving devices, place limiting devices for limiting the number of quotient places calculated by the dividing mechanism, means to detect the denominational magnitude of the divisor, and control means controlled by said detecting means for automatically controlling the place limiting devices to cause dividing operations to be automatically terminated when the capacity of the dividing mechanism is reached.

5. The invention according to claim 4 wherein the place limiting devices include a supplemental manually set means for limiting the dividing operations to a number of quotient places equal to or less than the number of places possible under the automatic place limiting control means.

6. The invention according to claim 11 wherein control means are provided for the comparing means to cause the divisor multiples to be retained in the settable elements therefor for a plurality of comparing operations pertaining to one dividing calculation, and including further control means to re-establish a setting of the settable elements for the dividend comparison portion for each successive comparing operation of a dividing calculation.

7. A calculating mechanism including dividing mechanism which includes means to receive the divisor, a plurality of settable source means from which all of the different digital multiples based upon a received divisor may be derived, means to build up and render available said multiples upon said source means, dividend receiving means, quotient receiving means, comparing means to successively compare comparison portions of the dividend in the dividend receiving means with all of the divisor multiples available upon said source means, means controlled by the comparing means to select a going divisor multiple derived from the source means and cause its deduction from the dividend receiving means, a source of quotient entries, means controlled by the comparing means to select a quotient amount for entry and means to cause such entry to be made in the quotient receiving means and means controlled by the comparing means upon determining a no go condition when the dividend comparison portion is less than any divisor multiple for suppressing a deducting operation and for automatically causing the re-initiation of a following new comparing operation pertaining to a different dividend comparison portion.

8. A record controlled calculating machine, including means for handling cards, sensing means comprising main sensing means at a main sensing station and pre-sensing means at a pre-sensing station, dividing mechanism including record controlled amount receiving devices for the divisor and dividend and also including quotient receiving means, entry controls for the divisor and dividend receiving devices controlled by the pre-sensing means, means to variably control said entry controls upon and by the pre-sensing means detecting whether a sensed card is a master card or a detail card whereby under control of the main sensing means divisor amounts are entered into the receiving devices therefor only for master cards and dividend amounts are entered in the receiving devices therefor only for detail cards, recording means controlled by the quotient receiving means, the aforesaid entry controls including column shift entry routing means for variably denominationally directing under the control of the pre-sensing means the entry of amounts which for the dividend are individually controlled from each pre-sensed detail card and which for the divisor are controlled only by pre-sensed master cards, supplemental controls set according to the column shift controls for the divisor which are retained set up during operations upon succeeding detail cards, other supplemental controls set according to the dividend column shift controls once for each detail card, and shift back recording controls controlled conjointly by both of said supplemental controls according to their settings for controlling shift back upon recording results on each detail card by said recording means.

9. A record controlled calculating machine including dividing mechanism including multiple providing and settable source means for all the different complete digital multiples of a divisor, means to sense and distinguish master and detail cards, means to sense term data on the cards, means controlled by the first named sensing means to cause divisor data to be entered from master cards only, means controlled by the first named sensing means to retain the set up of the settable source means during a succeeding run of detail cards, dividend receiving means, means effective upon sensing detail cards to cause a dividend amount to be entered in its receiving means from each detail card, quotient receiving means, and means controlled by the sensing and distinguishing means and including said retaining means to control the dividing mechanism to perform calculations under control of the settable source means and the dividend receiving means for each dividend entry therein by the detail cards whereby such calculations are performed with divisor terms derived from master cards and dividend terms derived from detail cards whereby rate dividing operations may be performed.

10. The invention according to claim 9, including reset control means for the divisor multiple providing and settable source means, and means controlled by the first named sensing means upon sensing a master card to cause said reset control means to be effective to bring about the resetting of said multiple providing and settable source means prior to the entry of a divisor amount from said card.

11. A calculating mechanism including dividing mechanism having divisor and dividend and quotient receiving means and a plurality of suitable source means from which all of the different digital multiples based upon a received divisor may be derived, means to build up and render available all of said multiples upon said source means whereby after build up all of said multiples may be concurrently derived therefrom, said dividing mechanism including comparing means to compare successive dividend comparison portions in the dividend receiving means with the different divisor multiples derived from said source means, said comparing means including a plurality of comparing sections, each section including elements set and positioned according to the comparison portion of the dividend under control of the dividend receiving means, said set up of the comparison portion of the dividend being similarly set in other sections whereby a plurality of comparison portions are simultaneously available, each section including a second set of elements set and positioned according to a divisor multiple, said second sets of elements of all of the different sections being respectively set and positioned according to all of the different digital multiples of the divisor under control of the related divisor multiple source means whereby each different divisor multiple is simultaneously available for comparison with the comparison portion of the dividend in the related section, a source of quotient entries, means controlled by the comparing means to select a quotient amount for entry and means to cause such entry to be made in the quotient receiving means.

12. A dividing machine comprising a precalculating section for precomputing complete multiples of the divisor with a plurality of settable divisor multiple readout means which when set afford a possible concurrent readout of all of the different complete digital multiples of a divisor therefrom, means including receiving and accumulating means for receiving the divisor and multiples thereof and for setting the said readout means, including in combination with said precalculating section, a dividend receiving means, means to enter a dividend therein, a comparing unit having a plurality of comparing subsections, each subsection comprising a divisor multiple section and a dividend comparison section means controlled by the dividend receiving means to set all of the dividend comparison sections of all subsections to represent a comparison portion of the dividend, means controlled by the aforesaid settable readout means to set the various divisor sections of the subsections to represent respectively all of the different digital divisor multiples, testing means to test all the divisor multiple sections against the dividend comparison portion sections to ascertain which divisor multiple is equal to or the greatest that is less than the comparison portion of the dividend, quotient digit entry determining means set under control of said testing means for selecting a related quotient digit for entry into a quotient receiving device, a quotient receiving device and means to enter the selected quotient digit thereinto.

13. In a machine for checking the accuracy of a previously computed quotient recorded on a card and which card also contains divisor and dividend representations utilized in the calculation, the combination of analyzing means, quotient receiving means, means controlled by said analyzing means for entering said quotient amount as a true number in said quotient receiving means prior to a calculation, separate analyzing means for said divisor and dividend amount representations, dividing mechanism comprising devices for effecting a re-computation of division of the dividend and divisor amounts on the card and including quotient computing means controlled by said dividing mechanism and quotient digit setup means for representing digitally the successively derived quotient digits, means for reading out from said quotient digit setup means the digit as a nines complement and including means for effecting the entry in successive orders of said quotient receiving means, quotient place limiting control means and including settable means settable to the same position for the re-computation of division as for the original computation to thereby terminate the operation of the dividing mechanism upon deriving a number of quotient digits corresponding to the number of recorded quotient digits, and means initiated in operation by said quotient place limiting means to test the digital representations of said quotient receiving means for the indication of nine in each order a quotient digit was entered both as a true number and a nines complement thereof.

14. In a dividing machine for checking the accuracy of quotient results recorded on a record derived by an original computation of division of a dividend and divisor amount on the same record, the combination of separate analyzing means for the quotient, dividend and divisor data, quotient receiving means, means controlled by said analyzing means to enter the recorded quotient result in said quotient receiving means, dividend and divisor data receiving means controlled by the respective analyzing means, a plurality of storage means for storing up all the multiples of the divisor, means for building up on and supplying from said storage means representations of all multiples of the divisor controlled by the divisor receiving means, comparing means for comparing successive comparison portions of the dividend in the dividend receiving means with all the multiples of the divisor on the storage means, quotient digit setup means, means controlled by the comparing means to set up on said setup means in accordance with the result of the comparison a quotient digit representation and including complement entry transmitting means to effect the entry of the quotient digits under control of the setup means as nines complements of the digits 1 to 9 in said quotient receiving means to bring the latter to a nines condition, said setup means including a supplemental setup means responsively set up to represent zero when said comparing means determines that none of the divisor multiples is contained in the first comparison portion of the dividend, said complement entry means normally tending to enter a "9" under control of the "0" setup means in the first order of the quotient receiving means, and means controlled by said supplemental setup means for disconnecting the first order quotient digit receiving element of the quotient receiving means from said "0" setup means to render the complement entry means ineffective to enter a "9" therein under control of the "0" setup means.

15. In a dividing machine for checking the accuracy of quotient results recorded on a record derived by an original computation of division of a dividend and divisor amount on the same record, the combination of separate analyzing means for the quotient, dividend and divisor data, quotient receiving means, means controlled by said analyzing means to enter the recorded quotient result in said quotient receiving means, dividend and divisor data receiving means controlled by the respective analyzing means, a plurality of storage means for storing up all the multiples of the divisor, means for building up on and supplying from said storage means representations of all multiples of the divisor controlled by the divisor receiving means, comparing means for comparing each comparison portion of the dividend in the dividend receiving means with all the multiples of the divisor on the storage means, quotient digit setup means, means controlled by the comparing means to set up on said setup means in accordance with the result of the comparison a quotient digit representation and including complement entry transmitting means to effect the entry of the quotient digits under control of the setup means as nines complements of the digits 1 to 9 in said quotient receiving means to bring the latter to a nines condition, said setup means including a supplemental means responsively set up to represent zero when the comparing means determines upon the first comparing operation that none of the divisor multiples is contained in the first comparison portion of the dividend, said complement entry means normally tending to enter a "9" under control of the "0" setup means, and means controlled by said setup means upon being set up to represent "0" for rendering said complement entry means ineffective for the nines complement entry of "0" and for connecting the first order quotient digit receiving element of the quotient receiving means with said complement entry means to cause the latter under control of the next quotient digit setup means set up to transmit its nines complement to said element.

16. A machine for checking the accuracy of a quotient result recorded on a card, which card contains representations of related dividend and divisor amounts, analyzing means for analyzing the divisor, dividend and quotient data representations, quotient receiving means, means for entering the quotient result as true number digits in receiving elements of said quotient receiving means under control of the respective analyzing means, dividend receiving means, entry means to enter in said dividend receiving means the dividend amount derived from the respective analyzing means, a plurality of storage means for storing up multiples of the divisor amount, means for building up under control of said divisor receiving means on said storage means 1 to 9 multiples of the divisor, comparing mechanism comprising multiple dividend setup means for a comparison portion of the dividend and multiple divisor setup means, means for complementally reading out the digital setups on all of said divisor storage means and setting up said multiple divisor setup means to cause the latter to represent the nines complement of all the divisor multiples, means for complementally reading out the digital setup on said dividend receiving means and setting up the dividend setup means of said comparing mechanism to represent the nines complement of the comparison portion of the dividend, quotient digit setup means controlled by said comparing mechanism to set up the representation of a quotient digit in accordance with the result of the comparison, and complement entry means for entering under control of the effective quotient digit setup means a nines complement of the quotient digit in the element of the quotient receiving means supposedly receiving the same quotient digit but as a true number digit, whereby said element should represent "9" if a check condition obtains.

17. In a record controlled machine for checking the accuracy of the digits of a previous recorded quotient result in which the final recorded digit thereof at the right had been rounded off, the record bearing the quotient result also containing digit representations of a related dividend and divisor amount, the combination of analyzing means for analyzing the quotient data, quotient receiving means controlled thereby comprising an accumulator with transfer means between successive orders, record controlled dividing mechanism comprising devices coordinated for the automatic operation of division of the dividend and divisor amount and including quotient digit computing means and quotient digit setup means controlled thereby to set up representations of the quotient digits derived, said dividing mechanism being maintained in operation for computing operations to derive successive quotient digits including a quotient digit for an order which is to the right of the order receiving the last digit of the quotient result, means for complementally entering under control of said setup means successively computed quotient digits in said quotient receiving accumulator, means for effecting the subtractive entry of "5" in an element of the quotient receiving accumulator in the last mentioned order, and means cooperatively related with the elements of the quotient receiving accumulator for testing the digital representation thereof in the orders which previously derived the quotient result from the record to determine whether said elements are at "9" digit representing positions.

18. In a record controlled machine for checking the accuracy of the digits of a previous recorded quotient result in which the final recorded digit thereof at the right had been rounded off, the record bearing the quotient result also containing digit representations of a related dividend and divisor amount, the combination of analyzing means for analyzing the quotient data, quotient receiving means controlled thereby comprising an accumulator with transfer means between successive orders, record controlled dividing mechanism comprising devices coordinated for the automatic operation of division of the dividend and divisor amount and including quotient digit computing means and quotient digit set-up means controlled thereby to set up representations of the quotient digits derived, means for complementally entering under control of said setup means computed quotient digits in said quotient receiving accumulator to bring all the digit receiving elements thereof originally receiving the quotient digits and nines complements thereof to a nines representation, quotient digit computing limiting means settable according to the number of significant quotient digits recorded and including means to enable said dividing mechanism to be maintained in operation for one additional quotient digit computing operation to derive a quotient digit for an order which is to the right of the order receiving the last digit of the quotient result, said quotient digit setup means being set up additionally to cause the additional quotient digit derived to be entered by the complement entering means as a nines complement in an element of the quotient receiving accumulator corresponding to the order originally utilized for a rounding off computation, means for effecting the subtractive entry of "5" in the last mentioned element of the quotient receiving accumulator, and means cooperatively related with the elements of the quotient receiving accumulator for testing the digital representation thereof after the latter has received the quotient result from the record, the nines complement quotient digit entries, and the substractive entry of "5", to determine whether said elements are at "9" digit representing positions.

19. In a record controlled machine for checking the accuracy of digits of a previous recorded quotient result in which the final recorded digit thereof at the right had been rounded off by the addition of "5" to the next computed quotient digit in which analyzing means is provided for the quotient data and divisor and dividend data on the card and dividing mechanism is controlled by the dividend and divisor analyzing means to compute successive quotient digits including the quotient digit which is one order to the right of the order rounded off, the combination of a quotient receiving accumulator, quotient digit setup means for setting up representations of the computed quotient digits, complement entry means for entering under control of the digit setup means the nines complement of the quotient digits in said accumulator, means controlled by the quotient data analyzing means to enter the quotient digits in said accumulator, "9" entry means, "5" entry means, means to subtract "5" from the order of accumulator corresponding to the order previously receiving "5" for rounding off comprising means to cause said "5" entry means to enter a "5" in the accumulator order corresponding to the order previously receiving "5" for rounding off and to cause said "9" entry means to enter "9" in each accumulator order at the left thereof, and means for testing the digital representations of the orders of the accumulator after the latter has received the quotient digits under control of said analyzing means, the nines complement of the computed digits and the subtraction of "5" to determine whether they all represent "9".

JAMES W. BRYCE.
ARTHUR H. DICKINSON.